United States Patent [19]

Kassay et al.

[11] Patent Number: 4,616,328

[45] Date of Patent: Oct. 7, 1986

[54] APPARATUS FOR THE DETERMINATION OF THE TECHNICAL PARAMETERS OF MACHINES PARTICULARLY AGRICULTURAL MACHINES, BASED ON PROBABLE USE

[75] Inventors: Laszlo Kassay; Sandor Nemeth, both of Budapest, Hungary

[73] Assignee: Mezogazdasagi es Elelmiszeripari Szervezo Vallalat, Budapest, Hungary

[21] Appl. No.: 655,708

[22] Filed: Sep. 28, 1984

Related U.S. Application Data

[63] Continuation-in-part of Ser. No. 283,620, Jul. 15, 1981, abandoned.

[30] Foreign Application Priority Data

Jan. 12, 1981 [HU] Hungary .................... 1624/80

[51] Int. Cl.[4] .................... G06F 15/20; G08B 19/00; A01D 41/00
[52] U.S. Cl. .................... 364/551; 364/148; 364/152; 364/580; 340/52 F; 340/684; 56/10.2
[58] Field of Search .................... 364/148–152, 364/513, 551, 580; 340/684, 52 R, 52 F; 56/10.2

[56] References Cited

U.S. PATENT DOCUMENTS

| | | | |
|---|---|---|---|
| 4,296,409 | 10/1981 | Whitaker et al. | 364/551 |
| 4,368,509 | 1/1983 | Li | 364/148 |
| 4,376,298 | 3/1983 | Sokol et al. | 364/551 |
| 4,472,770 | 9/1984 | Li | 364/148 |
| 4,491,906 | 1/1985 | Kishi et al. | 364/191 |
| 4,495,559 | 1/1985 | Gelatt, Jr. et al. | 364/148 |
| 4,512,747 | 4/1985 | Hitchens et al. | 364/150 |

*Primary Examiner*—Jerry Smith
*Assistant Examiner*—John R. Lastova

[57] ABSTRACT

Apparatus for the prediction of performance parameters of a proposed machine, in particular, an agricultural machine, includes a keyboard for entry of data in accordance with a set of input parameters useful in the calculation of performance parameters, a display for displaying performance parameters, a memory for storage of data inputted by the keyboard, and a data processor interconnecting the memory and the numerical board for performing mathematical calculations to output values of the performance parameters in response to the inputting of data at the keyboard. Included within the data processor is an analyzer for selecting input parameters specific to a mathematical correlation, a microprocessor for calculating values of intermediary parameters from the inputted data based on patterns of such data, and a synthesizer employing values of selected input parameters and the intermediary parameters to provide mathematical correlation for attaining values of the performance parameters.

12 Claims, 39 Drawing Figures

```
                                    ┌─2─┐
                                    │   │
                                    └─┬─┘
                                      ▼
A( 2,8)  = XYKE( RNT,0., 150., .019,0.)
A( 2,10) = XYKE( RNV,0., 30., .1,.)
      A(3,9) = A( 3,2 )
      A(3,11) = A( 3,2 )
A( 2,12) = XYKE (RK42,85.,100., .266,85.)
A( 3,13) = XYKE (RIB,., 150., .025,.)
A( 2,14) = XYKE (TAU,., 100., .046,.)
A( 3,15) = XYKE ( A(1,15), 3.41., 0.23,.)
A( 2,24) = XYKE (RKK,1., 6., .9,.)
A( 3,26) = XYKE (SZ/1000.,., 7., .642,.)
A( 2,27) = XYKE (PON, 1., 15., .266,.)
A( 2,29) = XYKE (A(1,5), 1., 75., .066,.)
A( 2,30) = XYKE (ALK+TAU,.,150., .014,.)
A( 3,33) = XYKE (RIB+RK 42 / 100.,.,250.,.01,)
A( 2,34) = XYKE (A(1,19),., 100., .05,.)
A( 2,36) = XYKE (FMIN,80., 100.,0. 3.80.)
A( 2,38) = XYKE (RKK,., .5,., .9,.)
A( 3,39) = XYKE (ABE,95., 100., .266,95.)
A( 2,40) = XYKE (RK41+ERG,., 320., .008,.)
A( 3,44) = XYKE (UK+ALK+TAU,., 300., .012,.)
A( 2,45) = XYKE (A(1,19),., 100., .05,.)
A( 2,47) = XYKE (COR,., 100., .02,.)
      A(3,46) = A(3,13)
A( 3,48) = XYKE (FOR,., 100., .009,.)

A( 4,1 )  = ZKE(GAMMA,., 9., G/1000.,., 6., 1,0)
A( 4,5 )  = ZKE(A(1,5), 30.,100., RTM,., 100., 2,0)
```

Fig. 23 c

APPARATUS FOR THE DETERMINATION OF THE TECHNICAL PARAMETERS OF MACHINES PARTICULARLY AGRICULTURAL MACHINES, BASED ON PROBABLE USE

RELATED APPLICATION

This application is a continuation-in-part of original patent application Ser. No. 283,620, filed July 15, 1981 and now abandoned.

BACKGROUND OF THE INVENTION

The invention relates to an electronic apparatus for a precise determination of the technical parameters of machines, in particular, agricultural machines and other vehicles before the actual design of such machinery. The determination is based on use-value parameters.

Throughout the world, design engineers are confronted with increasingly intractable problems in the design of mechanical equipment so as to optimize the equipment with respect to the technical and economic parameters indicating the effectiveness, capacity, and technological operational safety. The problem is exacerbated by the ever increasing numbers of these parameters, which can be collected only with difficulties and wherein the analysis thereof is also wearisome, as well.

SUMMARY OF THE INVENTION

This apparatus was created on the basis of theoretical studies and has as its object the automatic determination and display of the technical parameters of a machine to be designed, taking into account the requirements particularly of an agricultural machine or other such vehicle.

The apparatus can be advantageously used in the design of other equipment in any field of modern mechanical engineering.

The apparatus representing the object of the invention comprises electronic units not having been known or published up-to-now; the experiments relating to the process were carried out in the practice with the best results.

The natural endeavor to produce better and more efficient products than those already existing, will succeed when the existing machines can be characterized by parameters suitable for value judgement and comparison, and the technical parameters of the product to be designed can be coordinated. In order to be able to perform the comparison, prior to the determination of the design of a new construction, the data relating to existing products have to be collected and analysed. On the basis of this analysis the technical parameters of the new product, yielding a higher use-value than the previous ones, can be established.

The task requires selecting about 30 to 40 parameters of each of the known 20 to 30 machines. Up to now, neither an adequate method, nor an automatically operating machine has been developed for performing this task. For performing the innumerable calculations, known computers or calculators may be used; however, due to the labor intensity, such calculations have not been performed generally, or might be performed superficially only.

At the same time the necessity of performing individual calculations imposes an ever increasing burden on the technical designers of mechanical systems. Accordingly, there is a demand for methods facilitating the performance of routine work, and for apparata for the automatic performance of the foregoing task.

An object of the invention is to provide an apparatus applying and perrforming mathematically calculations for the staff of factories dealing with technical development, which staff is able to analyze the effectiveness, parameters and indices of use-values of the known machines performing identical or similar functions, as the machine to be produced. Furthermore, the apparatus should be able to employ the indices of use other than system parameters with a theoretically acceptable margin of error, and concurrently to perform automatically the analysis and synthesis of the indices of value to yield the constructional parameters of the machine to be designed.

The invention will be better understood by reference to the more detailed description below, with reference to the drawings in which.

Figure 12:
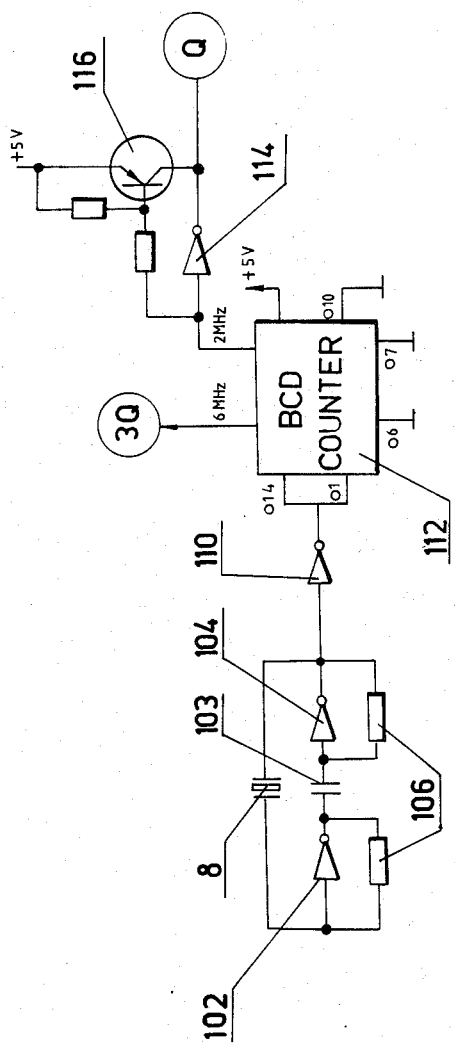
Figure 12:
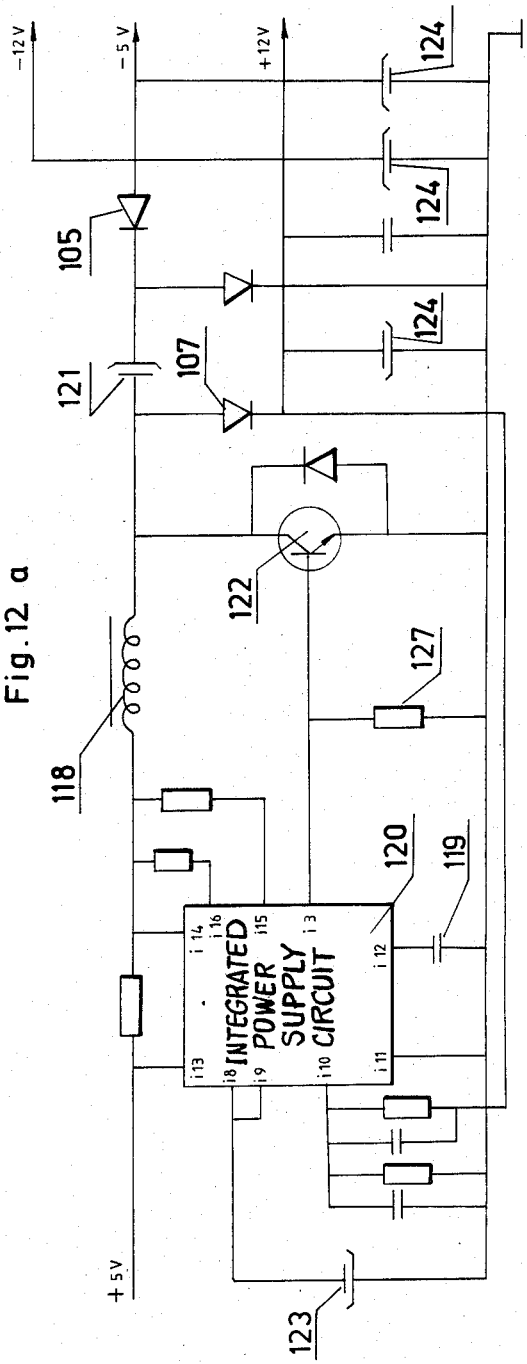
Figure 13:
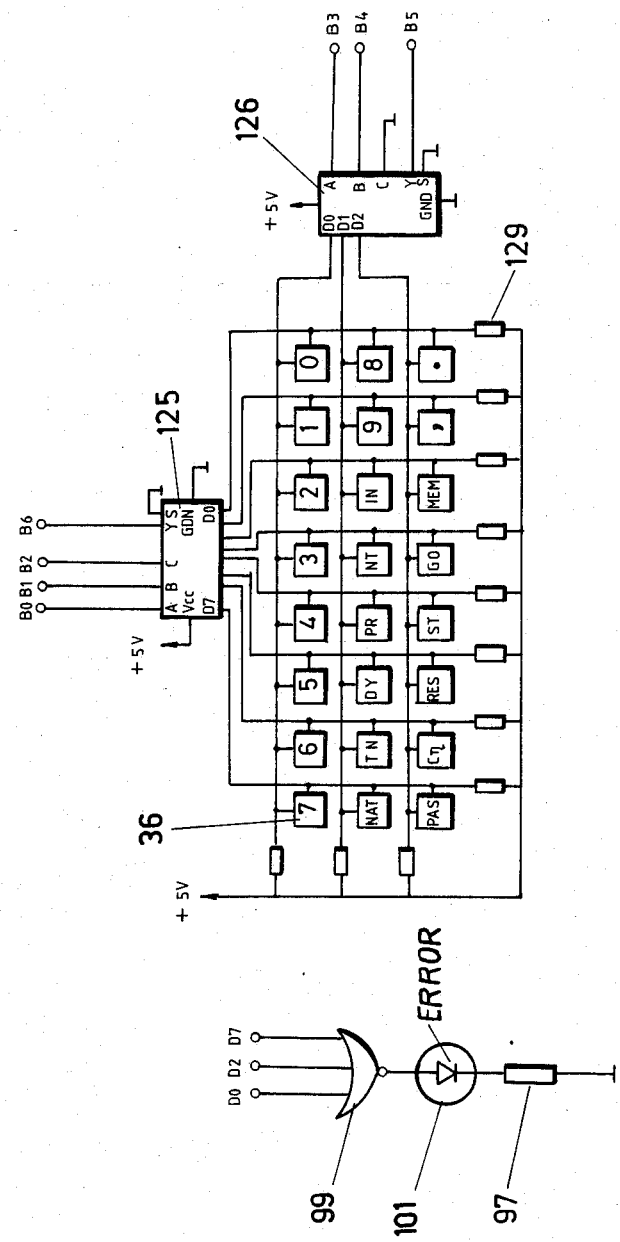
Figure 14:
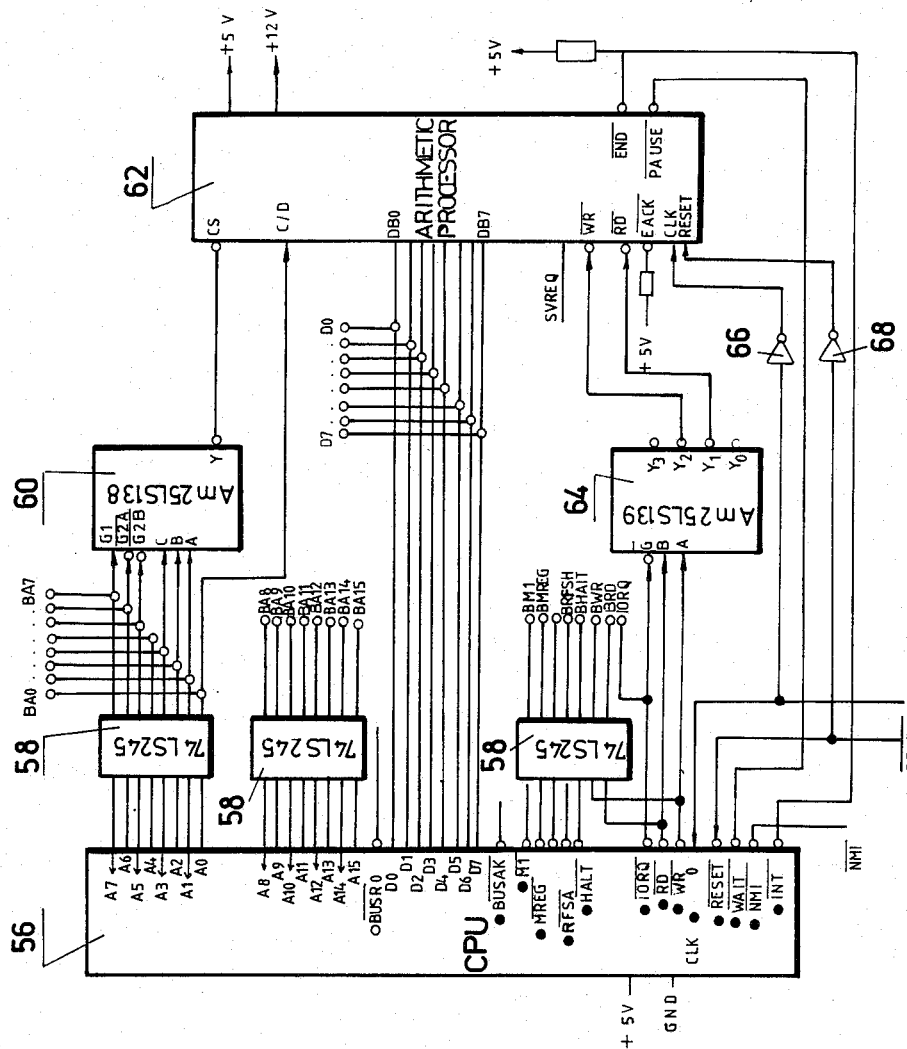
Figure 14:
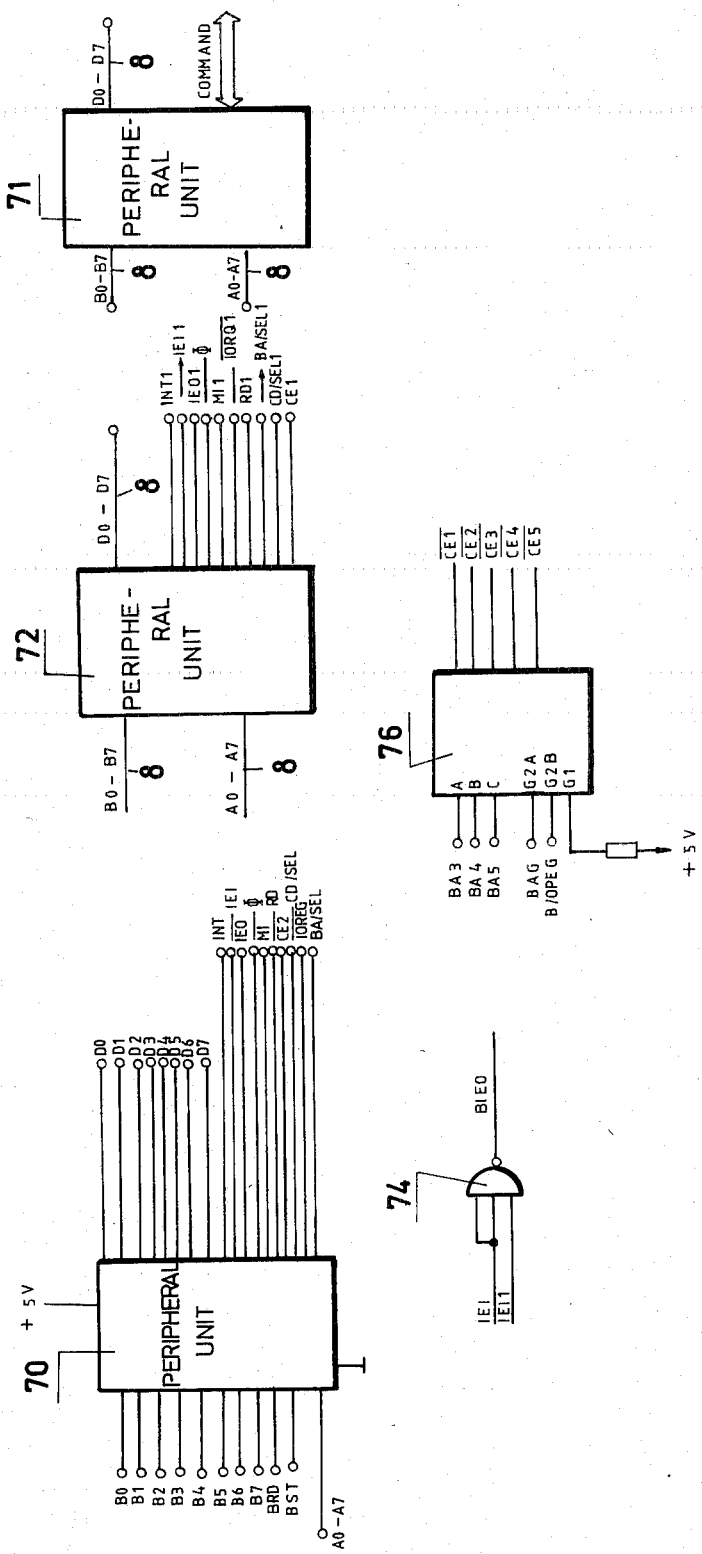
Figure 14:
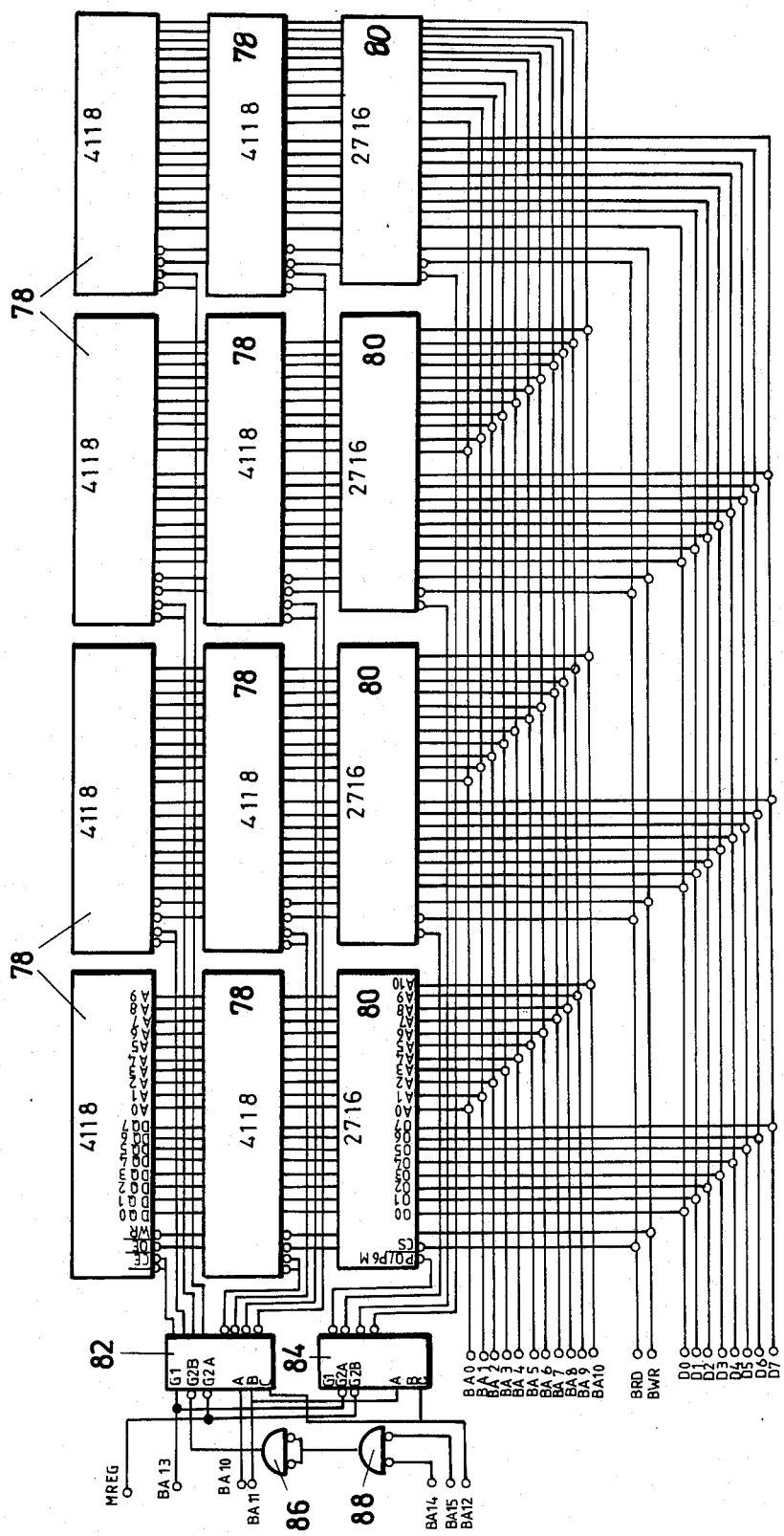

FIGS. 12/a and 12/b are circuit diagrams respectively of a timing generator and of a supply unit of the apparatus;

FIGS. 13/a and 13/b are circuit diagrams respectively of a keyboard and a LED unit for error indication;

FIG. 14 is a circuit diagram of a CPU and an arithmetic processor.

Figure 15:
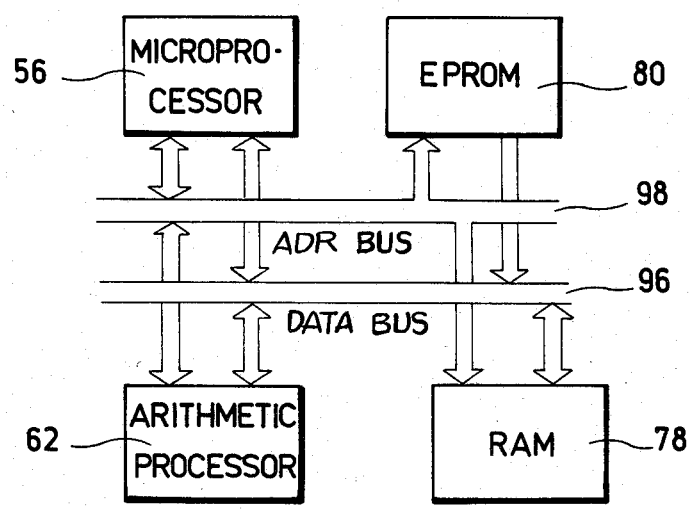
Figure 16:
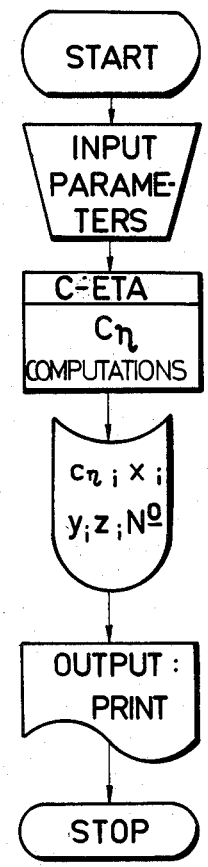
Figure 17:
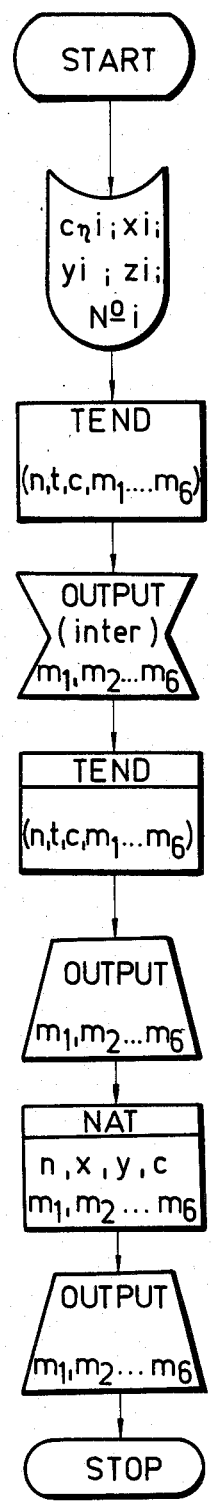
Figure 18:
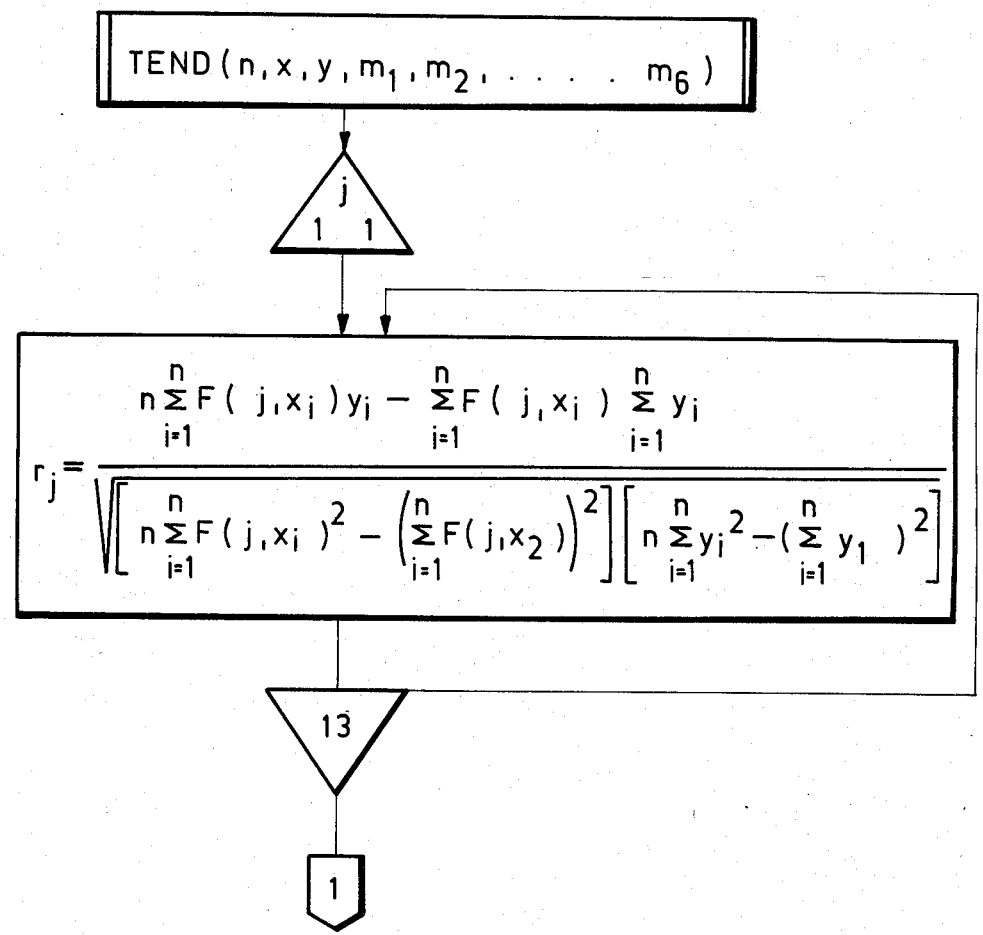
Figure 18:
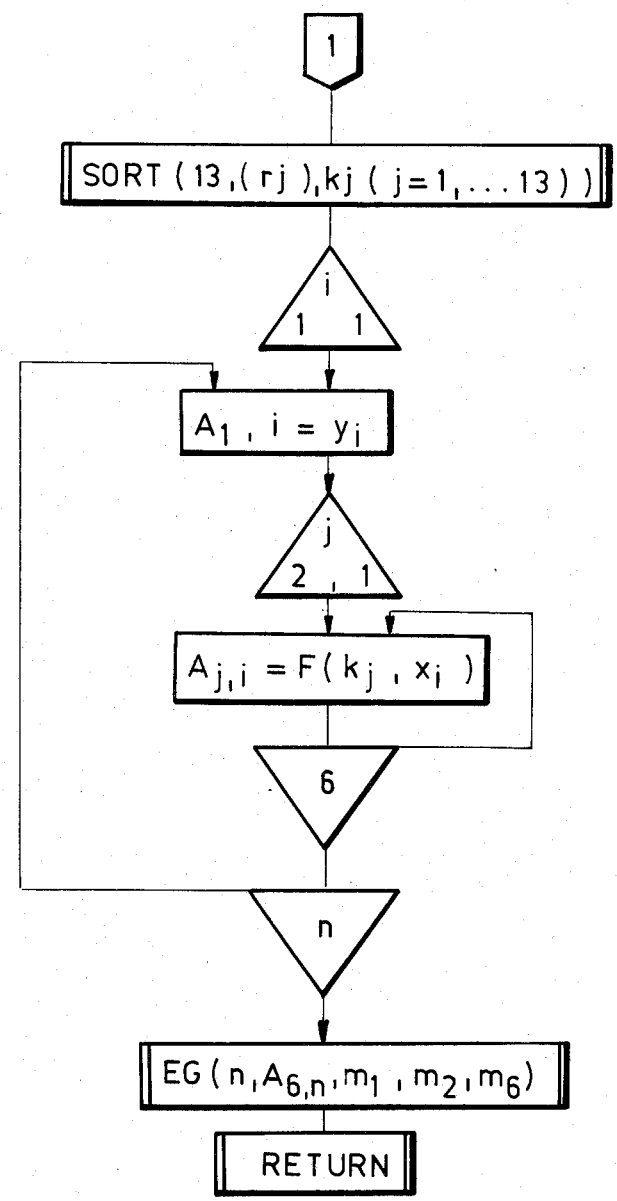
Figure 19:
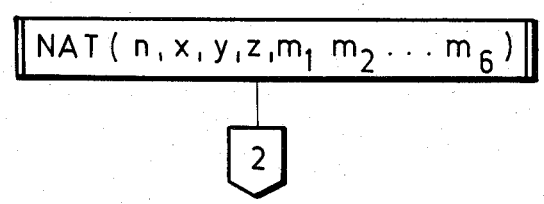
Figure 19:
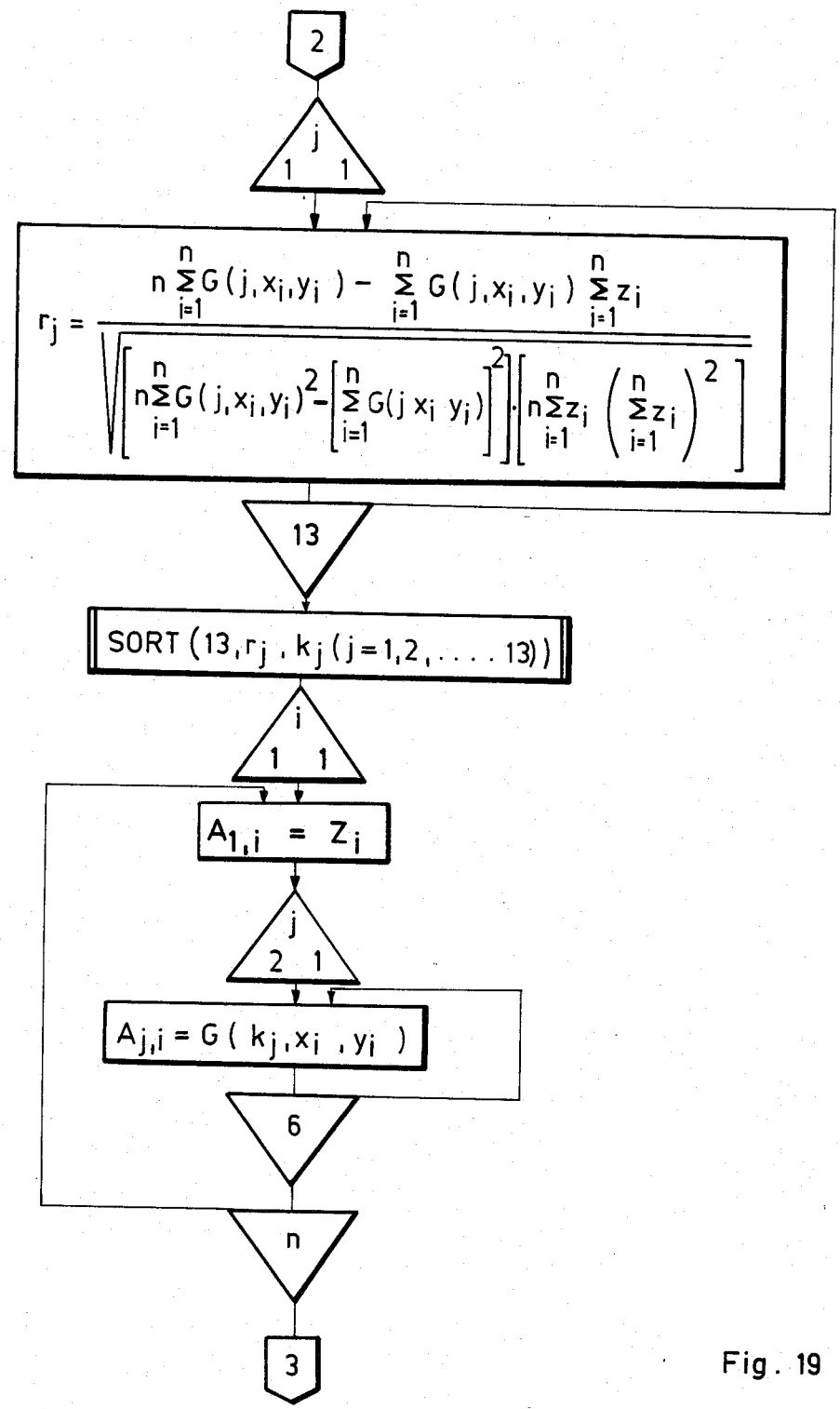
Figure 19C:
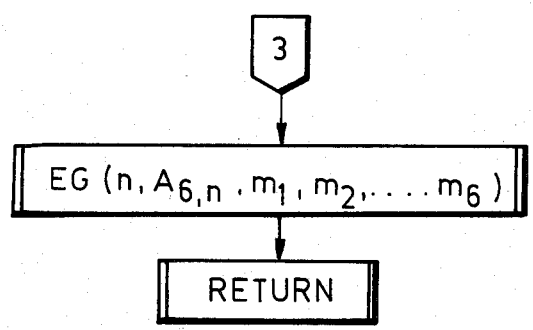
Figure 20:
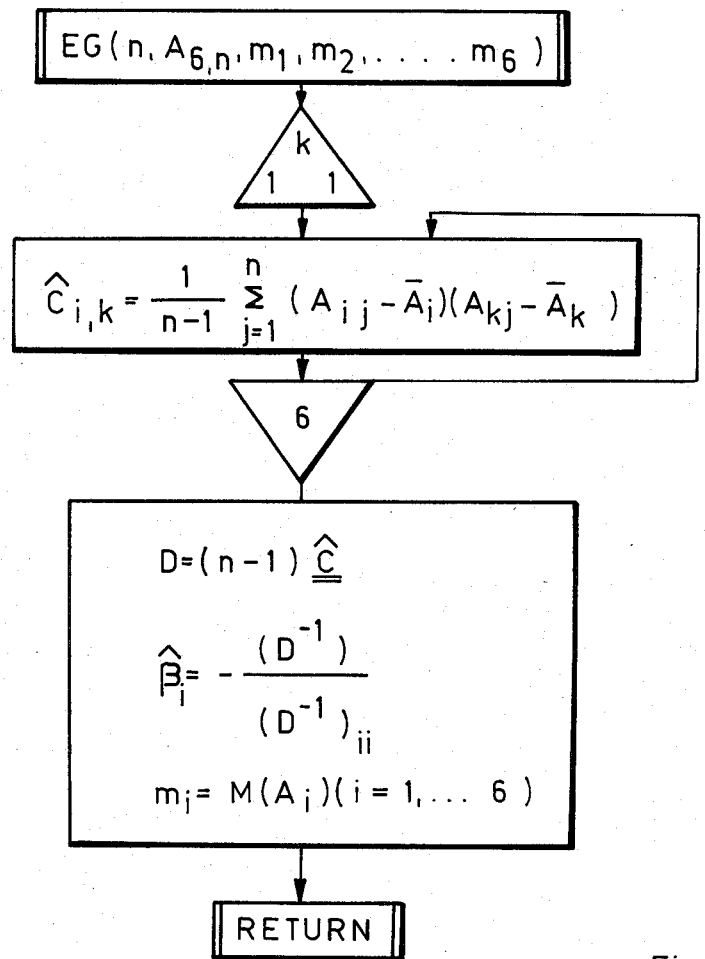
Figure 21:
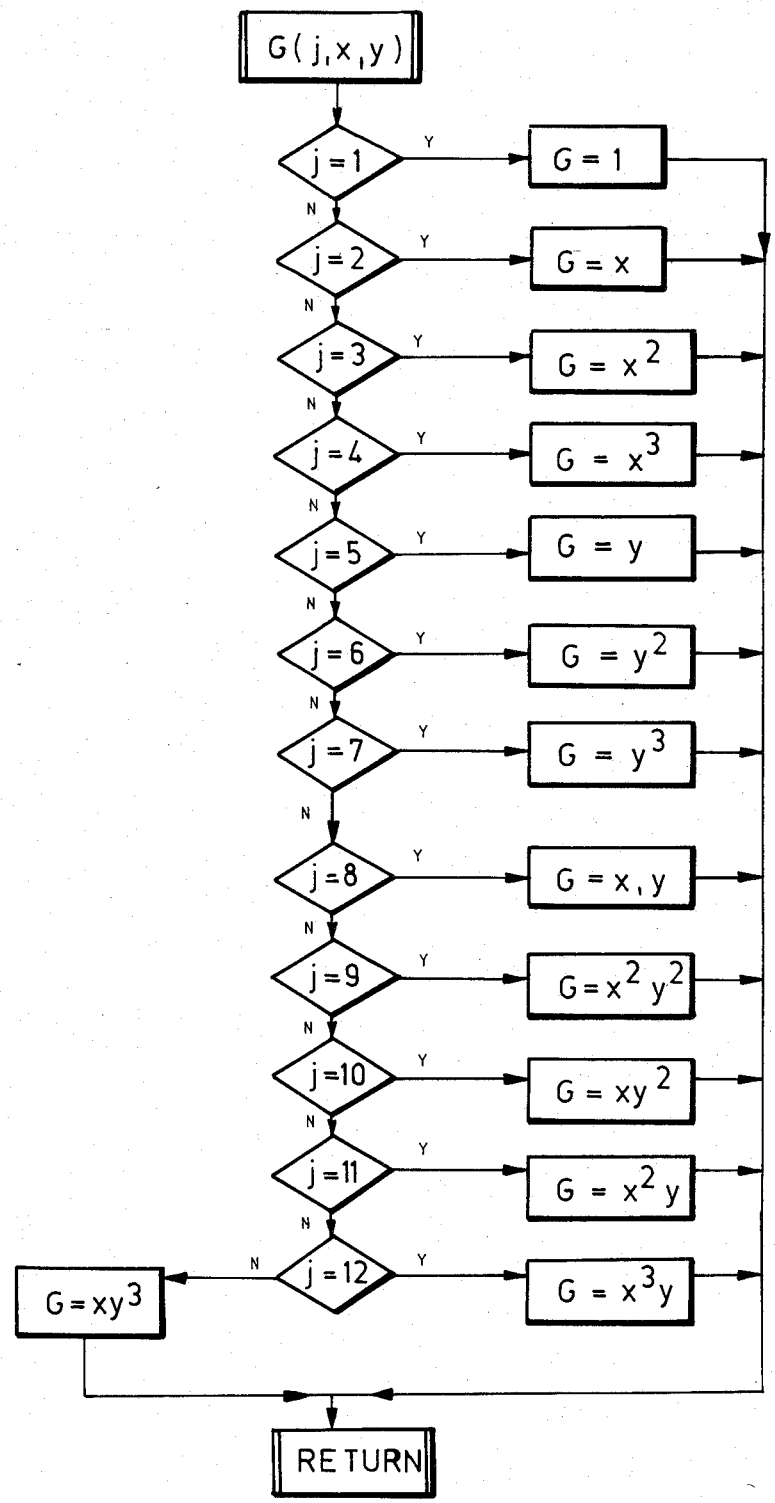
Figure 22:
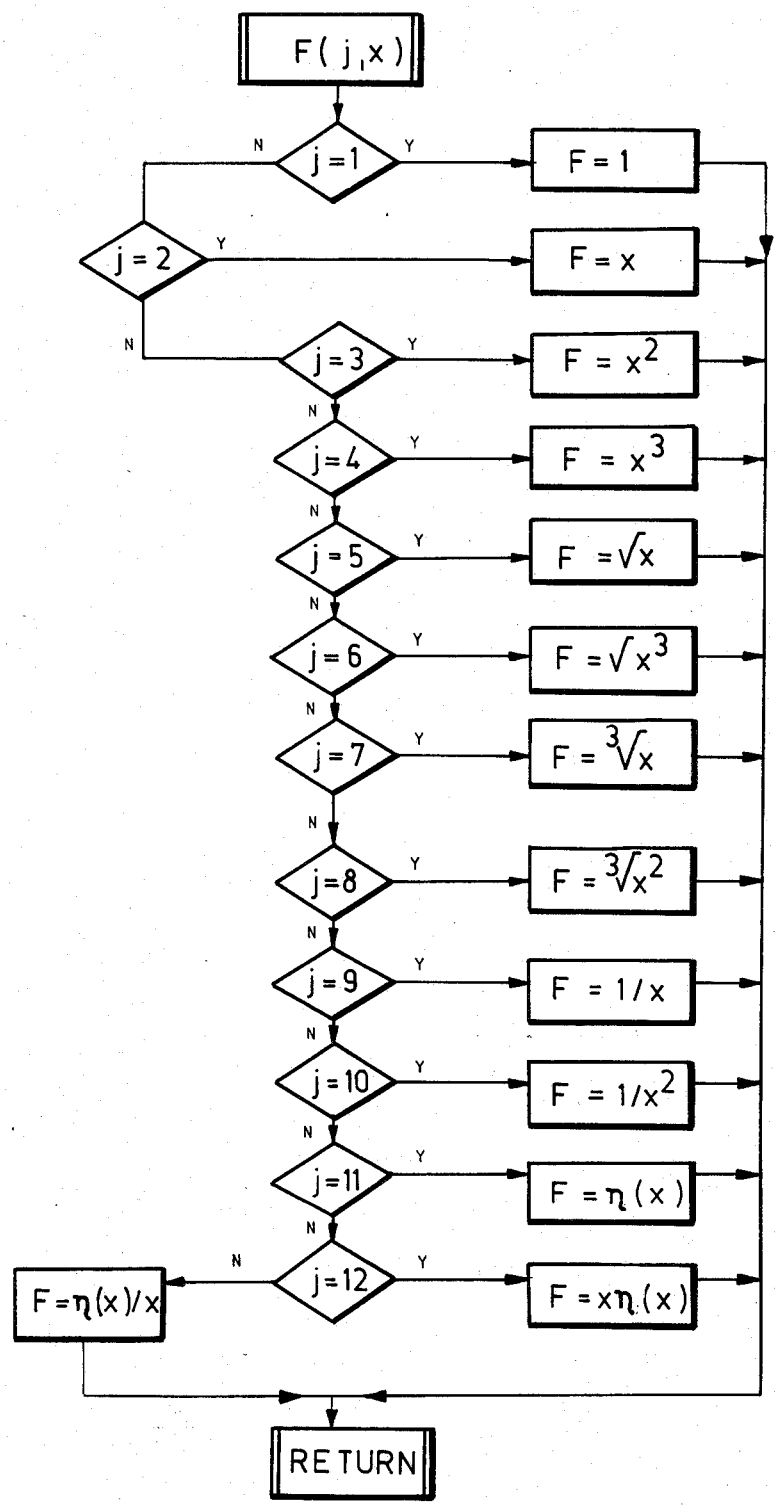
Figure 23:
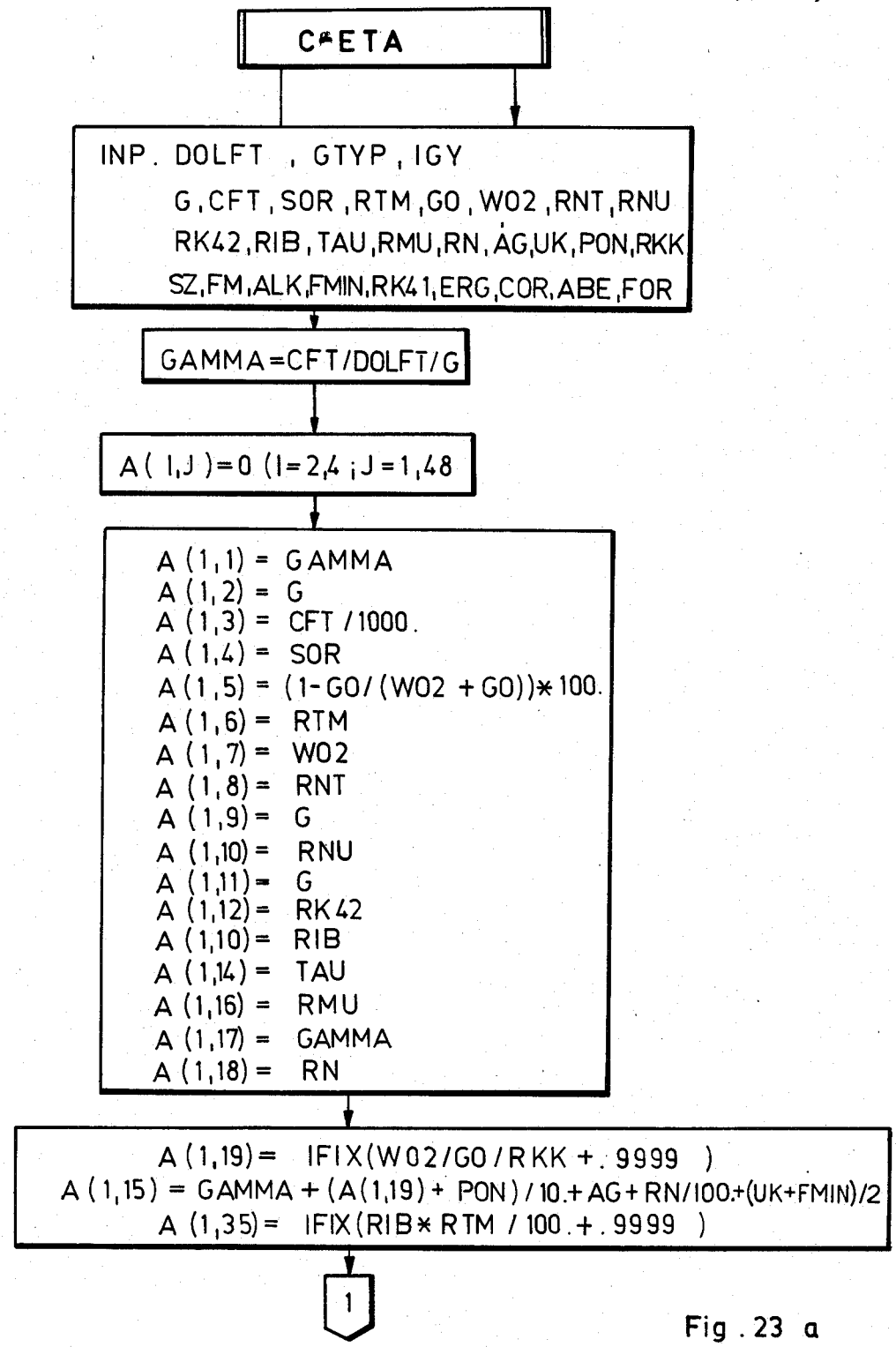
Figure 23:
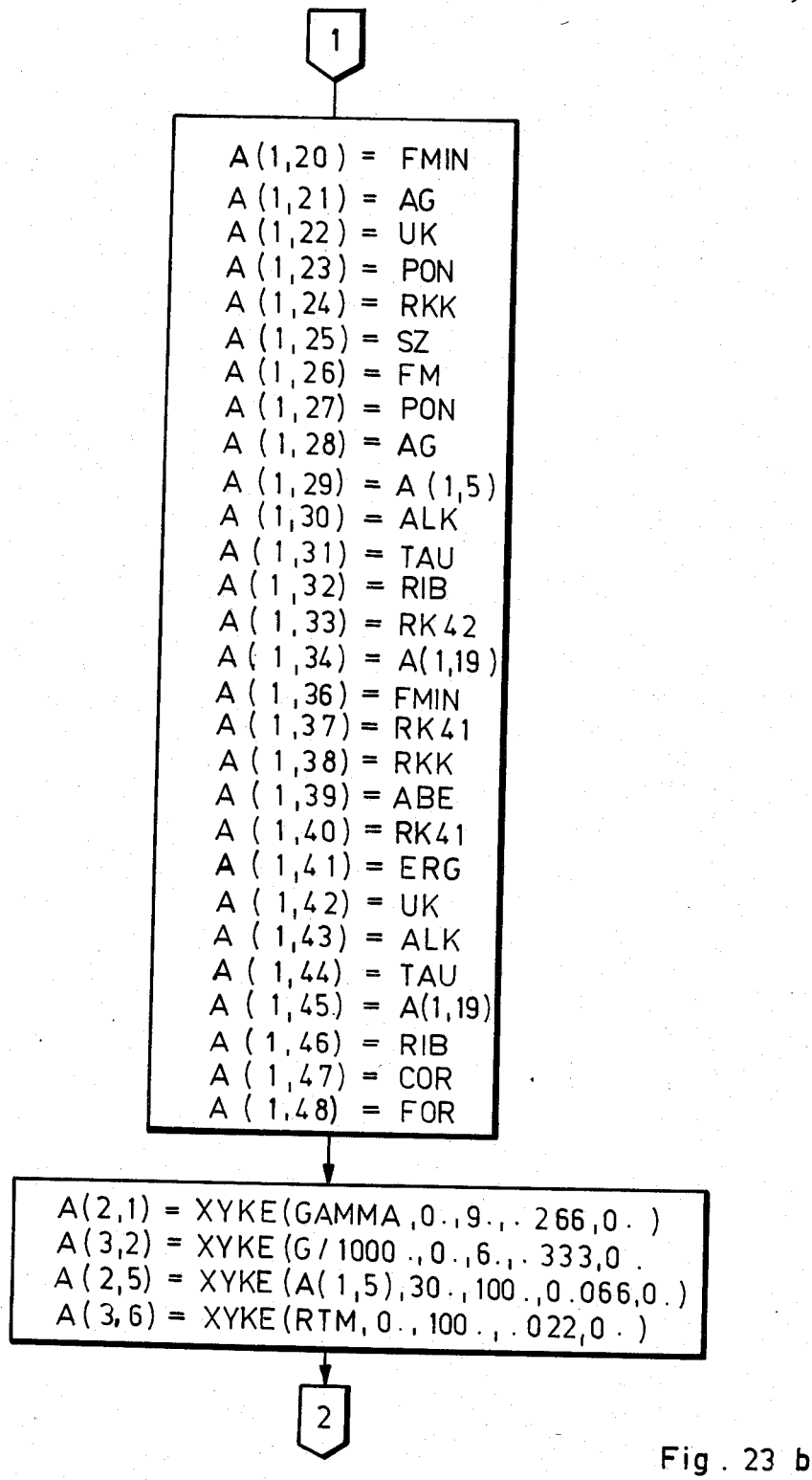
Figure 23:
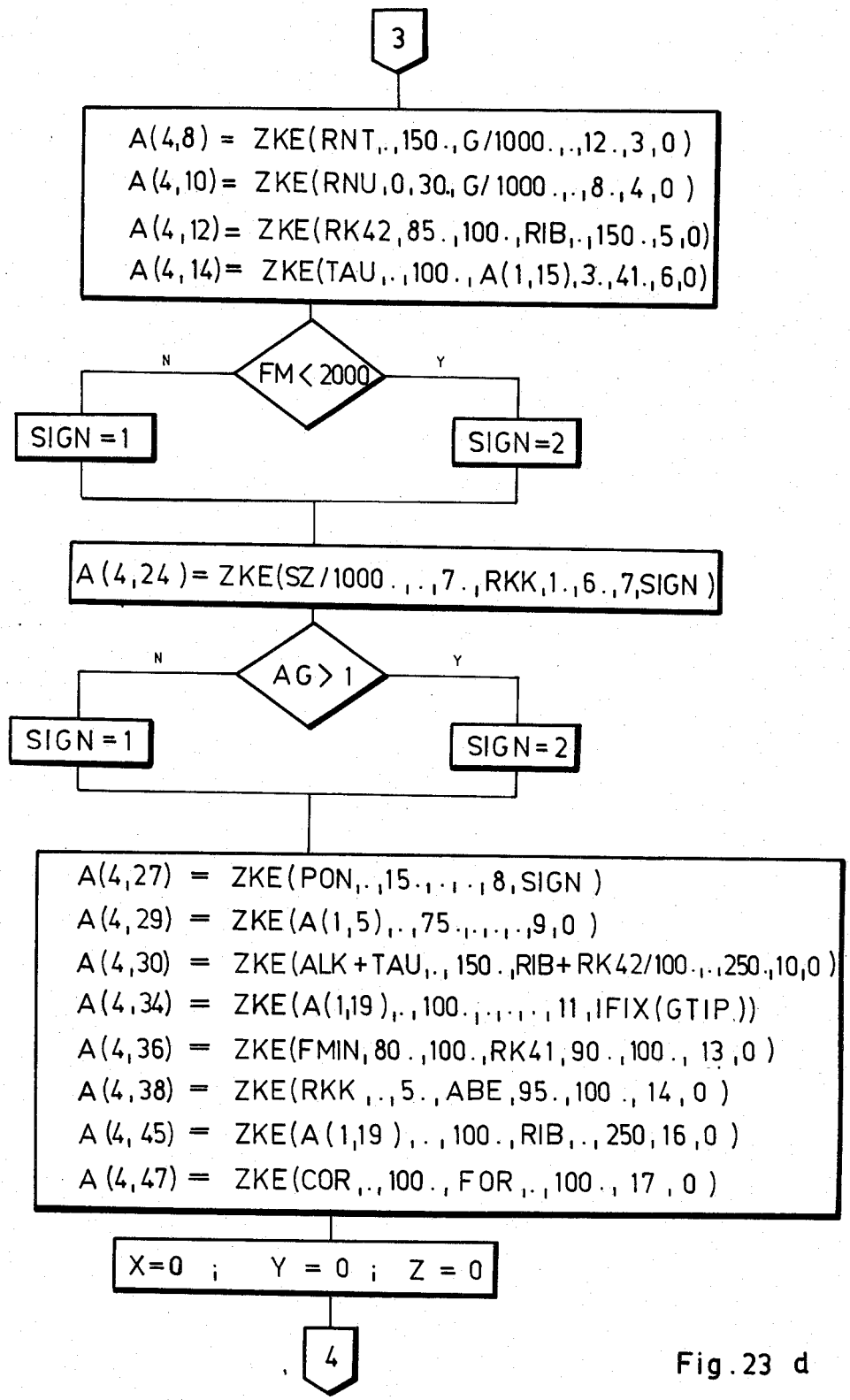
Figure 23:
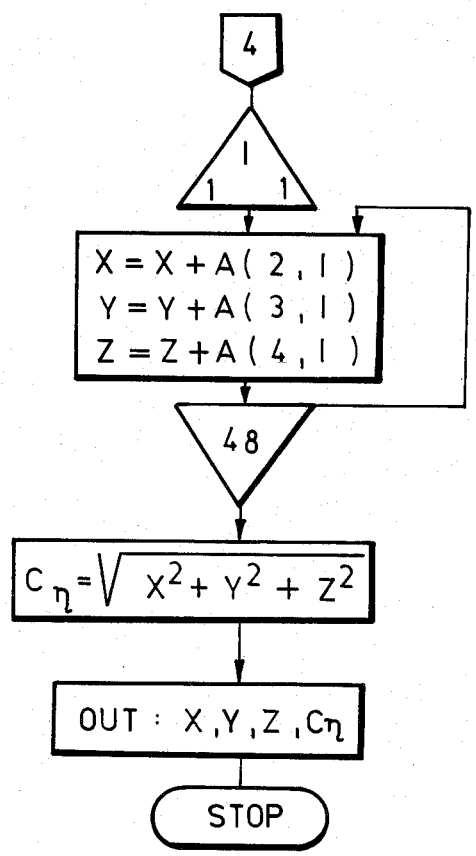
Figure 24:
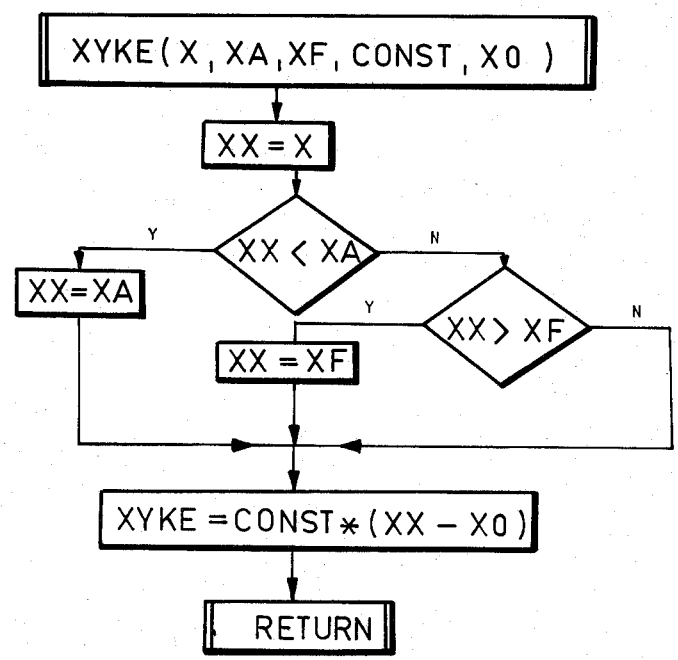

FIG. 14/a shows a set of peripheral interface units for connection with the CPU;

FIG. 14/b shows the daigram of storage units of the apparatus;

FIG. 15 is a scheme of interconnection of the main units of the apparatus;

FIG. 16 is a flow chart of computation of the basic $C\eta$ (C-eta) function;

FIG. 17 is a flow chart of computation of a tendency function and the function of leading standards;

FIG. 18 extends over two sheets of drawings and comprises FIGS. 18/a and 18/b which constitute a flow chart of computation of a tendency function in a subroutine;

FIG. 19 extends over three sheets of drawing and comprises FIGS. 19/a, 19/b, and 19/c which constitute a flow chart of computation of the function of leading standards in a subroutine;

FIG. 20 is a flow chart of determination of the coefficients used in the regression function;

FIG. 21 is a flow chart of determination of functions of two variables;

FIG. 22 is a flow chart of determination of a special function of one variable;

FIG. 23 extends over five sheets of drawing and comprises FIGS. 23/a–e which constitute a flow chart of determination of the use-value function;

FIG. 24 is the flow chart of determination of a limiting function; and

Figure 25:
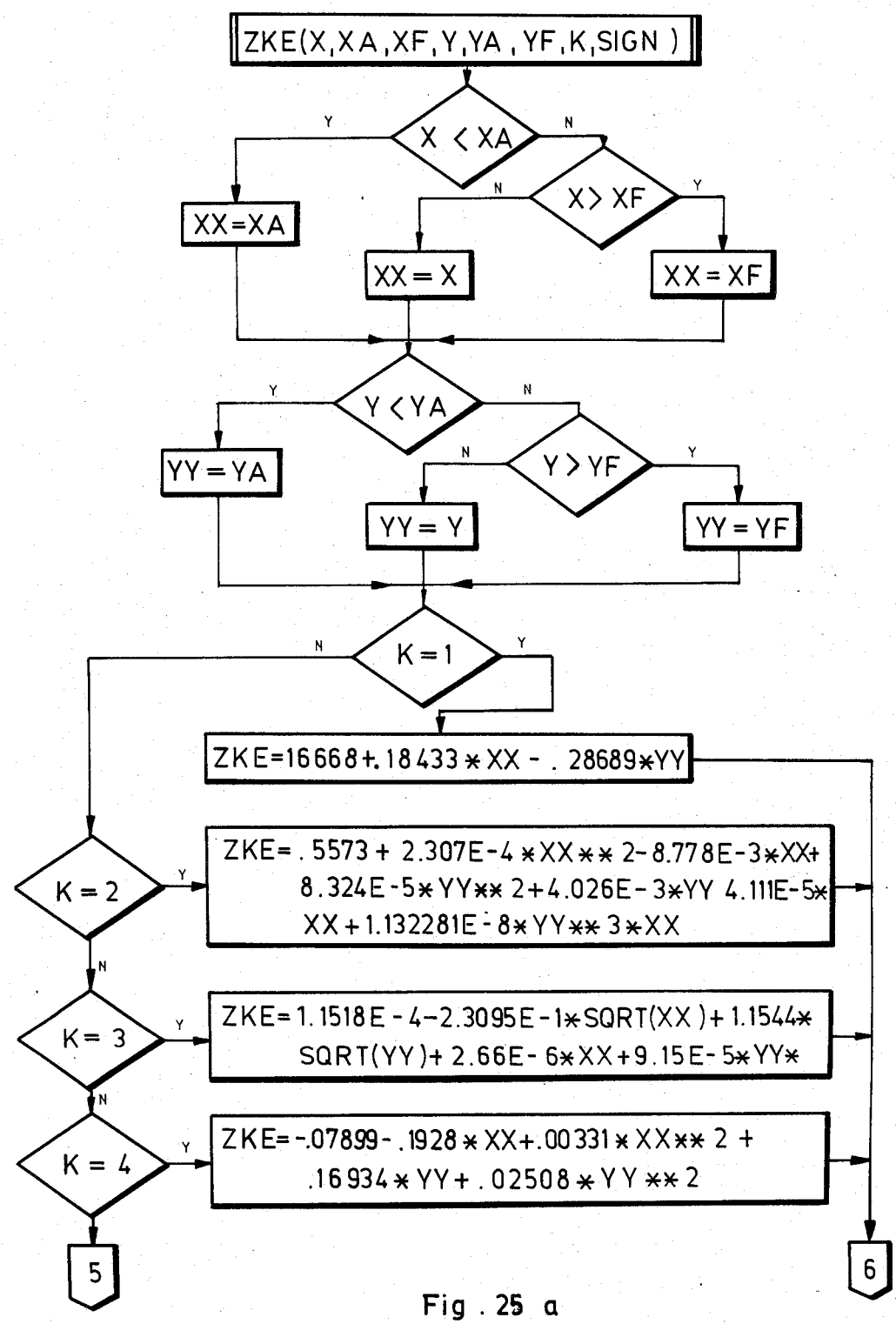
Figure 25:
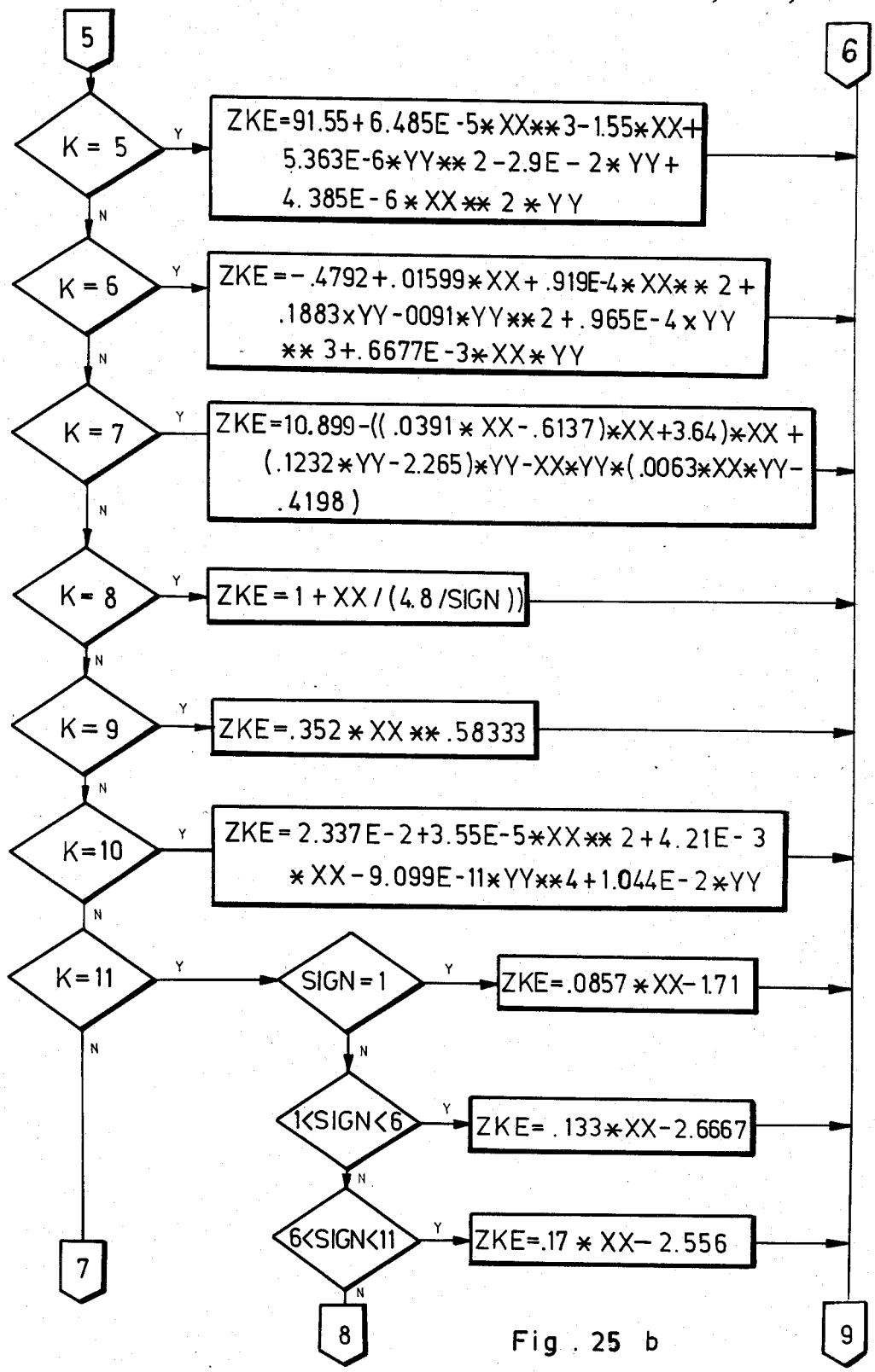
Figure 25:
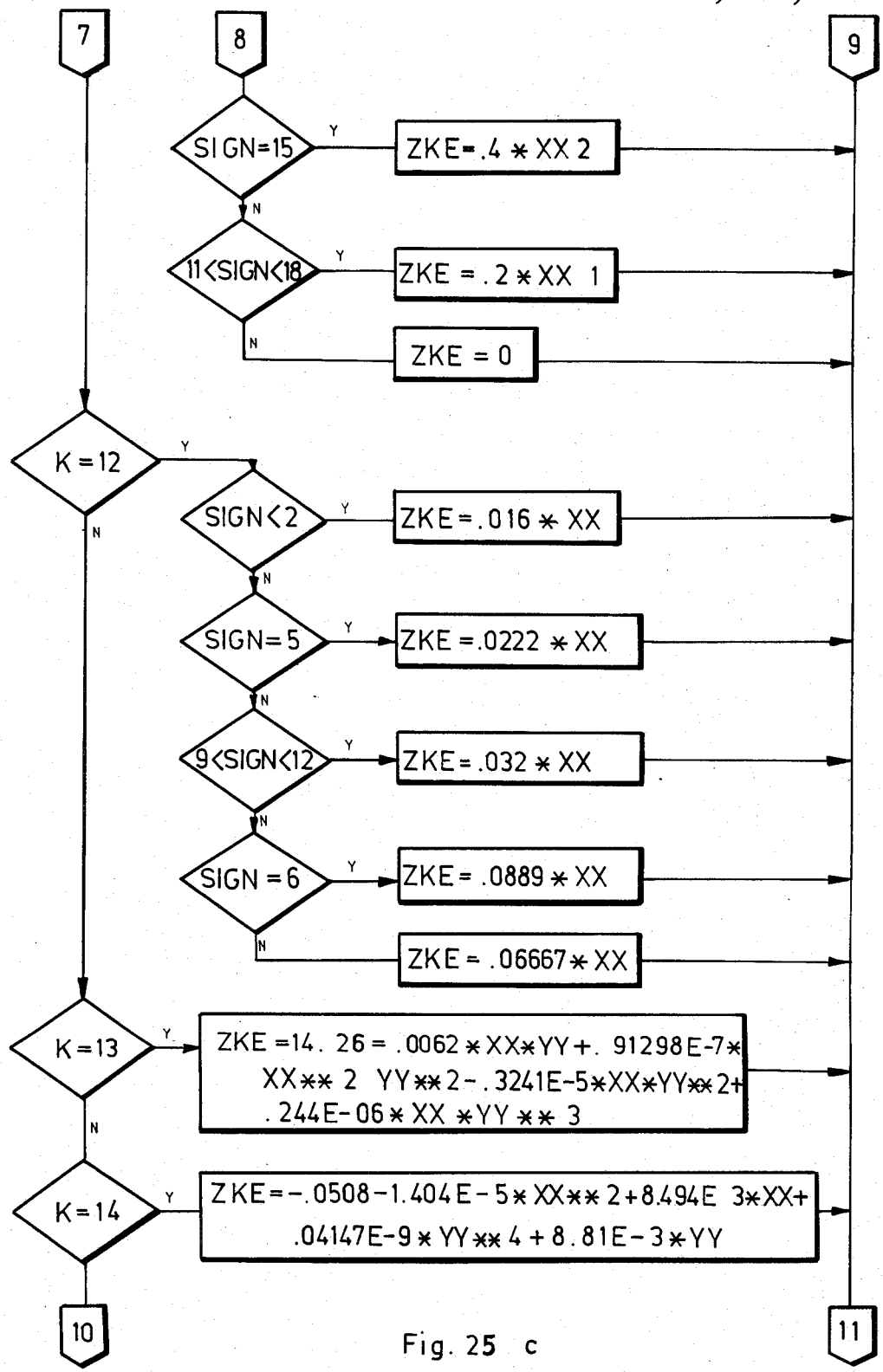
Figure 25:
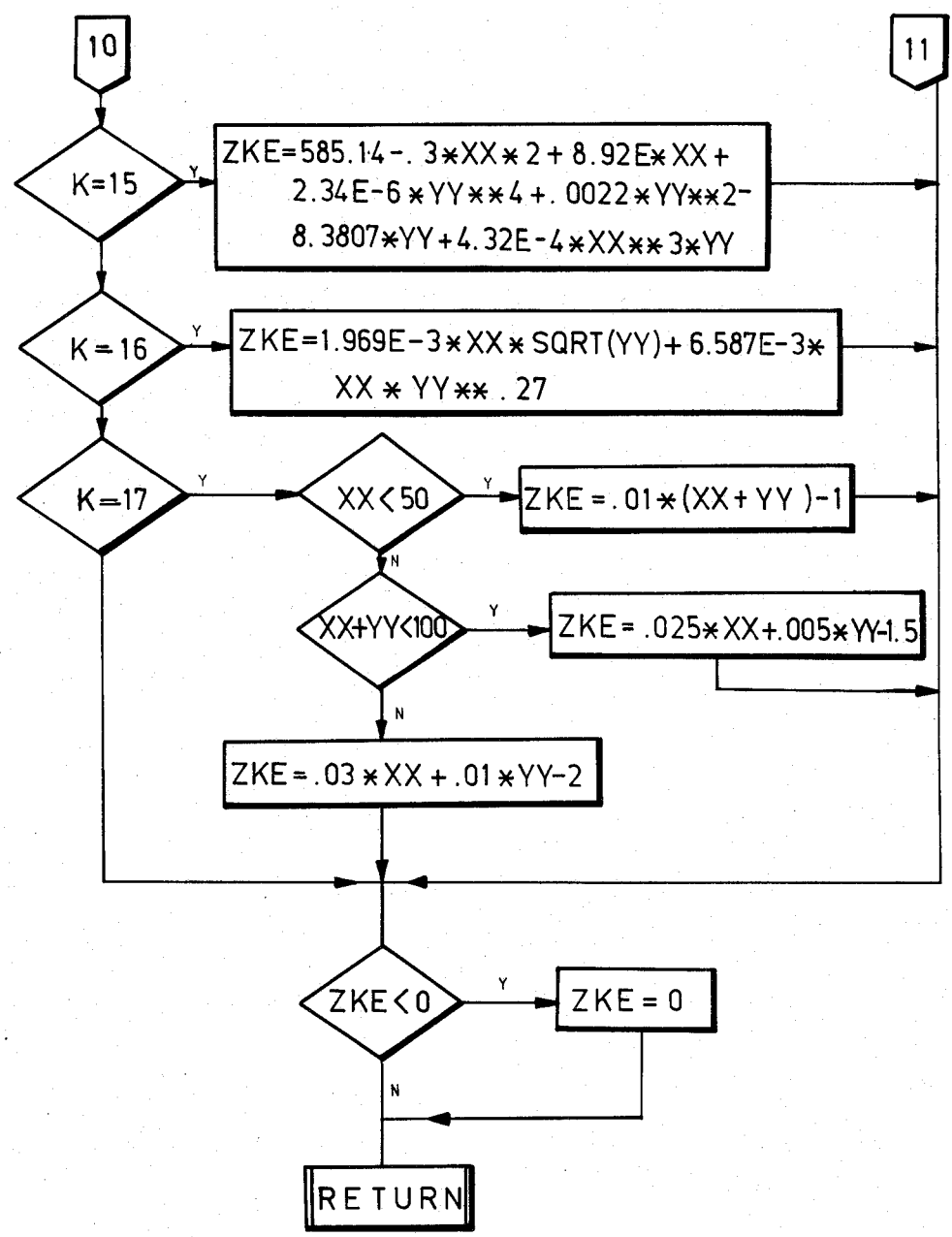

FIG. 25 extends over four sheets of drawing and comprises FIGS. 25/a–d which constitute a flow chart of determination of characteristic Z-values.

DETAILED DESCRIPTION

The apparatus of the invention permits the design and construction of machines, such as agricultural machines, and other vehicles to be described by various parameters and indices in precise numerical fashion for determining objects of the construction. The apparatus of the invention contains electronic elements operating in accordance with predetermined programs incorporating functional relationships and tabulated information, which operation may be accomplished by microprocessors in conjunction with storage and other data-handling equipment.

Figure 1:
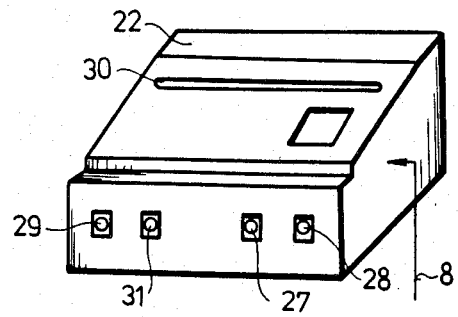
FIG. 1 is a perspective view of a line or character printer connected to apparatus of the invention.
Figure 2:
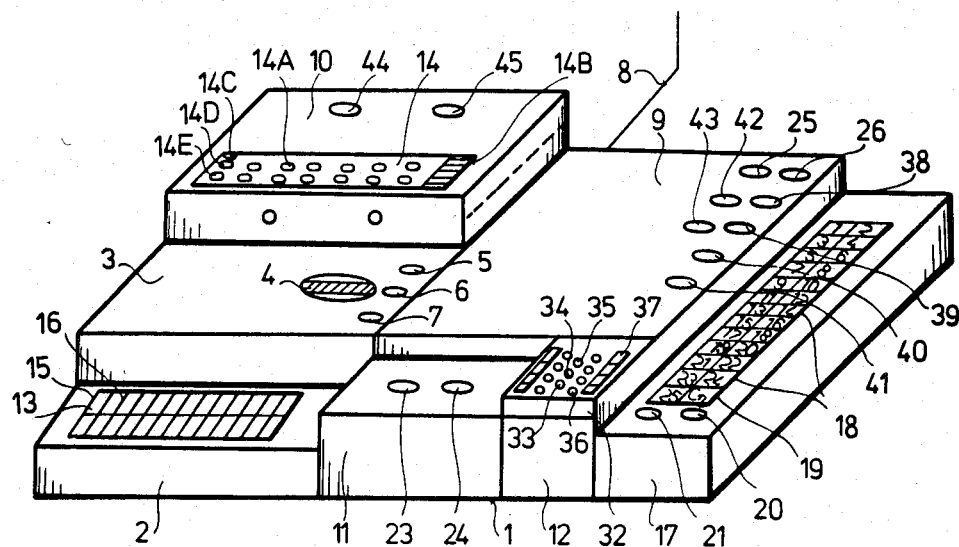
FIG. 2 is a perspective view of the apparatus.
Figure 3:
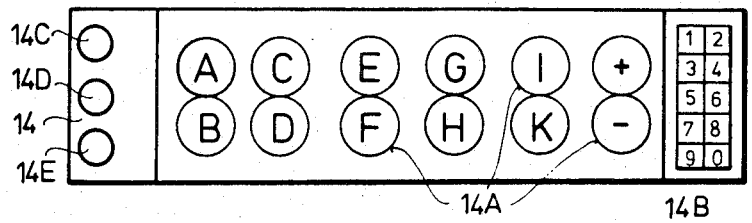
FIG. 3 is a view of the main keyboard.
Figure 4:
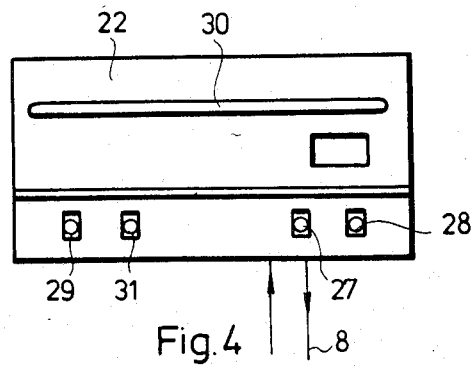
FIG. 4 is a front view of the printer of FIG. 1.

With reference to FIGS. 1–9, the operation and structure of the invention is described now in a general fashion, with further details to be provided herinafter. As is shown in FIG. 2, the apparatus of the invention is enclosed in a comprehensive housing 1 and comprises a parameter base module 2, an analyzer 3, a synthesizing unit 9, a norm storing unit 11, a norm processor 12, a memory 10 and a design module 17. A line or character printer 22 (FIG. 1) is connected to the electronic apparatus.

The operation is accomplished with the aid of equipment incorporated in the apparatus, the equipment including a parameter base module 2 operative with a set of a number, n, (for example, 25) of parameters which characterize the product to be constructed. With respect to such characterization, the product is understood to be similar to a comparable product previously produced, with the characteristics being set forth on a numerical board, and described by electric signals. The equipment further includes an analyzer 3 which performs mathematical correlations among the parameters of the foregoing set. The electrical elements and the microprocessor in cooperation with a processing module 12 interpolate among the data to calculate such ones of the parameters which have not been determined numerically in advance, this being accomplished with the aid of norms and patterns of data which have been previously stored in a storage unit 11. The equipment utilizes a magnetic disk storage memory 10 which is able to receive and store both input parameters as well as values of parameters which have been calculated. In addition, a synthesizing module 9 operates with the input parameters and those subsequently calculated and stored in the memory 10 to develop mathematically correlations among the parameters by a sequence of mathematical steps, the calculated correlations being stored with the stored parameters. The results of these calculations are indicated by electric signals.

The equipment further incorporates an electronic design module 17 which is controlled by microprocessors, and which is able to display the numerical values of the foregoing parameters in accordance with a scheme in which the parameters represent the same quality, quantity and indications as done in the parameter base module 2. Also included is a printer 22, responsive to a microprocessor and the electrical elements of the units 2,3, 11, 12,9, 10, and 17, and being responsive to signals provided by the keys 36 of a keyboard 37 and control switches 38, 39, 40, 41, 42 and 43, for presenting data of the foregoing parameters. By cooperation of the respective tasks of the units 12, 3, 9,17, and 22, the object of the construction based on the display of the parameters and correlations is presented by the display 18 and on sheets 30 imprinted by the printer 22.

The invention is further characterized in that the units 2, 3, 9, 10, 11, and 12 for developing the desired relationships are arranged in a common housing while the printer 22 is disposed in a separate casing. The module 2 which feeds the foregoing n parameters comprises sections containing ten elementary numbers, 1, 2, 3, 4, 5, 6, 7, 8, 9, and 0 as well as a green signal lamp 16 and a keyboard 13 having a key with the marking "+".

It is also noted that in the electrical elements of the analyzer module 3, the module being controlled by microprocessors, the functional values of seventeen mathematical correlations based on a standardized format are provided. Also, the storage unit 11, storing the norms of data used in evaluating the design of the machinery, and the module 12 processing the norms operate on a program based on a standardized format. It is further noted that the memory 10 contains the parameters describing the goal or object of the construction project, and further stores the norms and the mathematical algorithms and programs which are to be fed into the processing module 12 and the synthesizing unit 9 for further processing.

The analyzer 3 is provided with a numerical board 4 for the display of values of the parameters in a standardized format, the analyzer 3 further including switching and key elements 5, 6, and 7 which indicate acceptance, cancellation or correction. The storage unit 11 and the processing module 12 are provided with colored lamps 23 and 24 which indicate the state of readiness for service and operating state, respectively. A data-entry and control block 32 enables the feedback of auxiliary data to the units 11 and 12. A lamp 33 with a red ring indicates a request for further information, an orange lamp 34 indicates safe operation, and a lamp 35 having a green ring which is incorporated into a switch indicates the resultant outputs of the processing module 12. Also included are operative keys 36 for entering commands for the program which has been fed into the processing module 12 as well as keyboard 37 which incorporates a set of the operative keys 36.

Further features in the operation and construction of the invention are as follows. The memory 10 is provided with keys 14B for feeding in numbers 1, 2, 3, 4, 5, 6, 7, 8, 9, and 0 with keys 14A having different letter markings, with a key 14C having a blue lamp for indicating automatic operation, a key 14D associated with a yellow lamp for indicating operational safety, and also a switch 14E associated with a green ring for insuring operation. With respect to the synthesizing unit 9, the mathematical program utilized therewith is suitable for forming the vectorial surfaces function of a machine system, this being accomplished with the aid of the microprocessors, whereby a so-called tendency curve may be calculated as a function of time. In the synthesizing unit 9, there is a lamp 26 associated with a green switch for indicating the operation of the orange lamp 25 in the signalling of readiness for service. Further keys 41 and 42 provide instructions for providing surface functions and a difference of parameter values, respectively, with a key 45 directing the production of the tendency curve. The key 38 controls instructions for the object board, the key 39 directing instructions for the printer 22 to print out the object or goal of the construction, while a key 40 controls the plotting of the tendency curve while the key 41 directs the formation of a surface function representation of the output data.

A further key 44 initiates operation of the apparatus and another key 45 terminates the operation of the apparatus. The module 17 which displays the object of the construction comprises a set of parameter displays and numerical displays corresponding to the parameters fed by the base module 2, the numbers being displayed in four or more digits. There is also a red or blue flashing light 20 indicating failure and a green signal indicating the end of the operation. The apparatus may be activated with alternating or direct current from a dource of electrical power, Alternatively, the source of electric current may be a galvanic element or D.C. batteries. It is also noted that the base module 2, the analyzer 3, the storage unit 11, the processing module 12, the synthesizing unit 9, the memory 10, and the design module 17 may be formed and arranged in such a manner so as to permit their connection and disconnection from the housing 1, and furthermore, they may be exchanged and can also be capable of independent operation.

Figure 6:
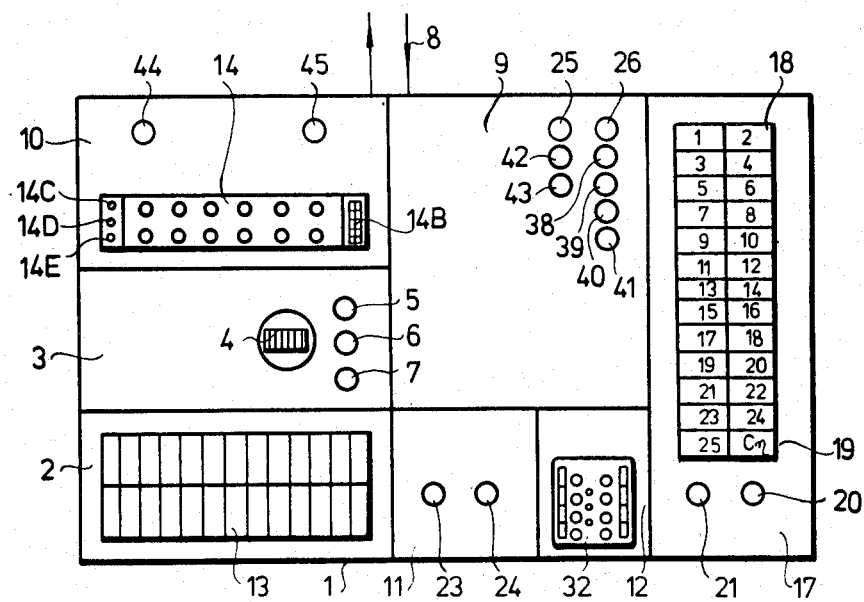
FIG. 6 is a top view of the apparatus.
Figure 7:
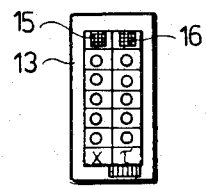
FIG. 7 is a view of the parameter keys.

The apparatus according to the invention operates as follows:

The operator enters numerical values of and features of the selected machines by means of the parameter base module 2 (FIGS. 2, 6). These features and parameters are, by way of example for an agricultural machine the following:

season's length, gross;
grade of characterization;
technical operational reliability;
substituted manual labor power;
quality of work;
specific price;
mass;
independence on weather;
readiness for operation;
required level of stored components;
energy requirement in idle running;
corrosion resistance;
energy requirement during work;
technological operational reliability,
safety of work (prevention of accidents);
output;
width of work;
value of appearance;
season's length (net);
readiness for service;
number of operators,
height;
fineness of processing;
number of the constructional drawing; and
year of manufacture.

The foregoing parameters in proper dimensions are entered by the operator into the apparatus by using the appropriate keys, and the parameters are forwarded into the analyzer 3. In case any of the parameters are not defined by the operator, such situation is indicated by the red signal lamp of the block not pressed, the key 13 (with the marking X) of the key-block corresponding to the missing parameter is to be pressed down (FIG. 6, 7), In this case the apparatus gives a signal for the storage unit 11. This unit contains the value programs of the norm correlations which enable the processing module 12 to select a norm and parameters which are to be calculated with the aid of the effective parameters already fed into the base module 2. This enables the determination of the missing parameter. Accordingly, the storage unit also stores different algorithms for determining the missing values.

Figure 8:
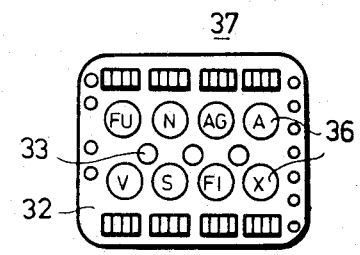
FIG. 8 is a view of the data-entry and control block.

In such case necessary data may be fed by pressing the corresponding keys 36 of the data-entry block 32 (FIGS. 6, 8). By using the keys 36, the numerical values of the various kinds of input data including their norms represented by four-place numbers may be fed into the apparatus.

When the lamp 33 lights up the block 32 of the module 12, the operator feeds the supplementary information into the numerical keys of the keyboard 37.

Illumination of the lamp with the green ring indicates that the supplementary norm values calculated by the module 12 (FIG. 6) can be fed into the memory 10 and the analyzer 3 by pressing down the key X. The lamp 34 (FIG. 8) indicates the operational safety of the module 12 with orange light. After entering all data and parameters into the parameter base module 2, which entry is indicated by the light of all the green lamps of number n, the analyzer 3 begins processing and calculates the required functions, which in the case of agricultural machines comprises the seventeen correlation functions.

By means of the values of the parameters fed into the apparatus and by the aid of the function recorded therein, the analyzer 3 calculates a characteristic value designated by $C\eta$ based on a related machine, and displays the value on the board 4. The value can also be forwarded to the printer 22 (FIGS. 1, 4) and the synthesizing unit 9. The synthesizing unit 9 performs integration, analysis, and synthesis with the corresponding characteristic values of the proposed machine, and forwards the values obtained into the central memory 10, as well as to the units 17 and 22 of the apparatus.

By repeating this process, the operator obtains the individual values for the utilization of several or more machines by entering the requisite data into the synthesizing module 9 and the memory 10. The process is implemented by means of the keys designated A-C-E-G-I-B-D-F-H-K $+/-/$ located on the board 14 (FIGS. 2, 3, 6) for commanding the following procedures:

A recording
B correction
C cancellation
D change of the routine
E summing up with the value indicated on F
G directing outputs towards the specific units of the apparatus.

The purpose of the repetition of the process is the calculation by the apparatus of individual values of $C\eta$ for several machines. The values obtained are forwarded to the synthesizing unit 9 by pressing the key 7. The synthesizing unit 9, if it is in an unloaded state, indicates, via the orange lamp 25, a state of readiness for operation. The lamp 24 with the green ring indicates that the synthesizing unit 9 is performing synthesis. The middle part of the ring of lamp 26 is formed by a press-button; when the operator presses down said button, the $C\eta$ values which were introduced into the synthesizing unit 9 via the key 7 are synthesized and evaluated.

Figure 5:
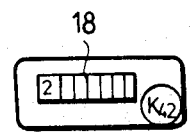
FIG. 5 is a view of a digital display.
Figure 10:
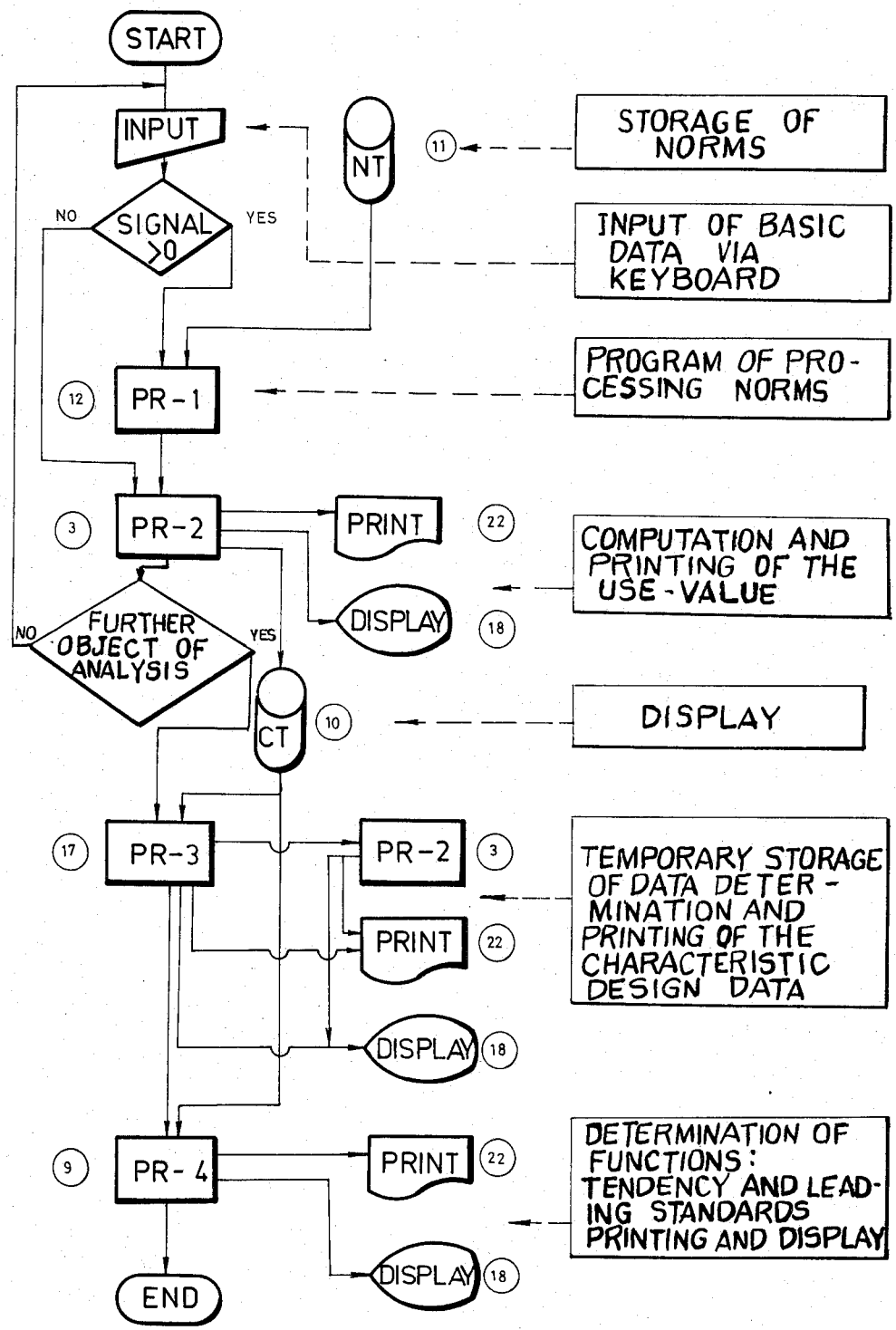
FIG. 10 is a flow chart describing operations of modules, and basic programs of the apparatus.

Synthesis is performed by the synthesizing unit 9 activated by a microprocessor, in accordance with the predetermined program having a multistage process, as shown in FIG. 10. The single steps are actuated by the keys 38–43, in the following manner:

The actuation of the key 38 applies the instruction, for the parameters of the machine to be designed for the given year. The resulting output of the synthesis is displayed numerically on the design module 17, as well as on the digital display 18 (FIGS. 2, 5, 6).

By actuating the key 39, the instruction is given for the appearance of the parameters for the given year on the printer 22.

The key 40 gives the instruction that a tendency curve C, a function of time, and the use-value should appear on the printer 22.

The key 41 gives the instruction for the synthesizing unit 9 to form the surface function of leading standards defined by all values $C\eta$ and to print it numerically by the printer.

The key 42 gives the instruction for the printer to print digitally the differences between the single values and the evaluating surface function for all the machines, in absolute and relative values.

The key 43 instructs the printer 22 to print the numerical values of the $C\eta$ tendency curve for the period of time between the years 1930 and 1985, by way of example.

In such manner the task set for the apparatus can be acheived. A single operator is able to perform several thousands of calculations within one hour, while the apparatus is producing the numerical values, which are to be set as a goal for the construction of the machine. The apparatus is put into operation by pressing the main switch 44, while it is put out of service by pressing the button 45.

Further details on the construction and operation will now be provided with reference to further ones of the drawing figures.

The parameter base module 2 is the central unit of the device and comprises a microprocessor 56; the analyzer 3 comprises an arithmetic processor 62. Other elements not indicated on the drawings do not require a detailed description for an understanding of the invention.

Figure 9:
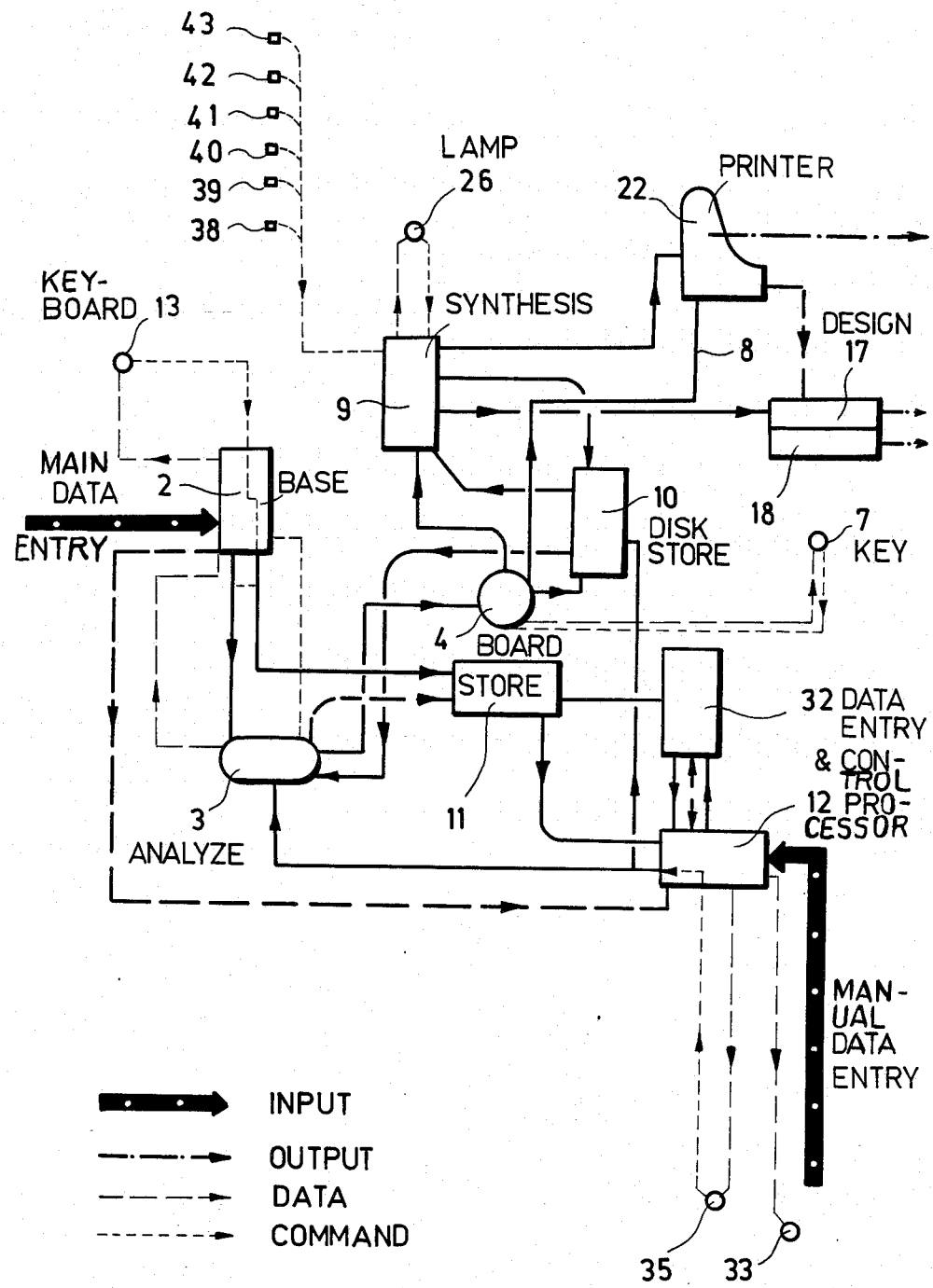
FIG. 9 is a schematic diagram of the logical connections of the apparatus according to the invention.

FIG. 9 illustrates the main logical interconnections within the device, giving an overall understanding of the functions of the apparatus of the invention.

The thick line (Input) indicates that entering information arrives at the parameter base module 2 and at processing module 12. The logical sequence of operations is shown by a flow of arrows in FIG. 9, which flow (as this is a logical-sequence block diagram) differs from the hardware block diagrams to be shown in FIGS. 11 to 14b. Nevertheless, the operation set forth in FIG. 9 conforms to that of the hardware shown in FIGS. 11-14b. The design module 17 presents the final results of all the calculations, namely the main design characteristic of a new machine or equipment. In the block diagram of FIG. 9 broken and continuous thin lines indicate the intermediary data of internal logical functions determined by the program.

FIG. 10 discloses a flow in chart for identification of modules and programs of the apparatus of this invention, the chart describing the following operational steps.

After reading in the input data, replacement of missing parameters will take place, the parameters being then generated by normalization of other data and parameters. After this and by using the parameters thus established, the device will display (on screen on printer 22 as desired) the coefficients of a tendency function and of the leading standards, having determined, displayed and stored previously the use-values. The possibility of determining and displaying the characteristics of a unit to be designed exists, too. The replacement of missing parameters by normalization of data based on practice and experience will ensure that the analysis can be performed in each case.

FIGS. 11-15 show the components of the microprocessors and various units of the apparatus of FIG. 2, including their interconnections. The details of the construction of the invention as set forth in FIGS. 11-15 will now be described.

Figure 11:
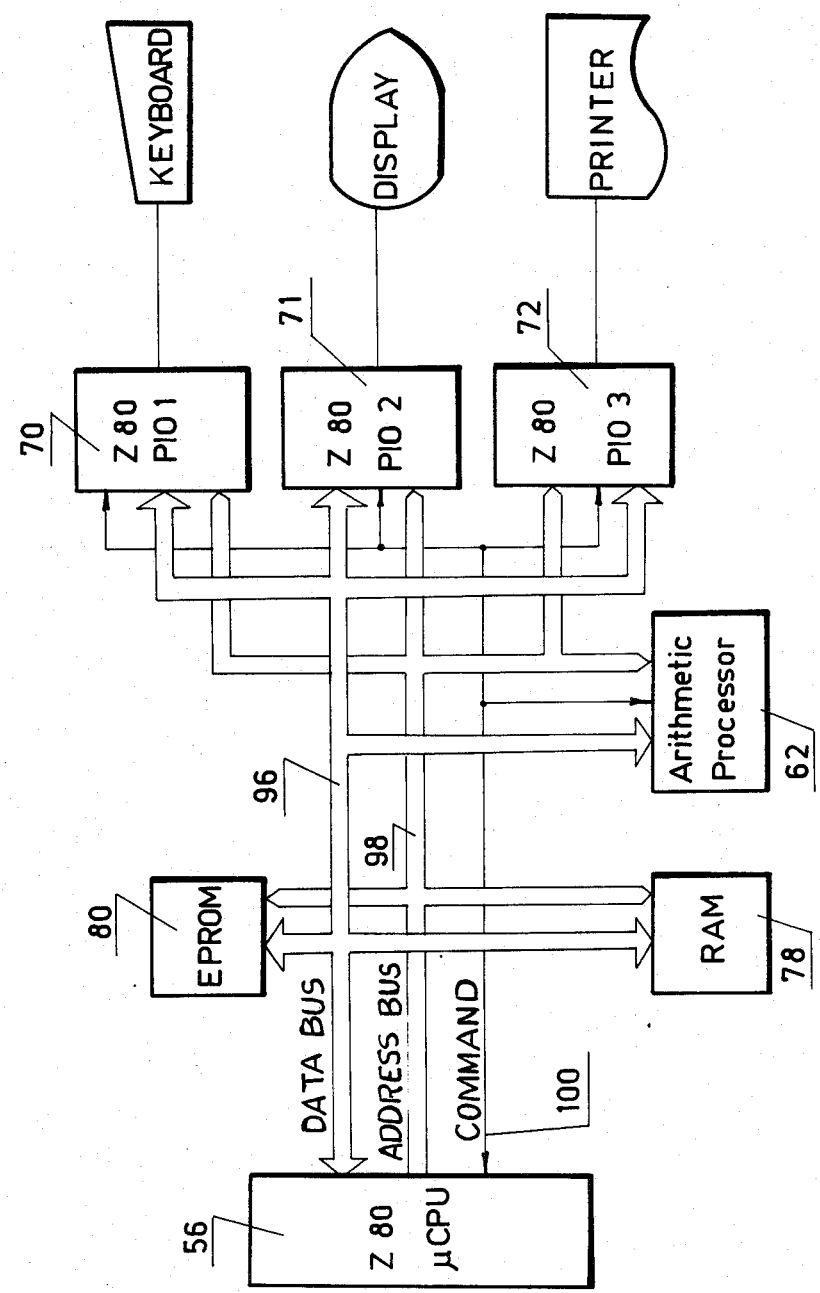
FIG. 11 is a schematic view of the construction of the apparatus.

FIG. 11 shows the essential set-up of the device. A microprocessor 56, such as the commercially available tye Z80, is used for controlling the system's operation. The microprocessor 56 interprets the commands, addresses the memory locations, and controls the peripheral units. Connections are made by eight data bus lines 96 designed D∅ to D7, sixteen address bus lines 98 designated A∅ to A15 and fourteen command lines 100. The data bus lines 96 shift the memory contents between the individual subunits. The program is burnt-in in an EPROM memory element 80 comprising a RAM section 78, this program effects—by using the subunits of the device—the determination of use-values searched. The RAM section 78 accomodates the working (operational) storage elements while the program is running. Input data (the parameters) are read into these, and the program deposits output data here, too, so they can be recalled from here if required.

The address bus lines 98 and the data bus lines 96 are connected to the EPROM element 80 and RAM element 78 to arithmetic microprocessor 62, and to peripheral interfaces 70, 71 and 72 of e.g. connected RAM element 78 to the arithmetic Z80 PI01 and Z80 PI03 type, respectively. The command lines 100 serve for controlling the entire device.

System control is effected by the symbols $\overline{M1}$, $\overline{MREQ}$, $\overline{IORQ}$, $\overline{RD}$, $\overline{WR}$, $\overline{RFSH}$, while the symbols $\overline{HALT}$, $\overline{WAIT}$, $\overline{INT}$, $\overline{NMI}$, $\overline{RESET}$ are used for controlling the CPU. $\overline{BUS}$ lines are controlled by the symbols $\overline{BUSRQ}$ and $\overline{BUSAK}$. The command lines 100 run to the microprocessor 62 and to the peripheral interfaces 71, 70 and 72.

On the address bus lines 98 the microprocessor 56 selects those addresses which correspond to program steps in the EPROM 80 and to memory addresses in the RAM 78, and it will also select the peripherals 70, 71, 72, which should become effective. The data bus 96 and the address bus lines 98 are directly connected to the arithmetic microprocessor 62. The arithmetic microprocessor 62 performs those mathematical operations which are selected by the program for the proper calculation of the algorithm. The command lines ensure the joint working of the individual subunits. Command impulses originate in the microprocessor 56 and terminate there, as well:

For entering input data keys are to be used. Visualization of intermediary and final results of computation is effected by a display. For printing the results in tabular forms, for printing and plotting the functions determined, the printer 22 can be used.

FIG. 12 shows the circuit plan of two subunits. The device's clock generator (FIG. 12/a) comprises a quartz crystal oscillator 108 generating a circuitry basic signal of 12 MHz frequency and an output inverter 114. The quartz crystal oscillator 108 is connected to a output of an inverter 104 and to the input of another inverter 102 both connected to a 1.5 nF condenser 103. Parallel to inverters 102 and 104 there are two 330 ohm resistors 106. The common point of the oscillator 108 and the inverter 104 is connected to the input of an inverter 110, the output of which is connected to the jointed inputs 01 and 014 of an BCD counter 112 e.g. of 7492 type. Outputs 06, 07, and 010 of the BCD counter 112 are connected to ground. The BCD counter 112 is connected to the input of another inverter 114, the output of which is connected to the collector of a transistor 116 of N2905 type. The emitter of the transistor 116 is connected to voltage +5 V. Between the emitter and the base of the transistor 116 and between the base and the input of inverter 114 there are two resistors connected in series.

The output signal of the inverter 110 is brought to the BCD counter 112 acting as divider, which by dividing into two provides on its output 3Q, 6 MHz signals and then, by dividing into three, 2 MHz signals on output Q. For purposes of separation and signal shaping, the output of the BCD counter is connected to the inverter 114 and thereby to the transistor 116 for carrying out signal shaping.

The task of the power supply unit (FIG. 12/b) is to generate stabilized direct current at voltages of ±5 V and ±12 V, wherein +5 V serves to energize the integrated circuits. Current surges are attenuated by an inductance 118. The arithmetic processor 62 requires (FIG. 11) +12 V DC voltage which can be supplied by this same circuitry.

The basis of this unit is an integrated supply circuit 120, preferably of μA 78 SKØ type. The outputs i13 and i14 are connected to a resistor and the output i13 is connected to the +5 V DC power supply. Output i14 is connected in series with the inductance 118, with a 47 μF condenser 121, and with the cathode side of a diode 105. The anode of the diode 105 supplies the −5 V DC-power for further units. The output terminals i9 and i8 of the circuit 120 are joined and led to ground, via a 22 μF capacitor 123 while output terminal i10 goes via an RC-element to the ground, and also provides, through another RC element, the +12 V voltage. A back-biased protective diode 107 is connected between this source of 12 V and the inductance 118. The output terminal i11 of the circuit 120 is directly on the ground. The output terminal i12 is grounded via 1 μF capacitor 119. Output terminal i3 is connected both to the base of the transistor 122 and via a 120 ohm resistor 127 to the ground. The emitter of the transistor 122 is connected to ground, while its collector is connected to the inductance 118. Between the emitter and the collector of the transistor 122 there is a diode connected in forward direction. The cathode of the diode 107 is connected to a series of condensers 124.

FIG. 13 shows the keyboard's switching arrangements (FIG. 13/a) and an LED indicator. The +5 V voltage originates from the power supply unit of FIG. 12/b. The keys are of the Hall generator type.

The keyboard has two outputs and a total of 24 keys. There are numeral and function keys only. One of the outputs of keys signed by 7, 6, 5, 4, 3, 2, 1, Ø is connected to the encoding DØ output of an encoder circuit 126. One of the outputs of keys signed by NAT, TN, DY, PR, NT, IN, 9 and 8 is connected to the D1 output terminal of the circuit 126, while the keys signed by PAS, Cη, RES, ST, GO, MEM, ",", "." have one of their outputs connected to the D2 output terminal of the circuit 126. The other outputs of these keys are connected in groups of three keys, as shown in FIG. 13/a, to respective outputs D7 . . . DØ of an encoder 125, e.g. of type 74LS151. On the other side outputs of keys are connected—via a 1 kOhm resistor 129 to +5 V voltage source. Signals BØ, B1, B2, B6 arriving from the CPU microprocessor 56 as shown in FIG. 14 and originally select the vertical coordinates of the keys, aided by the encoding circuit 125, while signals B3, B4 and B5 also arriving from the microprocessor 56 select the horizontal coordinates of the keys, aided by the encoding circuit 126 which may be also of 74LC151 type.

Errors occuring are indicated by a LED 101 (FIG. 13/b). The LED's control comes from a circuit of FIG. 14 in form of signals DØ, D2, and D7, via an OR circuit 99. The diode's cathode is connected to the ground, through a resistor 97.

FIG. 14 shows the structural interconnections of the microprocessor 56 and of the arithmetic processor 62. Signals of the microprocessor 56 include sixteen ADDRESS lines, designated AØ to A15. Due to weak power, the signals cannot be used directly and must be led through inverters 58. Address lines AØ to A15 are connected to the inverters 58. Following the inverters 58, the signals have new designations as BAØ to BA15.

The output signals of the inverters 58 are as follows:

BAØ is connected to the C/O input of the arithmetic processor 62 and to the AØ inputs (a total of 12 inputs) of the storage units shown in FIG. 14/b.

BA1 is connected to input A of an encoding circuit 60, and to the total of twelve A1-inputs of storage units shown in FIG. 14/b.

BA2 is connected to input B of the encoding circuit 60, and to all A2-inputs of storage units shown in FIG. 14/b.

BA3 is connected to input C of the encoding circuit 60, to all A3-inputs of storage units shown in FIG. 14/b, and to inputs A of a circuit 76 e.g. of 74LS138 type shown in FIG. 14/a.

BA4 is connected to all A4-inputs of storage units shown in FIG. 14/b, and to inputs B of the circuit 76 shown in FIG. 14/a.

BA5 is connected to input G2B of the encoding circuit 60 to all A5-inputs of storage units shown in FIG. 14/b, and to inputs C of the circuitry 76 shown in FIG. 14/a.

BA6 is connected to input G2A of the encoding circuit 60 to all A6-inputs of storage units shown in FIG. 14/b, and to input G2A of the circuitry 76 shown in FIG. 14/a.

BA7 is connected to input G1 of the encoding circuit 60, to all A7-inputs of storage units shown in FIG. 14/b.

BA8 is connected to all A8-inputs of the storage units shown in FIG. 14/b.

BA9 is connected to all A9-inputs of storage units shown in FIG. 14/b.

BA10 is connected to all A10-inputs of storage units shown in FIG. 14/b.

BA11 is connected to inputs B of a circuit 82 and to inputs A of a circuit 84, shown in FIG. 14/b.

BA12 is connected to point C of the circuits 82 and 84 shown in FIG. 14/b.

BA13 is connected to input G1 of the circuit 82 and to input G2A of the circuitry 84 shown in FIG. 14/b.

BA14 is connected to the input of the AND-gate 88 shown in FIG. 14/b.

BA15 is connected to the input of the AND-gate 88 shown in FIG. 14/b.

In addition, signals AØ to A7 serve for addressing interface circuits of the peripherals 70, 71, 72 shown in FIG. 14/a.

Signals A∅ to A7 of the microprocessor 56 are connected according to FIG. 14/a to the lines of signals A∅ to A7 of the perpherals 70, 71, 72.

Signals BA3, BA4, BA5 and BA6 serve for definite selection of circuits 76 for the range CE1 to CE5.

Signals BA1, BA2, BA3, BA5, BA6, BA7 proceed to the encoding circuit 60 shown on this same figure, and thereby the arithmetic processor 62 is selected. Address signals BA∅ to BA15 will control the addresses of memory units shown in FIG. 14/b. Signal BA∅ determines directly whether an instruction or data will follow for the arithmetic processor 62.

Data lines D∅ to D7 create direct connections to the arithmetic processor 62 shown in FIG. 14.

As data lines (or a data bus), D∅ to D7 are connected to peripheral interfaces 70, 71 and 72 as shown in FIG. 14/a and to the storage units shown in FIG. 14/b.

The lines D∅ . . . D7, respectively, are connected to following output terminals: DB∅ . . . DB7 of the arithmetic microprocessor 62, D∅ . . . D7 of the circuits of peripherals 70, 71, 72, shown in FIG. 14/a, D∅ . . . D7 of the EPROM element 80 as shown in FIG. 14/b, and DQ∅ . . . DQ7 of the RAM element 78.

Passing through an inverter 58, signal M1 acquires the new designation of BM1 and controls at the M1-inputs the interface circuits of peripherals 70, 71, 72 shown in FIG. 14/b. The signal $\overline{IORQ}$, on the one hand, puts to stand-by the writing $\overline{WR}$ and reading $\overline{RD}$ functions of the arithmetic processor 62, after passing through encoder 64, on the other hand it goes to the input $\overline{G}$ of the encoder 64 in response to the $\overline{RD}$ and $\overline{WR}$ control signals of the microprocessor 56. The signal $\overline{RD}$ passes to the B-input of the encoder 54 and to the input of the inverter 58, and the signal $\overline{WR}$ passes to the A-input of the encoder 64 and to the input of the inverter 58.

Clock signal Q arrives from the clock generator (FIG. 12), from the inverter 114. As CLK clock signal this same signal is gated through an inverter 66. CLK is the timing signal (pulse) for the arithmetic processor 62.

The RESET signal puts each of the circuits to its basic state. The RESET signal originates at the RES key shown in FIG. 13. The $\overline{WAIT}$ signal is processed in the circuit shown in FIG. 14. It has a relationship with the $\overline{PAUSE}$ signal of the arithmetic processor 62 and is connected to it.

The $\overline{INT}$ signal has a relationship with the $\overline{END}$ output shown in FIG. 14, which indicates the termination of operations in the arithmetic processor 62 and is connected to the circuitry thereof. The $\overline{INT}$ signal has a further connection with interface circuits of the peripherals 70, 71, and 72 connected to their INT-inputs.

As shown in FIG. 14/a the CE1, CE2, CE3 signals produced by an encoding circuit, such as 74LS138 type, are connected to signals CE1, CE2, CE3 of the peripherals 72, 70, 71, respectively.

The E-signal of gate 74 is connected to the E-signal of the peripheral 70 and the IE11-signal is connected to the IE11-signal of peripheral 72. As shown in FIG. 12, the output of the inverter 114 is connected to the Q-signal of the peripherals 70, 71, and 72, all three shown in FIG. 14/a.

In FIG. 14 the $\overline{RD}$-signal of the microprocessor 56 is connected to the RD-signal of peripherals 70, 71, and 72, all three shown in FIG. 14/a.

FIG. 15 shows the interconnections of the microprocessor 56, the arithmetic processor 62, the EPROM element 80, containing the program and the RAM element 78 which serves as working storage (accumulator).

The operation of the microprocessor 56 and the arithmetic processor 62 will now be explained with reference to the flow charts of FIGS. 16-25.

FIG. 16: After entering the parameters of the machine to be assessed, the $C\eta$ (also referred to as C-eta) program (FIG. 23) will compute the value of C-eta, the output being the C-eta, the x, y, z and $N^o$ values which are loaded into the storage and are printed by the printer.

FIG. 17: After START, the TEND program processes the basic data available in the storage (C-eta, $x_i$, $y_i$, $z_i$, $N^o_i$) and compute the tendency function (FIG. 18), the output being parameters m1 to m6.

After checking, a further TEND-computation produces the final values for the m1 to m6 parameters.

Using the m1 to m6 parameters and the "n", "x", "y", "C" values, the NAT program (FIG. 19) calculates the required characteristic values.

In FIG. 18—the subroutine for determining tendency functions, which—by using function F—produces the correlation coefficients for 13 probability variables, and—aided by the SORT routine—sorts these according to their absolute value. The probability variables corresponding to the 6 highest values thus obtained will form the basis for an EG-routine in producing the coefficients m1 to m6.

In FIG. 19—the subroutine for determining the function of leading parameters, will—by using function G—produce the correlation coefficients of the 13 probability variables, and—aided by the SORT routine—sorts these according to their absolute value. The probability variables corresponding to the 6 highest values thus obtained will form the basis for the EG-routine in producing the coefficients m1, m2 . . . m6.

In FIG. 20—the subroutine for determining the coefficients of the regression function helps in producing a C matrix, and using this, in determining a D matrix, which is promptly inverted. After this, the quotients of corresponding matrix elements will provide the coefficients of regression.

In FIG. 21, use is made of the function G which is designed for producing functions of two variables. The G function is used to produce the probability variables required for determining the two-dimension function of leading standards. The basis for performance of this function is provided by the value of a parameters j changing from 1 to 13.

In FIG. 22, with function F designed for producing functions of one variable, it is possible to produce the probability variables required for determining the tendency function. Basis for doing this will be provided by the value of a parameter j changing from 1 to 13.

FIG. 23 shows a routine for determing C-eta use-value. On the basis of appropriate input data, the routine determines the corresponding elements of matrix A having four columns. The first column of matrix A contains the parameters arranged according to an appropriate system, while the elements X of the second column of the matrix can be obtained from the first column by using the XYKE-functions. A third column of the matrix having elements Y is produced by multiple application of the XYKE-function and finally, the fourth column having elements Z is obtained by using the ZKE-function. Thereafter, upon summing the elements X, Y, and Z in each of the respective second, third, and fourth columns of the matrix, the coordinates of the vector of use-value are obtained. The absolute value of this vector gives the C-eta use-value. This subroutine comes to halt after displaying the results.

FIG. 24 describes a routine for the limitation of the X and Y values. On the basis of parameters this function produces the boundary values of X or Y.

FIG. 25 describes a routine for determining values of Z. On the basis of (k)-parameters and of the SIGN parameter the routine produces the Z coordinate for the components of the utility value's vector, based on a set of theoretically supported relationships. The result obtained is already corrected according to the foregoing boundary value. The program compiled in accordance with the method described in FIGS. 18 to 25 will completely execute the operations disclosed in FIG. 10. Results obtained are displayed on the screen, and will also be printed if required. The program's machine code list may be found in the attached appendix.

With reference again to FIGS. 11–15, the block diagrams describe generally the operation of the device of the invention. Primary control for the device's operation comes from the microprocessor (such as the commercially available type Z80) 56 which serves as CPU. This CPU is provided as an 8-bit, 40-pin IC-capsule. Power requirements: maximum 1000 mW. Operating voltage: +5 V. Maximum clock signal frequency is 4 MH$_z$. Set of instructions is as follows.

| Inner registers of the CPU: | | | | | | | |
|---|---|---|---|---|---|---|---|
| Main register block | | | | Auxiliary register block | | | |
| A | 8 | F | 8 | A' | 8 | F' | 8 |
| B | 8 | C | 8 | B' | 8 | C' | 8 |
| D | 8 | E | 8 | D' | 8 | E' | 8 |
| H | 8 | L | 8 | H' | 8 | L' | 8 |
| I | 8 | | | R | 7 | | |
| I X | | | | 16 | | | |
| I Y | | | | 16 | | | |
| S P | | | | 16 | | | |
| P C | | | | 16 | | | |

General purpose registers

Special purpose registers

The register block consists of two parts:
 the block of general purpose registers
 the block of special purpose registers
The block of general purpose registers is further divided into two sections, the block of main registers and the block of auxiliary registers. Operations can be directly performed only by the main registers, however the contents of the registers (both main and auxiliary) can be exchanged for each other by way of an instruction.
A and A' accumulator (8-bit)
F and F' marker bits (8-bit)
B, B', C, C', D, D', E, E', H, H', L, L' are 8-bit general purpose registers The B, C; D, E and H, L pair of registers can also be used as 16-bit registers.
I—IT register of sheet address (8-bit)
R—Refresh register (7-bit)
IX; IY—Index register (16-bit)
SP—Stack pointer register (16-bit)
PC—Program counter (16-bit)

In the second IT mode the I-register will provide—after accepting the IT—the address bit of the upper 8 digit position memory of the address to be performed. The Refresh Register holds the actual refresh storage address which will be incremented in all instruction demand (recall) cycles. The Index Registers hold the basic address of the usual index register addressing.

The general purpose registers will be used for temporary storage of instruction and data addresses when performing mathematical operations.

The microprocessor 56 communicates with its environment by the address bus 98, the data bus 96 and the command lines 100.

The address bus lines 98 are tri-state output terminals with an active high level; in case of memory writing and reading the A$\emptyset$ to A15 lines will establish the actual address of the memory.

In the refresh cycle the A$\emptyset$ to A6 lines establish the actual refresh address.

In periphery addressing the A$\emptyset$ to A7 lines become effective in selecting activity in the arithmetic microprocessor 62. For this activity selection, the separate encoding circuit 60 can be used.

The control pulses of the microprocessor 56 are as follows (FIGS. 14, 14/a, 14/b):

If $\overline{\text{BUSAK}}=\emptyset$, the lines A$\emptyset$ to A15 will have a high impedance (floating state).

The data bus lines 96 are two-way tri-state data lines with an active high level. When $\overline{\text{RD}}=\emptyset$ or if reading an IT-vector, then the bus has an input state, and when $\overline{\text{WR}}=\emptyset$, then an output state; and if $\overline{\text{BUSAK}}=\emptyset$, then it has a high-impedance floating state. The data bus is connected to all programmable units, i.e. the EPROM element 80, RAM element 78, arithmetic microprocessor 62 and peripherals 70, 71, 72, storage units excepted, because the program instructions in addition to data traffic travel along these lines to the units.

The command lines 100 forward from the microprocessor 56 the required operation commands for the controlable units connected to it (peripherals 70, 71, 72 and arithmetic microprocessor 62).

M1 (machine cycle 1): Output on an active low level (40 W).

When machine instruction codes are recalled and when an IT is acknowledged, then M1=$\emptyset$.

$\overline{\text{MREQ}}$ (request for memory): Tri-state output on an active low level. Its active state with $\overline{\text{MREQ}}=\emptyset$ indicates that the address lines 98 can effect reading or writing of memories; the third state is activated also by $\overline{\text{BUSAK}}=\emptyset$.

$\overline{\text{IORQ}}$ (request for input-output): Tri-state output on an active low level. Its active state $\overline{\text{IORQ}}=\emptyset$ indicates that the I/O addresses are effective. $\overline{\text{IORQ}}=\emptyset$ and M1=$\emptyset$ indicates IT-acknowledgement.

$\overline{\text{WR}}$: Tri-state output on an active low level. Its active state with $\overline{\text{WR}}=\emptyset$ indicates that the data to be transferred into the memory or to the periphery are effective on the data line of the microprocessor 56.

$\overline{\text{RFSH}}$ (refreshing): Output with active low level. Its active state with $\overline{\text{RFSH}}=\emptyset$ indicates that on the bottom 7 address lines 98 of the microprocessor 92 the memory refreshing address is effective. In the second half of each M1-cycle it has an active state (the 7 bottom address bits are incremented for each M1-cycle).

$\overline{\text{HALT}}$: Output with active low level. Its active state $\overline{\text{HALT}}=\emptyset$ indicates that the microprocessor 56 performs a HALT-instruction. From this state restart of the microprocessor 56 can be effected by a break request or a HW-Reset ($\overline{\text{RESET}}=\emptyset$). The HALT state of the microprocessor 56 is "dynamic" which means that in the HALT state the microprocessor 56 performs a separate cycle for the duration of refresh.

$\overline{\text{WAIT}}$ (waiting): Input with active low level. Its active state with $\overline{\text{WAIT}}=\emptyset$ may indicate that the storage or the peripheral unit is not ready and requests some waiting from the microprocessor 56. Sampling of the $\overline{\text{WAIT}}$ signal is done in each T2-step at the $\emptyset$ diminishing edge. The $\overline{\text{WAIT}}$ input can be used for synchronizing the microprocessor 56 with slow memories and periphery units.

$\overline{\text{INT}}$ (request for interruption): Input with active low level. Its active state $\overline{\text{INT}}=\emptyset$ generates a request for interruption, if the IT-request is permitted and if $\overline{\text{BUSRQ}}$ is inactive. Acceptance of an IT-request is indicated by the microprocessor 56 by displaying the signal combination of $\overline{\text{IORQ}}=\emptyset$ for the unit requesting for the IT.

$\overline{\text{RD}}$ (reading): Tri-state output with active low level. Its active state $\overline{\text{RD}}=\emptyset$ indicates, that the microprocessor 56 is ready to read data from the memory or from the I/O unit.

$\overline{\text{NMI}}$ (request for a non-masking interruption): Diminishing active input. It has higher priority than $\overline{\text{INT}}$ and cannot be prohibited by way of software. It makes the microprocessor 56 to perform an automatic restart instruction for the $\emptyset\emptyset66$ address.

$\overline{\text{RESET}}$: Input with active low level. By pushing the RES key the normal (i.e. starting) position will be established. This key must not be activated while the program is running except in case of disturbances that cannot otherwise be remedied. Effects of RESET:
1. Erasing program counter
2. Prohibiting the IT-request
3. Erasing the I-register
4. Erasing the R-register
5. Setting the $\emptyset$ IT mode.

$\overline{\text{BUSRQ}}$ (request for bus): Input with active low level. Its active state $\overline{\text{BUSRQ}}=\emptyset$ makes the microprocessor 56 to effect the high-impedance state of the address and data buses 96, 98 and of the tri-state command lines 100. For $\overline{\text{BUSRQ}}=\emptyset$ the microprocessor 56 performs—after ending the running cycle—and sets the high-impedance state of the above mentioned command lines 100.

$\overline{\text{BUSAK}}$ (bus acknowledging): Output with active low level. Its active state $\overline{\text{BUSAK}}=\emptyset$ indicates that the microprocessor 56 performed the transition of lines to the high-impedance state as requested by $\overline{\text{BUSRQ}}=\emptyset$, the address bus 98, the data bus 96 and the tri-state command lines 100 can be controlled by external means (e.g. by the DMA-controller).

$\phi$: Single-phase time signal input. The 2 MHz signal comes from the inverter's (114) output. The signal form will be supplied by ZN 2905 transistor (116).

The timing and the basic time signal of the microprocessor 56 are controlled by the 12 MHz oscillator 108 comprising according to the FIG. 12/a the inverters 102 and 104. Signal forming and timing are supported by the 1.5 μF condenser 103 and by the two 330 Ohm resistors 106. For separating the oscillator's output, the inverter 110 is used which plays an additional role in signal formation. For the microprocessor 56 the 12 MHz signal has to be reduced to a 2 MHz signal. This task has been assigned to the BCD counter 112 of 7492 type. For purposes of control and timing, the 6 MHz (3 $\phi$) signal is also forwarded from the output 3Q.

Power supply for the device comes from a 5 V power supply unit (FIG. 12/b). In order to ensure power for the storage units, for the bus lines 98 and for the arithmetic processor 62 a DC-DC converter is used. The input voltage is $+5$ V$\pm 2\%$, stabilization comes from the circuit 120. The noise reduction inductance 118 prevents the fluctuation of currents. Control transistor 122 has the additional task of overload protection. A set of condensers 124 of value 70 uF are used as buffer for the output voltage.

The keyboard 36 is the input device of the apparatus. The keyboard connects to the system via the peripheral unit 70. The keyboard 36 is subdivided into two sections:
1. Numerical section
2. Intructional section Encoding of keys in the X-Y plane is done by two circuits/74 LS 151 type/125 and 126. Selection is supported by lines B$\emptyset$–B6. Vertical selection is performed by the circuit 125. All eight outputs are utilized. For example, the active signal of the output D7 selects the keys □7, □NAT and □PAS. Selection in the horizontal direction is done by the encoding circuit 126, of which only outputs D$\emptyset$, D1, D2 are used. The numerical keys 36 serve for transmitting input data and include the key "." (decimal point), which plays a role in the input of fractional values. Functional keys:

IN: By pushing this key that part of the progam is activated which waits for the input data and distributes these data. Input data are transmitted via the input keyboard.

NT: By pushing this key again that part of the program is activated which has to ensure the input operations. On pushing key NT the apparatus waits for the normative data required in computing operations.

PR: This key has to be used only if a printer is connected to the apparatus. Otherwise key PR does not participate in data traffic.

DY: It activates the display mode of operation. If pushed, the data and intermediate results appears on the display used.

TN: This key initiates the routine of trend computation. In effect, the computation of tendency functions starts on the basic of data input. This is of importance if by some reason it is desired to carry out the programme in phases.

NAT: By pushing this key the PC counter points to the start of the program for calculating a characteristic function of two variables. From input data already processed by the TEND program section it calculates the elements of this function which are presented on the display or the printer if keys DY or PR are pushed.

PAS (Pause): By pushing this key the actually performed program is suspended. After suspending restart can be effected by the key GO. The printer is not activated, but the display shows the result of this phase of calculations which is actually in processing. This key is not effective during the running of the arithmetic microprocessor 62.

C$\eta$ (C-eta): When pushing this key the running of the entire program will start, using the input data. The running continues to the end or unless an error is found. After pushing key C$\eta$, the keys IN, NT, PR, DY, TN, NAT and the numerical keys will become ineffective. Running of the program can be stopped and suspended by pushing the key PAS or can be interrupted by pushing the key RES.

RES: This key brings both the device and the program back to its starting (basic) state.

ST: By using this key we can perform the program in steps. It should be used for error tracing or if intermediary results are required. The key ST has not effect on the operation of the arithmetic microprocessor 62. (Its operation is considered by the system as one step.)

GO: By pushing this key the running of the suspenced program (commanded by PAS) will continue. The program will continue with the instruction present at this stage in the PC.

MEM: By pushing this key any of the memory addresses can be reached over the numerical keys. In the RAM section 78 the data contents may be changed.

",": By pushing this key the "comma" function becomes active which removes some of the instructions entered previously. Program sections located between commas (",") are not be performed by the system when carrying out a program.

For program storage the use EPROM element 80 can be used, while variable data and calculation results are stored in the RAM element 78. Address lines BA∅ to BA15 serve for selecting storage locations and memory types. For selecting storage locations the address bits BA∅ to BA1∅ are used, while for the selection of memory types the address bits BA11 to BA15 are active. The low level signals BA14 and BA15 are coupled via the AND-gate 88 and the gate 86, used as an inverter to the circuit 82 which, with the help of signals BA12 and BA13 decodes the signals BA14 and BA15 to activate the EPROM.

Data lines are fed from a common data bus 96, or, in turn, supply their data to this data bus. Direction of memory data flow will be determined by the relation of BRD (Read) signals to BWR (Write) signals. Selection of memory circuits is done by the encoding system of circuits 82 and 84.

For performing the mathematical computations, the arithmetic microprocessor 62 has data lines directly connected to the data bus lines 96. Selection control of CHIP is effected by separate encoding circuits 60 and 64.

Power supply of circuits is realized by voltage +5 V and +12 V. As a common external signal serves the φ time signal of 2 MHz, which arrives via the inverter 66, while the two general erasings are initiated by the RESET signal, through the inverter 68.

Principal features of the arithmetic processor 62 are 16-bit and 32-bit fix-point operations,
32-bit floating point operations,
binary data formats,
operations: addition, subtraction, multiplication, division,
trigonometric and inverse trigonometric functions,
power functions, logarithmic and exponential calculations.

The circuit requires external timing which comes via input terminal CLK. With the CLK signals it is possible, to synchronize the control signals $\overline{RD}$ and $\overline{WR}$ (reading and writing) too. The main signals controlling the arithmetic microprocessor 62 are:

RESET: This input signal is high and active and serves for initiating the internal circuits. It erases the status register. After a RESET signal the $\overline{END}$ output receives a high value.

C/$\overline{D}$ (Command/Date Select): This is an input signal. In combination with the $\overline{WR}$ and $\overline{RD}$ signals it determines the way of circuitry operations:

| C/$\overline{D}$ | $\overline{RD}$ | $\overline{WR}$ | Function |
|---|---|---|---|
| L | H | L | Data byte into the stack register |
| L | L | H | Data byte from the stack register |
| H | H | L | Feeding-in instruction from data bus |
| H | L | H | Reading in a status byte |
| X | L | L | Unspecified |

$\overline{END}$ A low level appears on the output when the circuit finished one task assigned to it. The output gets erased and receives a high value if the $\overline{EACK}$ input receives a low value. The reset signal has the same effect.

$\overline{EACK}$ (end acknowledge): An output signal. If EACK is low, then the $\overline{END}$ output can be also low.

SVREQ (service request): An output signal which functions as $\overline{END}$. It has an active high level.

DB0–DB7 (bidirectional data bus): There is a bidirectional data traffice (flow) through these 8 output terminals. As an input instruction it receives the instruction bytes. Allocation of bytes is effected by the C/$\overline{D}$, $\overline{WR}$ and $\overline{RD}$ signals.

$\overline{CS}$ (Chip Select): An input signal which turns to its low state if the arithmetic microprocessor 62 is selected for operation. The low signal directed and arriving here will ensure that the signals appearing on the bus lines are assigned to this circuit.

$\overline{RD}$ (read): This is an input signal with active low level. It indicates that the arithmetic microprocessor 62 can send one byte to the bus lines. This byte can be one of a calculated result or one status byte of an instruction (operation) performed.

$\overline{WR}$ (write): Input signal with active low level. It indicates that there is one byte on the data bus lines 96 for the arithmetic microprocessor 62. In combination with the C/$\overline{D}$ input it will decide whether this byte receives an instruction, or it will constitute data for the arithmetic microprocessor 62.

$\overline{PAUSE}$ An output signal. Its task is to maintain the communication with the commanding microprocessor 56. This signal is active low as long as the informations of the operation are not completed. During the waiting period it receives data via the data lines 96 or sends out data. This signal travels directly to the $\overline{WAIT}$ input terminal of the microprocessor 56.

The central unit of the apparatus, the microprocessor 56 is connected to the peripheral units 70, 71, 72 via the data and address bus lines 96 and 98. Control of peripheral units 70, 71, 72 and of their data/flow is effected by the appropriate circuits of the microprocessor 56. These circuits form a parallel interface which handles two 8-bit ports and has four modes of operation:
1. byte output (Port A, Port B)
2. byte input (Port A, Port B)
3. byte bidirectional (Port A)
4. bit mode of operation (Port A, Port B)

This unit occupies two addresses in each port within the system (data, command). Another circuit in the peripheral unit 70 serves for adapting the keyboard 36, to the system. The keys are arranged as matrix and are connected to the processor via a multiplexer, e.g. of 74 LS 251 type.

Communication between the display and the microprocessor 56 is realised by the peripheral unit 71. The peripheral unit 72 ensures the possibility of displaying the data on the printer 22. Priority of peripheral units: 1. Display 2. Printer 3. Keyboard Selection of peripheral units is performed by the multiplexer encoding circuit, aided by address signals BA3 to BA6. The priority is ensured by the gate 74.

Operation of the apparatus starts with switching on which puts the circuits under voltage. In the active state the program burnt into the EPROM element 80 is ready for receiving the instructions coming from the keyboard 36.

By pushing the key RES the device is brought to its basic or starting position, the registers are erased and get ready for receiving data. As part of the switching-on procedure, the device tests itself. In this test the errorless operation of the RAM element 78 is checked and all cells are cleared. If the starting cycle shows no error a signal diode with allow the data input. If the starting cycle could not be completed successfully, then the ERROR sign will be on.

Pushing the key IN permits the input of basic data. This key starts the subroutine of the program which handles the input, and it waits for the data coming from the keyboard 36. As a result of pushing IN the starting address of the program is transferred into the PC-register. The data input of the microprocessor 56 receives an appropriate instruction. By pushing any of the numerical keys the binary value of the key enters the A-register from where the program allocates it into the appropriate RAM cell of the RAM element 78. This operation continues until all parameters enter. The program ensures that the data entry is errorless.

After entering the basic data the running of the program can be started.

Pushing the TN key gets the subroutine of calculating the tendency function (FIG. 18) start. The cycle consists of several sub-programs.

Totals are calculated first. For performing the work of addition the microprocessor 56 assignes control on the address lines the arithmetical processor 62. Over the data lines it transmits the code 9∅ H and the figures to be added. Intermediary results are forwarded to the register NOS of the arithmatical processor 62. Then intermediary results are sent back to the appropriate cell of the RAM element 78. This data flow is controlled by the microprocessor 56. With the computed data the operation of multiplication will be performed at first. Multiplication is controlled by the microprocessor 56 and is performed by the arithmetic microprocessor 62. In this case the data bus 96 receives the instruction. The numbers to be multiplicated are displaced in the registers TOS and NOS of the arithmatical processor 62. The results are put into the NOS-register. Power operations are controlled, the operand comes into the B-register, the power number into the A-register. The result appears in the NOS register.

In subsequent steps perform the subtractions and the multiplications are peformed on the basis of the intermediary results obtained. The square root of the fractional number's nominator and some other values should be determined also. This cycle has to be continued for the parameters of all machines to be proved. The SORT subroutine helps in finding the proper ranking. SORT findes—from the contents of the RAM element 78—with help of the SUB comparison instruction and of the subsequent JP jumping instruction the required ranking order.

NAT: Pushing this key ensures the calculation of the two variable function (so called natural surface) representing the present leading standards in technology. The input parameters are located in the RAM element 78 as storage. The "G" functions are performed with the help of routines built into the program. The results have the form of vectors. The algorithms for finding the F and G functions are shown in FIGS. 21 and 22. A machine-coded variant of the completed program can be seen in the appendix. Pushing this key results in the complete running of the program. Interruption can be made only with keys PAS and RES. In case of error, the running of the program is also interrupted and the error displayed. Flow chart of the program's running is shown in FIG. 23. A machine-coded realization of the program forms also part of the appendix. The running of the program is controlled by the microprocessor 56, supported by the arithmetical microprocessor 62, type Am 9511A. For storing intermediate results the following registers of the microprocessor 56 are usable: A, B, C, D, E, and C', D', E', H', L', and the following registers of the arithmetic microprocessor 62: A, B, C, D, and R. The result can be displayed on the screen, if the key DY or on the printer the key PR was pushed previously. The operation of computation can be performed so many times as required when any or all of the parameters are changed. In such cases the storage units assigned are rewritten.

A source language program for the microprocessors is presented in an appendix hereof.

By this procedure the design objectives for machines to be developed in the future can be determined or it is possible to find use-value of an existing machine as compared to the actual leading standards of technology.

It is to be understood that the above described embodiment of the invention is illustrative and that modifications thereof may occur to those skilled in the art. Accordingly, the invention is not to be regarded as limited to the embodiments disclosed herein, but is to be limited only as defined by the appended claims.

```
AA AA AA AA    AA AA AA AA    AA AA 54 00    C3 07 E0 07
3F 23 CF 27    00 00 00 25    51 26 48 1F    36 5C DE 53
CE 1C E3 17    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
```

```
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA E3    4A E7 4A EB
4A EF 4A F3    4A F7 4A FB    4A FF 4A 03    4B 07 4B AA
AA AA AA AA    AA AA AA AA    AA AA AA AA    AA AA AA AA
AA AA AA AA    AA AA AA AA    AA AA AA AA    AA AA AA AA
AA AA AA 23    4B 27 4B 2B    4B 2F 4B 33    4B 37 4B 3B
4B 3F 4B AA    AA AA AA AA    AA AA AA AA    AA AA AA AA
AA AA AA AA    AA AA AA AA    AA AA AA 57    4B 5B 4B 5F
4B 63 4B 67    4B 2B 49 36    29 23 46 32    30 2E 30 29
28 46 31 30    2E 30 29 AA    AA AA AA AA    AA AA AA AA
AA AA AA AA    AA AA AA AA    AA AA AA AA    AA AA AA AA
AA AA AA AA    AA AA AA AA    AA AA AA 39    57 3D 57 01
57 AA AA AA    AA 41 57 45    57 F9 56 31    57 4D 57 F9
56 31 57 51    57 F9 56 55    57 59 57 F9    56 49 57 5D
57 F9 56 31    57 3D 57 61    57 55 57 65    57 F9 56 31
57 69 57 F9    56 71 57 75    57 F9 56 41    57 79 57 F9
56 7D 57 3D    57 F9 56 81    57 4D 57 F9    56 AA AA AA
```

```
AA 55 57 85   57 F9 56 AA   AA AA AA 89   57 3D 57 F9
56 89 57 65   57 F9 56 31   57 3D 57 91   57 31 57 3D
57 95 57 AA   AA AA AA 99   57 9D 57 F9   56 AA AA AA
AA A1 57 A5   57 F9 56 31   57 A9 57 F9   56 31 57 AD
57 F9 56 31   57 81 57 F9   56 39 57 81   43 F9 56 41
57 FF 56 C1   57 31 57 EB   4A F9 56 31   57 FD 56 01
57 55 57 81   4B F9 56 B5   57 CB 57 01   57 49 57 81
4B F9 56 89   57 03 57 01   57 31 57 03   43 F9 56 55
57 11 57 C1   57 31 57 E1   40 6D 57 71   57 13 57 01
57 AA AA AA   AA AA AA C1   57 33 4B F5   56 41 57 15
57 95 4C AA   AA AA AA AA   AA AA AA AA   AA AA AA 7D
57 F9 56 F9   56 F9 56 17   57 95 4C 81   57 F9 56 F9
56 F9 56 19   57 01 57 55   57 93 4B F9   56 89 57 1B
57 01 57 31   57 F9 56 F9   56 F9 56 1D   57 3F 43 89
57 F9 56 F9   56 F9 56 1F   57 91 4B 31   57 57 43 91
57 31 57 21   57 01 57 CD   57 63 4B 95   57 31 57 23
57 01 57 99   57 A3 4B F9   56 A1 57 23   57 01 57 31
57 03 4B F9   56 89 57 05   57 C1 57 31   57 67 43 F9
56 31 57 25   57 01 57 AA   AA AA AA AA   AA AA AA AA
AA AA AA AA   AA AA AA 28   46 32 30 2E   36 29 A7 4C
AB 4C 27 4D   C1 4A 4D C3   31 86 11 80   43 21 FF 56
CD 9E 9C 11   D1 4A 21 FF   56 3E 02 CD   36 9C CD C8
A3 21 00 00   22 D5 4A 11   79 43 21 FF   56 CD 9E 9C
11 D7 4A 21   FF 56 3E 02   CD 36 9C CD   C8 A3 21 D7
4A CD 11 AA   2F 3C FA 95   4D C1 91 44   11 01 43 21
D5 4A CD CE   5B 11 79 4B   21 FF 56 CD   9E 9C 11 DB
4A 21 FF 56   3E 02 CD 30   9C CD C8 A3   2A D5 4A 23
22 D5 4A 11   75 4B 21 FF   56 CD 9E 9C   11 DD 4A 21
FF 56 3E 02   CD 30 9C CD   C8 A3 11 79   43 21 FF 56
CD 9E 9C 01   03 4B 11 DF   4A 21 FF 56   3E 0C CD 36
9C CD C8 A3   11 79 43 21   FF 56 CD 9E   9C 01 43 4B
11 1F 4B 21   FF 56 3E 0A   CD 36 9C CD   C3 A3 11 79

4B 21 FF 56   CD 9E 9C 01   63 43 11 53   43 21 FF 56
3E 07 CD 36   9C CD C8 A3   21 E3 4A CD   11 AA 21 D1
4A CD 76 99   21 DF 4A CD   76 99 21 87   43 CD 02 AA
21 02 00 22   8B 4B 21 01   00 22 8D 43   2A 8B 43 29
29 22 3F 43   2A 8D 4B 29   29 29 29 EB   2A 3F 43 19
11 ED 3F 19   22 91 4B 21   07 57 CD 11   AA 2A 91 4B
CD 02 AA 2A   8D 4B 23 3E   30 95 3E 00   9C F2 39 4E
2A 83 4B 23   3E 04 95 3E   00 9C F2 33   4E 21 87 4B
CD 11 AA 21   01 40 CD 02   AA 21 DF 4A   CD 11 AA 21
11 40 CD 02   AA 21 E3 4A   CD 11 AA 21   0D 57 CD 76
99 21 21 40   CD 02 AA 21   E7 44 CD 11   AA 21 31 40
CD 02 AA 21   F3 4A CD 11   AA 21 EF 4A   CD 01 99 21
97 43 CD 02   AA 21 EF 4A   CD 11 AA 21   97 4B CD 76
99 21 F5 56   CD 63 99 21   64 00 CD 69   9A CD FC 97
21 41 40 CD   02 AA 21 EB   4A CD 11 AA   21 51 40 CD
02 AA 21 F3   4A CD 11 AA   21 61 40 CD   02 AA 21 F7
4A CD 11 AA   21 71 40 CD   02 AA 21 DF   4A CD 11 AA
21 81 40 CD   02 AA 21 FB   4A CD 11 AA   21 91 40 CD
02 AA 21 DF   4A CD 11 AA   21 A1 40 CD   02 AA 21 FF
4A CD 11 AA   21 B1 40 CD   02 AA 21 03   43 CD 11 AA
21 C1 40 CD   02 AA 21 07   4B CD 11 AA   21 D1 40 CD
02 AA 21 1F   4B CD 11 AA   21 F1 40 CD   02 AA 21 87
4B CD 11 AA   21 01 41 CD   02 AA 21 23   43 CD 11 AA
```

```
21 11 41 CD  02 AA 21 F3  4A CD 11 AA  21 EF 4A CD
76 99 21 33  4B CD 76 99  21 27 57 CD  01 99 21 9B
4B CD 02 AA  21 9B 4B CD  EE 95 CD 4E  9B 21 21 41
CD 02 AA 21  53 4B CD 11  AA 21 2B 43  CD 01 99 21
35 57 CD 76  99 21 9F 4B  CD 02 AA 21  23 4B CD 11
AA 21 31 57  CD 76 99 21  A3 43 CD 02  AA 21 21 41
CD 11 AA 21  2F 4B CD 01  99 21 2D 57  CD 76 99 21
A3 4B CD 01  99 21 9F 4B  CD 01 99 21  27 4B CD 01
99 21 27 4B  CD 01 99 21  1F 43 CD 01  99 21 E1 40

CD 02 AA 21  53 4B CD 11  AA 21 31 41  CD 02 AA 21
27 43 CD 11  AA 21 41 41  CD 02 AA 21  23 4B CD 11
AA 21 51 41  CD 02 AA 21  2F 43 CD 11  AA 21 61 41
CD 02 AA 21  33 4B CD 11  AA 21 71 41  CD 02 AA 21
37 4B CD 11  AA 21 81 41  CD 02 AA 21  93 4B CD 11
AA 21 91 41  CD 02 AA 21  2F 43 CD 11  AA 21 A1 41
CD 02 AA 21  27 4B CD 11  AA 21 B1 41  CD 02 AA 21
41 40 CD 11  AA 21 C1 41  CD 02 AA 21  3F 4B CD 11
AA 21 D1 41  CD 02 AA 21  07 4B CD 11  AA 21 E1 41
CD 02 AA 21  03 4B CD 11  AA 21 F1 41  CD 02 AA 21
FF 4A CD 11  AA 21 01 42  CD 02 AA 21  21 41 CD 11
AA 21 11 42  CD 02 AA 21  03 4B CD 11  AA 21 E3 4A
CD 6F 9A 21  31 57 CD 76  99 21 27 57  CD 01 99 21
A7 4B CD 02  AA 21 A7 4B  CD EE 95 CD  4E 9B 21 21
42 CD 02 AA  21 53 43 CD  11 AA 21 31  42 CD 02 AA
21 57 4B CD  11 AA 21 41  42 CD 02 AA  21 63 4B CD
11 AA 21 61  42 CD 02 AA  21 33 4B CD  11 AA 21 51
42 CD 02 AA  21 57 4B CD  11 AA 21 71  42 CD 02 AA
21 53 4B CD  11 AA 21 81  42 CD 02 AA  21 2B 43 CD
11 AA 21 91  42 CD 02 AA  21 07 4B CD  11 AA 21 B1
42 CD 02 AA  21 21 41 CD  11 AA 21 C1  42 CD 02 AA
21 03 4B CD  11 AA 21 D1  42 CD 02 AA  21 5F 43 CD
11 AA 21 E1  42 CD 02 AA  21 67 4B CD  11 AA 21 F1
42 CD 02 AA  01 AB 4B 11  F9 56 21 87  43 CD 5E 89
21 05 40 CD  02 AA 21 DF  4A CD 11 AA  21 0D 57 CD
76 99 21 B1  43 CD 02 AA  01 85 4B 11  F9 56 21 31
4B CD 5E 89  21 19 40 CD  02 AA 01 BB  43 11 49 57
21 41 40 CD  5E 89 21 45  40 CD 02 AA  01 C1 4B 11
F9 56 21 EB  4A CD 5E 89  21 59 40 CD  02 AA 01 C7
4B 11 F9 56  21 F7 4A CD  5E 89 21 75  40 CD 02 AA
01 CD 4B 11  F9 56 21 FB  4A CD 5E 89  21 95 40 CD
02 AA 21 19  40 CD 11 AA  21 89 40 CD  02 AA 21 19

40 CD 11 AA  21 A9 40 CD  02 AA 01 D3  43 11 61 57
21 FF 4A CD  5E 89 21 B5  40 CD 02 AA  01 D9 43 11
F9 56 21 03  43 CD 5E 89  21 C9 40 CD  02 AA 01 DF
4B 11 F9 56  21 07 4B CD  5E 89 21 D5  40 CD 02 AA
01 E5 4B 11  6D 57 21 E1  40 CD 5E 89  21 E9 40 CD
02 AA 01 EB  4B 11 F5 56  21 33 4B CD  5E 89 21 75
41 CD 02 AA  01 F1 43 11  F5 56 21 2F  43 CD 5E 89
21 A5 41 CD  02 AA 01 F7  4B 11 F5 56  21 41 40 CD
5E 89 21 C5  41 CD 02 AA  21 3F 4B CD  11 AA 21 07
4B CD 01 99  21 FD 4B CD  02 AA 01 01  4C 11 F9 56
21 FD 4B CD  5E 89 21 D5  41 CD 02 AA  21 03 43 CD
11 AA 21 FF  4A CD 6F 9A  21 31 57 CD  76 99 21 07
4C CD 02 AA  C1 0B 4C 11  F9 56 21 07  4C CD 5E 39
```

```
21 09 42 CD   02 AA 01 11   4C 11 F9 56   21 21 42 CD
5E 89 21 25   42 CD 02 AA   01 17 4C 11   91 57 21 57
4B CD 5E 89   21 49 42 CD   02 AA 01 1D   4C 11 95 57
21 63 4B CD   5E 89 21 69   42 CD 02 AA   21 5B 4B CD
11 AA 21 57   4B CD 01 99   21 23 4C CD   02 AA 01 27
4C 11 F9 56   21 23 4C CD   5E 89 21 75   42 CD 02 AA
21 3F 4B CD   11 AA 21 2B   4B CD 01 99   21 07 43 CD
01 99 21 2D   4C CD 02 AA   01 31 4C 11   F9 56 21 2D
4C CD 5E 89   21 89 42 CD   02 AA 01 37   4C 11 F9 56
21 21 41 CD   5E 89 21 C5   42 CD 02 AA   21 C9 40 CD
11 AA 21 D9   42 CD 02 AA   01 3D 4C 11   F9 56 21 5F
4B CD 5E 89   21 E5 42 CD   02 AA 01 43   4C 11 F9 56
21 67 4B CD   5E 89 21 F9   42 CD 02 AA   01 49 4C 11
F9 56 21 87   4B CD 06 8A   21 CD 40 CD   02 AA 01 55
4C 11 49 57   21 41 40 CD   06 8A 21 4D   40 CD 02 AA
01 61 4C 11   F9 56 21 F7   4A CD 06 8A   21 7D 40 CD
02 AA 01 6D   4C 11 F9 56   21 F3 4A CD   06 8A 21 9D
40 CD 02 AA   01 79 4C 11   61 57 21 FF   4A CD 06 8A
21 BD 40 CD   02 AA 01 85   4C 11 F9 56   21 07 43 CD 06 8A 21 DD   40 CD 02 AA   21 93 4B CD   11 AA 21 3D
57 CD 63 99   21 91 4C CD   02 AA 2F 3C   FA 28 54 21
01 00 22 95   4C C3 2E 54   21 02 00 22   95 4C 21 37
4B CD 11 AA   21 0D 57 CD   76 99 21 97   43 CD 02 AA
01 97 4C 11   F9 56 21 97   4B CD 06 8A   21 7D 41 CD
02 AA 21 27   43 CD 11 AA   21 C5 57 CD   63 99 21 9B
4B CD 02 AA   2F 3C FA 72   54 21 01 00   22 95 4C C3
78 54 21 02   C0 22 95 4C   01 AF 4C 11   F9 56 21 2F
4B CD 06 8A   21 AD 41 CD   02 AA 01 BB   4C 11 F9 56
21 41 40 CD   06 8A 21 CD   41 CD 02 AA   21 3F 4B CD
11 AA 21 07   4B CD 01 99   21 97 4B CD   02 AA 21 03
4B CD 11 AA   21 FF 4A CD   6F 9A 21 31   57 CD 76 99
21 93 4B CD   02 AA 01 C7   4C 11 F9 56   21 97 4B CD
06 8A 21 DD   41 CD 02 AA   21 D7 4A CD   EE 95 22 8F
4B 01 D3 4C   11 F9 56 21   21 41 CD 06   8A 21 1D 42
CD 02 AA 21   D7 4A CD EE   95 22 91 4B   01 DF 4C 11
F9 56 21 21   42 CD 06 8A   21 2D 42 CD   02 AA 01 EB
4C 11 C9 57   21 53 4B CD   06 8A 21 3D   42 CD 02 AA
01 F7 4C 11   F9 56 21 33   4B CD 06 8A   21 5D 42 CD
02 AA 21 5B   4B CD 11 AA   21 57 4B CD   01 99 21 9F
4B CD 02 AA   21 3F 4B CD   11 AA 21 29   43 CD 01 99
21 07 4B CD   01 99 21 A3   4B CD 02 AA   01 03 4D 11
F9 56 21 9F   4B CD 06 8A   21 7D 42 CD   02 AA 01 0F
4D 11 F9 56   21 21 41 CD   06 8A 21 CD   42 CD 02 AA
01 13 4D 11   F9 56 21 5F   4B CD 06 8A   21 ED 42 CD
02 AA 21 F9   56 CD 11 AA   21 A3 4C CD   02 AA 21 F9
56 CD 11 AA   21 A7 4C CD   02 AA 21 F9   56 CD 11 AA
21 AB 4C CD   02 AA 21 01   00 22 3B 4B   2A BB 43 29
29 29 29 22   8F 4B 11 F5   3F 19 CD 11   AA 21 A3 4C
CD 01 99 21   A3 4C CD 02   AA 2A 3F 4B   11 F9 3F 19
CD 11 AA 21   A7 4C CD 01   99 21 A7 4C   CD 02 AA 2A
3B 43 29 29   29 29 11 FD   3F 19 CD 11   AA 21 A3 4C

CD 01 99 21   AB 4C CD 02   AA 2A 3B 4B   23 3E 30 95
3E 00 9C F2   B9 55 21 A7   4C CD 11 AA   21 A7 4C CD
6F 9A 21 97   43 CD 02 AA   21 A3 4C CD   11 AA 21 A3
```

```
4C CD 6F 9A    21 97 4B CD    01 99 21 9B    43 CD 02 AA
21 9B 4B CD    AE 95 21 27    4D CD 02 AA    2A D5 4A 29
29 22 8F 43    11 FD 42 19    22 91 4B 2A    D3 4A E3 2A
91 43 73 23    72 2A 8F 4B    11 FF 42 19    22 2B 4D 2A
DD 4A EB 2A    2B 4D 73 23    72 2A D5 4A    29 29 29 29
22 2D 4D 11    81 44 19 22    2F 4D 21 A3    4C CD 11 AA
2A 2F 4D CD    02 AA 2A 2D    4D 11 35 44    19 22 31 4D
21 A7 4C CD    11 AA 2A 31    4D CD 02 AA    2A 2D 4D 11
39 44 19 22    33 4D 21 AB    4C CD 11 AA    2A 33 4D CD
02 AA 2A 2D    4D 11 8D 44    19 22 35 4D    21 27 4D CD
11 AA 2A 35    4D CD 02 AA    11 37 4D 21    FD 56 CD A1
9C 01 3E 4D    11 A3 4C 21    FF 56 3E 05    CD 36 9C CD
C8 A3 C3 67    4D 00 00 00    81 C0 00 00    00 02 00 01
00 00 00 04    C0 10 00 5F    42 A2 1D 03    00 00 00 7A
3A 05 00 06    00 07 00 08    00 C9 00 0A    00 0B 00 0C
00 0D 00 0E    00 11 00 72    F9 7F 30 0F    00 00 00 20
84 00 00 48    87 00 00 20    85 00 00 10    84 26 31 08
7F 00 00 40    83 F9 7E 2A    7F C0 00 70    85 02 23 07
7D 58 39 34    78 00 00 16    88 E3 A5 1B    73 CC CC 4C
7D 00 00 2A    87 CC CC 4C    7B 7E 6A 3C    7C 00 00 40
82 00 00 24    86 7E 6A 3C    7B 66 66 66    80 00 00 70
84 00 00 16    87 41 60 65    7A 00 00 7A    83 0A D7 23
7A 00 00 34    87 00 00 3E    87 C0 00 20    89 6E 12 03
7A 00 00 16    89 A5 9B 44    7A CC CC 4C    7C 0A D7 23
7B BC 74 13    7A 00 00 40    84 C0 00 00    84 00 00 7A
8B 00 00 60    83 46 03 00    81 C0 00 20    87 00 C0 20
83 AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA

AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA 18 0D 44    41 54 45 3A    20 38 32 30
32 32 36 2E    D1 E1 D5 FD    21 18 7C 11    42 7C CD 9E
1D 28 04 32    BD 13 C9 22    25 7C EB CD    AE 1E 20 F3
21 00 00 22    27 7C 22 2D    7C 3E 04 32    19 7C 3E 00
32 41 7C 21    41 7C 22 23    7C 21 35 7C    22 1A 7C 21
0C 00 22 1C    7C FD 21 18    7C CD 3C 1F    C2 FC 79 3A
35 7C E6 F0    FE 20 3E 48    C2 FC 79 ED    5B 38 7C ED
4B 36 7C 7A    B1 CA FC 79    41 21 00 00    19 10 FD 22
29 7C 01 00    03 09 44 4D    21 64 7C 11    FF FF CD 71
23 FE 30 20    6C 22 29 7C    01 C0 01 09    22 33 7C 01
00 02 09 22    27 7C 2A 25    7C CD 24 20    CD 39 1D 28
2B 44 4D 2A    2D 7C 23 22    2D 7C 29 29    ED 5B 29 7C
19 71 23 70    23 E5 60 69    23 7E CD 35    1D 20 F9 54
5D ED 42 44    4D E1 71 23    70 E3 18 CD    2A 27 7C 22
1A 7C 2A 29    7C 22 1C 7C    21 00 00 22    23 7C 3E 0A
32 19 7C FD    21 18 7C CD    3C 1F 28 04    FE C9 20 01
```

```
AF 32 BD 13   3E 06 32 19   7C 2A 1C 7C   22 25 7C 21
00 00 22 1A   7C 22 1C 7C   22 23 7C FD   21 18 7C CD
3C 1F 3A BD   13 32 22 7C   CB 77 28 31   FE C7 20 0F
21 02 7C 01   16 00 CD 2B   20 AF 32 BD   13 18 05 3E
4C CD A5 19   2A 27 7C 7C   B5 C8 2A 29   7C 01 00 03
09 44 4D 2A   2B 7C CD 30   23 32 BD 13   C9 2A 27 7C

ED 4B 25 7C   78 81 28 DC   7E FE FF 23   D7 3E CD 54
5D ED B1 20   CF C5 E5 21   00 00 22 2F   7C 2A 33 7C
EB 7E FE 0D   CA 34 7B FE   23 20 4D ED   53 31 7C 23
CD 84 7B 20   CD 21 A9 7B   01 1D 00 CD   23 20 E1 E1
18 A2 7C B5   28 EF ED 4B   2D 7C E5 37   ED 42 D9 E1
38 0C 21 C7   73 01 19 00   CD 2B 20 C3   7F 7B ED 4B
2B 7C 29 29   09 5E 23 56   23 4E 23 46   2A 31 7C EB
ED B0 D5 D9   E1 EB 18 A9   FE 53 20 38   D9 2A 2F 7C
23 22 2F 7C   ED 5B 20 7C   37 ED 52 D9   23 38 92 ED
4B 2F 7C 03   ED 43 2F 7C   01 C1 00 7E   FE 0D 23 81
23 FE 5B 20   C3 03 18 F3   FE 5D 20 EF   03 78 B1 20
EA C3 7C 7A   FE 5D 20 1C   D9 2A 2F 7C   7C 35 20 0B
21 E1 7B 01   20 00 CD 2B   20 18 59 2B   22 2F 7C D9
23 C3 7C 7A   ED A0 C3 7C   7A ED A0 2A   33 7C 22 1A
7C 2A 27 7C   E5 2A 29 7C   E5 2A 33 7C   E5 2A 2D 7C
E5 2A 2B 7C   E5 FD 21 18   7C AF 32 18   7C 21 0E 14
CB D6 CD 03   1A 21 0E 14   CB 96 E1 22   23 7C E1 22
2D 7C E1 22   33 7C E1 22   29 7C E1 22   27 7C 21 00
00 22 20 7C   E1 C1 C3 63   7A 11 00 00   CD 24 20 CD
35 1D EB C3   FE 30 33 14   FE 3A 30 10   E6 0F 29 44
4D 29 29 09   4F 06 00 09   13 1A 18 E8   A7 C9 46 4F
52 4D 41 4C   20 50 41 52   41 4D 45 54   45 52 20 46
4F 52 4D 41   54 20 45 52   52 4F 52 20   50 41 52 41
4D 45 54 45   52 20 45 58   50 41 4E 53   49 4F 4E 20
45 52 52 4F   52 20 55 4E   42 41 4C 41   4E 43 45 44
20 43 4F 4E   44 49 54 49   4F 4E 41 4C   20 45 58 50
41 4E 53 49   4F 4E 20 43   4F 4D 4D 41   4E 44 20 46
49 4C 45 20   4E 4F 54 20   46 4F 55 4E   44 00 06 00
7F 00 00 00   00 00 00 8C   00 00 00 02   00 81 22 D2
57 EB 22 D4   57 60 69 22   D6 57 21 0D   00 22 7C 5B
21 01 00 22   7E 5B 21 00   00 CD 4E 9B   21 8C 5B CD
02 AA 21 C0   00 CD 4E 9B   21 84 5B CD   02 AA 21 00

00 CD 4E 9B   21 88 5B CD   02 AA 21 00   00 CD 4E 9B
21 8C 5B CD   C2 AA 21 00   00 CD 4E 9B   21 9C 5B CD
02 AA 21 01   00 22 94 5B   21 C1 00 22   96 5B 2A 96
5B 29 29 11   24 58 19 22   98 5B 2A 96   5B 29 29 29
29 22 9A 5B   11 F0 FF 19   EB 2A D6 57   19 22 9C 5B
2A 9A 5B 11   F4 FF 19 EB   2A D6 57 19   22 9E 53 2A
9A 5B 11 F8   FF 19 EB 2A   D6 57 19 22   A0 5B 2A 9C
5B 22 A2 5B   2A 9E 5B 22   A4 5B 2A A0   5B 22 A6 5B
01 A2 5B 11   94 5B 21 7E   5B CD 32 69   2A 98 5B CD
02 AA 2A 96   5B 23 EB 2A   D2 57 7E 23   66 6F EB 7B
95 7A 9C F2   2B 5C 21 02   00 22 A8 5B   2A A8 5B 22
AA 5B 21 01   00 22 96 5B   2A 96 5B 29   29 11 84 59
19 22 98 5B   2A 96 5B 29   29 29 29 22   9A 5B 11 F0
FF 19 EB 2A   D6 57 19 22   9C 5B 2A 9A   5B 11 F4 FF
19 EB 2A D6   57 19 22 9E   5B 2A 9A 5B   11 F8 FF 19
EB 2A D6 57   19 22 A0 5B   2A 9C 5B 22   AC 5B 2A 9E
5B 22 AE 5B   2A A0 5B 22   B0 5B 01 AC   5B 11 A8 5B
```

```
21 7E 5B CD   32 69 2A 98   5B CD 02 AA   2A 96 5B 23
EB 2A D2 57   7E 23 66 6F   EB 7B 95 7A   9C F2 B5 5C
2A AA 5B 29   29 22 98 5B   11 24 58 19   22 9A 5B 2A
98 5B 11 B4   59 19 CD 11   AA 2A 9A 5B   CD 6F 9A 21
80 5B CD 01   99 21 80 5B   CD 02 AA 2A   9A 5B CD 11
AA 21 84 5B   CD 01 99 21   84 5B CD 02   AA 2A 9A 5B
CD 11 AA 21   88 5B CD 01   99 21 88 5B   CD 02 AA 2A
98 5B 11 B4   59 19 CD 11   AA 21 3C 5B   CD 01 99 21
8C 5B CD 02   AA 2A AA 5B   29 29 11 B4   59 19 22 98
5B CD 11 AA   2A 98 5B CD   6F 9A 21 90   5B CD 01 99
21 90 5B CD   02 AA 2A D2   57 7E 23 66   6F CD 4E 9B
21 B2 5B CD   02 AA 21 8C   5B CD 11 AA   21 84 5B CD
6F 9A 21 C2   5B CD 02 AA   21 B2 5B CD   11 AA 21 B0
5B CD 6F 9A   21 C2 5B CD   63 99 21 B6   5B CD 02 AA
21 84 5B CD   11 AA 21 B4   5B CD 6F 9A   21 C6 5B CD

02 AA 21 B2   5B CD 11 AA   21 B8 5B CD   6F 9A 21 C6
5B CD 63 99   21 BA 5B CD   02 AA 21 8C   5B CD 11 AA
21 8C 5B CD   6F 9A 21 CA   5B CD 02 AA   21 B2 5B CD
11 AA 21 90   5B CD 6F 9A   21 CA 5B CD   63 99 21 BE
5B CD 02 AA   2A A8 5B 29   29 11 44 5B   19 22 98 5B
21 BE 5B CD   11 AA 21 BA   5B CD 6F 9A   21 C2 5B CD
02 AA 21 C2   5B CD AE 95   21 C6 5B CD   02 AA 21 B6
5B CD 11 AA   21 C6 5B CD   76 99 2A 93   5B CD 02 AA
2A A8 5B 23   EB 2A 7C 5B   EB 7B 95 7A   9C F2 A9 5C
2A D2 57 44   4D 2A D6 57   EB 21 48 5B   CD 14 62

| | | | | | | | | | | | | | | | |
|--|--|--|--|--|--|--|--|--|--|--|--|--|--|--|--|
|AA|AA|AA|AA|AA|AA|AA|AA|AA|AA|AA|AA|AA|AA|AA|AA|
|AA|AA|AA|AA|AA|AA|AA|AA|AA|AA|AA|AA|AA|AA|AA|AA|
|AA|AA|AA|AA|AA|AA|AA|AA|AA|AA|AA|AA|AA|AA|AA|AA|
|AA|AA|AA|AA|AA|44|41|54|45|20|38|33|31|31|32|34|
|0D|45|43|48|4F|0D|58|20|2A|0D|58|20|2A|0D|58|20|
|2A|0D|58|20|2A|20|20|20|20|20|20|20|20|20|20|20|
|20|20|3E|3E|3E|3E|3E|3E|20|20|56|54|32|30|2F|49|
|56|20|20|53|59|53|54|45|4D|20|20|3C|3C|3C|3C|3C|
|3C|0D|58|20|2A|20|20|20|20|20|20|20|20|20|20|20|
|20|20|20|20|20|20|20|20|20|20|2D|20|47|20|54|20|
|49|20|2D|CD|58|20|2A|20|20|20|20|20|20|20|20|20|
|20|20|20|20|20|20|20|20|20|20|20|20|21|20|20|20|
|20|20|20|20|21|0D|58|20|2A|0D|FF|AA|AA|AA|AA|AA|
|AA|AA|AA|AA|AA|AA|AA|AA|AA|AA|AA|AA|AA|AA|AA|AA|
|AA|AA|AA|AA|AA|AA|AA|AA|AA|AA|AA|AA|AA|AA|AA|AA|
|AA|AA|AA|AA|AA|AA|AA|AA|AA|AA|AA|AA|AA|AA|AA|AA|
|AA|AA|AA|AA|AA|AA|AA|AA|AA|AA|AA|AA|AA|AA|AA|AA|
|AA|AA|AA|AA|AA|AA|AA|AA|AA|AA|AA|AA|AA|AA|AA|AA|
|AA|AA|AA|AA|AA|AA|AA|AA|AA|AA|AA|AA|AA|AA|AA|AA|
|AA|AA|AA|AA|AA|AA|AA|AA|AA|AA|AA|AA|AA|AA|AA|AA|
|AA|AA|AA|AA|AA|AA|AA|AA|AA|AA|AA|AA|AA|AA|AA|AA|
|AA|AA|AA|AA|AA|AA|AA|AA|AA|AA|AA|AA|AA|AA|AA|AA|
|AA|AA|AA|AA|AA|AA|AA|AA|AA|AA|AA|AA|AA|AA|AA|AA|
|AA|AA|AA|AA|AA|AA|AA|AA|AA|AA|AA|AA|AA|AA|AA|AA|
|AA|AA|AA|AA|AA|AA|AA|AA|AA|AA|AA|AA|AA|AA|AA|AA|

| | | | | | | | | | | | | | | | |
|--|--|--|--|--|--|--|--|--|--|--|--|--|--|--|--|
|AA|AA|AA|AA|AA|AA|AA|AA|AA|AA|AA|AA|AA|AA|AA|AA|
|AA|AA|AA|AA|22|B6|5E|EB|22|B3|5E|60|69|22|BA|5E|
|21|01|00|22|F6|61|2A|F6|61|29|11|DA|61|19|22|F8|
|61|2A|F6|61|EB|2A|F8|61|73|23|72|2A|F6|61|23|3E|
|03|95|3E|00|9C|F2|23|62|21|C1|00|22|FA|61|2A|FA|
|61|29|22|FA|61|11|F3|FF|19|22|F8|61|7D|07|B5|E6|
|7F|B4|2F|3C|F2|4E|62|2A|FA|61|2B|EB|21|02|00|CD|
|91|93|22|FA|61|7D|07|B5|E6|7F|B4|CA|7F|63|2A|3A|
|5E|7E|23|66|6F|EB|2A|FA|61|73|95|6F|7A|9C|67|22|
|FC|61|21|01|00|22|F6|61|2A|F6|61|22|FE|61|2A|FE|
|61|EB|2A|FA|61|19|22|00|62|29|29|11|FC|FF|19|EB|
|2A|B6|5E|19|22|F8|61|2A|FE|61|29|29|11|FC|FF|19|
|EB|2A|B6|5E|19|CD|11|AA|2A|F8|61|CD|63|99|CD|FC|
|97|21|02|62|CD|02|AA|F2|6C|63|2A|FE|61|29|29|11|
|FC|FF|19|EB|2A|B6|5E|19|22|F8|61|CD|11|AA|21|06|
|62|CD|02|AA|2A|00|62|29|29|11|FC|FF|19|22|0C|62|
|EB|2A|B6|5E|19|CD|11|AA|2A|F8|61|CD|02|AA|2A|0C|
|62|EB|2A|B6|5E|19|22|0E|62|21|06|62|CD|11|AA|2A|
|0E|62|CD|02|AA|2A|FE|61|11|F6|FF|19|22|FE|61|29|
|11|DA|61|19|22|10|62|7E|23|66|6F|22|0A|62|2A|00|
|62|29|11|DA|61|19|22|12|62|7E|23|66|6F|EB|2A|10|
|62|73|23|72|2A|0A|62|EB|2A|12|62|73|23|72|2A|FE|
|61|7D|07|B5|E6|7F|B4|2F|3C|FA|9E|62|2A|F6|61|23|
|EB|2A|FC|61|EB|7B|95|7A|9C|F2|95|62|C3|67|62|2A|
|BA|5E|44|4D|2A|B8|5E|EB|21|DC|61|CD|68|68|C9|00|
|AA|AA|AA|AA|AA|AA|AA|AA|AA|AA|AA|AA|AA|AA|AA|AA|
|AA|AA|AA|AA|AA|AA|AA|AA|AA|AA|AA|AA|AA|AA|AA|AA|
|AA|AA|AA|AA|AA|AA|AA|AA|AA|AA|AA|AA|AA|AA|AA|AA|
|AA|AA|AA|AA|AA|AA|AA|AA|AA|AA|AA|AA|AA|AA|AA|AA|
|AA|AA|AA|AA|AA|AA|AA|AA|AA|AA|AA|AA|AA|AA|AA|AA|

```
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA

AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   62 68 46 68   22 90 63 EB   22 92 63 60
69 22 94 63   21 01 00 22   52 63 24 52   63 29 29 22
54 63 11 92   63 19 22 56   68 2A 52 68   29 29 29 29
22 58 68 11   FC FF 19 EB   2A 92 63 19   CD 11 AA 2A
56 63 CD 02   AA 2A 54 68   11 22 65 19   22 5A 68 2A
58 68 11 F0   FF 19 EB 2A   92 63 19 CD   11 AA 2A 5A
68 CD 02 AA   2A 52 68 29   29 11 32 66   19 22 54 68
2A 52 68 29   29 29 29 11   F4 FF 19 EB   2A 92 63 19
CD 11 AA 2A   54 68 CD 02   AA 2A 52 63   23 EB 2A 94
63 7E 23 66   6F EB 7B 95   7A 9C F2 77   63 21 C6 00
22 5C 68 21   C1 00 22 5E   68 EB 2A 5C   63 19 22 5E
68 01 64 68   2A 94 63 EB   21 60 68 CD   03 7B C9 00
AA AA AA AA   AA AA AA AA   AA AA AA AA   AA AA AA AA
AA AA 22 24   69 EB 22 26   69 3E 03 21   23 69 CD 02
AA 2A 24 69   7E 23 66 6F   CD 6E 9B 02   73 69 50 69
2A 26 69 7E   23 66 6F CD   6E 9B 0C 45   63 98 69 A5
69 B3 69 DB   69 EB 69 FE   69 11 6A 30   6A 49 6A 62
6A 7B 6A 2A   26 69 7E 23   66 6F CD 6E   9B 0D 45 6B
98 69 A5 69   B8 69 94 6A   A1 6A B4 6A   C7 6A DA 6A
ED 6A 12 6B   1F 6B 32 6B   2A 2A 69 CD   11 AA 21 20
69 CD 02 AA   C9 2A 2A 69   CD 11 AA 2A   2A 69 CD 6F
9A 21 20 69   CD 02 AA C9   2A 2A 69 CD   11 AA 21 03
00 CD 66 97   21 20 69 CD   02 AA C9 2A   2C 69 CD 11
AA 21 20 69   CD 02 AA C9   2A 2C 69 CD   11 AA 2A 2C
69 CD 6F 9A   21 20 69 CD   02 AA C9 2A   2C 69 CD 11
AA 21 03 00   CD 66 97 21   20 69 CD 02   AA C9 2A 2C

69 CD 11 AA   2A 2A 69 CD   6F 9A 21 20   69 CD 02 AA
C9 2A 2C 69   CD 11 AA 2A   2C 69 CD 6F   9A 2A 2A 69
CD 6F 9A 2A   2A 69 CD 6F   9A 21 20 69   CD 02 AA C9
2A 2C 69 CD   11 AA 2A 2C   69 CD 6F 9A   2A 2A 69 CD
6F 9A 21 20   69 CD 02 AA   C9 2A 2C 69   CD 11 AA 2A
2A 69 CD 6F   9A 2A 2A 69   CD 6F 9A 21   20 69 CD 02
AA C9 2A 2A   69 CD 11 AA   21 03 00 CD   66 97 2A 2C
69 CD 6F 9A   21 20 69 CD   02 AA C9 2A   2C 69 CD 11
AA 21 03 00   CD 66 97 2A   2A 69 CD 6F   9A 21 20 69
CD 02 AA C9   2A 2A 69 CD   AE 95 21 20   69 CD 02 AA
C9 2A 2A 69   CD 11 AA 21   56 63 CD B3   97 21 20 69
CD 02 AA C9   2A 2A 69 CD   11 AA 21 5A   63 CD B8 97
```

```
21 20 69 CD   02 AA C9 2A   2A 69 CD 11   AA 21 5E 6B
CD B3 97 21   20 69 CD 02   AA C9 21 52   63 CD 11 AA
2A 2A 69 CD   76 99 21 20   69 CD 02 AA   C9 2A 2A 69
CD 11 AA 21   02 00 CD 66   97 21 2E 69   CD 02 AA 21
52 63 CD 11   AA 21 2E 69   CD 76 99 21   20 69 CD 02
AA C9 2A 2A   69 CD 3F 97   21 20 69 CD   02 AA C9 2A
2A 69 CD 3F   97 2A 2A 69   CD 6F 9A 21   20 69 CD 02
AA C9 2A 2A   69 CD 3F 97   2A 2A 69 CD   76 99 21 20
69 CD 02 AA   C9 2A 28 69   CD 11 AA 21   20 69 CD 02
AA C9 00 00   00 81 00 00   40 81 4C A6   2A 7F D9 AC
2A 80 AA AA   AA AA AA AA   AA AA AA AA   AA AA AA AA
AA AA AA AA   AA AA AA AA   AA AA AA AA   AA AA AA 22
67 6B EB 22   69 6B 2A 67   6B CD 11 AA   21 26 6C CD
76 99 21 6B   6B CD 02 AA   21 1E 6C CD   11 AA 21 6F
6B CD 02 AA   21 22 6C CD   11 AA 21 73   63 CD 02 AA
21 73 6B CD   11 AA 21 6F   6B CD 01 99   21 73 63 CD
02 AA 2A 69   63 EB 21 73   6B CD 3A 82   21 6B 63 CD
63 99 21 77   6B CD 02 AA   FA 80 6B CA   11 6C 21 73
6B CD 11 AA   21 6F 63 CD   63 99 21 73   63 CD 02 AA
21 6F 6B CD   11 AA 21 2A   6C CD 76 99   21 6F 6B CD

02 AA 21 2E   6C CD 63 99   21 73 6B CD   02 AA F2 30
6B 21 73 6B   CD 11 AA 21   63 63 CD 02   AA C9 00 00
00 81 00 00   00 00 00 00   48 87 00 00   20 84 0A 07
23 79 AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA

AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
```

```
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA

AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA

AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
AA AA AA AA   AA AA AA AA   AA AA AA AA   AA AA AA AA
```

```
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA

AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA 28 46 32    30 2E 38 29    22 33 6C EB    22 35 6C 3E
06 21 37 6C    CD D2 AA 2A    33 6C CD B8    93 EB 2A 33
6C 73 23 72    2A 35 6C 7E    23 66 6F CD    4E 9B 21 AF
7A CD 02 AA    21 06 00 22    B3 7A 21 01    00 22 B5 7A
21 01 00 22    B7 7A 2A B5    7A 29 29 22    B9 7A 2A B7
7A EB 21 13    00 CD E9 9B    EB 2A B9 7A    19 11 A7 6D
19 22 BB 7A    2A B5 7A 29    2B 2B EB 2A    41 6C 19 22
BD 7A 2A B7    7A 29 29 11    FC FF 19 22    BF 7A EB 2A
3D 6C 19 22    C1 7A 2A BF    7A EB 2A 39    6C 19 22 C3
7A 2A BF 7A    EB 2A 3B 6C    19 22 C5 7A    2A C1 7A 22
C7 7A 2A C3    7A 22 C9 7A    2A C5 7A 22    C3 7A 01 C7
7A 2A BD 7A    EB 2A 33 6C    CD 32 69 2A    BB 7A CD 02
AA 2A B7 7A    23 EB 2A 35    6C 7E 23 66    6F EB 7B 95
7A 9C F2 43    7B 2A B5 7A    23 E3 2A B3    7A EB 7B 95
7A 9C F2 3D    7B 21 01 00    22 B5 7A 21    01 00 22 CD
7A 21 EB 81    CD 11 AA 21    CF 7A CD 02    AA 21 00 00

CD 4E 9B 21    D3 7A CD 02    AA 21 00 00    CD 4E 9B 21
D7 7A CD 02    AA 21 01 00    22 B7 7A 2A    B5 7A 29 29
```

| 51 | | | | | | | | | | | |
|---|---|---|---|---|---|---|---|---|---|---|---|
| 22 | B9 | 7A | 2A | B7 | 7A | EB | 21 | 18 | 00 | CD | E9 | 9B | 22 | B3 | 7A |
| EB | 2A | B9 | 7A | 19 | 11 | A7 | 6D | 19 | 22 | BD | 7A | 2A | CD | 7A | 29 |
| 29 | 22 | BF | 7A | 2A | BB | 7A | EB | 2A | BF | 7A | 19 | 11 | A7 | 6D | 19 |
| CD | 11 | AA | 2A | BD | 7A | CD | 6F | 9A | 21 | CF | 7A | CD | 01 | 99 | 21 |
| CF | 7A | CD | 02 | AA | 2A | BD | 7A | CD | 11 | AA | 21 | D3 | 7A | CD | 01 |
| 99 | 21 | D3 | 7A | CD | 02 | AA | 2A | CD | 7A | 29 | 29 | 22 | B9 | 7A | 2A |
| B7 | 7A | EB | 21 | 18 | 00 | CD | E9 | 9B | EB | 2A | B9 | 7A | 19 | 11 | A7 |
| 6D | 19 | CD | 11 | AA | 21 | D7 | 7A | CD | 01 | 99 | 21 | D7 | 7A | CD | 02 |
| AA | 2A | B7 | 7A | 23 | EB | 2A | 35 | 6C | 7E | 23 | 66 | 6F | EB | 7B | 95 |
| 7A | 9C | F2 | 18 | 7C | 2A | B5 | 7A | 29 | 29 | 22 | B9 | 7A | 2A | CD | 7A |
| EB | 21 | 18 | 00 | CD | E9 | 9B | EB | 2A | B9 | 7A | 19 | 11 | 27 | 6C | 19 |
| 22 | BB | 7A | 21 | D7 | 7A | CD | 11 | AA | 21 | D3 | 7A | CD | 6F | 9A | 21 |
| AF | 7A | CD | 76 | 99 | 21 | CF | 7A | CD | 63 | 99 | CD | FC | 97 | 2A | BB |
| 7A | CD | 02 | AA | 2A | CD | 7A | 23 | EB | 2A | B3 | 7A | E3 | 7B | 95 | 7A |
| 9C | F2 | EE | 7B | 2A | B5 | 7A | 23 | EB | 2A | B3 | 7A | E3 | 7B | 95 | 7A |
| 9C | F2 | E8 | 7B | 01 | 1B | 6D | 11 | 43 | 6C | 21 | B3 | 7A | CD | 4C | 35 |
| 21 | 02 | 00 | 22 | CD | 7A | 2A | CD | 7A | 29 | 29 | 22 | B9 | 7A | 11 | A7 |
| 6D | 19 | 22 | BB | 7A | 2A | B9 | 7A | 11 | 17 | 6D | 19 | CD | 11 | AA | 21 |
| 1B | 6D | CD | 76 | 99 | CD | FC | 97 | 2A | B3 | 7A | CD | 02 | AA | 2A | CD |
| 7A | 23 | EB | 2A | B3 | 7A | E3 | 7B | 95 | 7A | 9C | F2 | 23 | 7D | 21 | E7 |
| 31 | CD | 11 | AA | 21 | 43 | 6C | CD | 76 | 99 | 21 | 1B | 6D | CD | 76 | 99 |
| 21 | E7 | 31 | CD | 63 | 99 | CD | FC | 97 | 21 | DF | 7A | CD | 02 | AA | 21 |
| DF | 7A | CD | AE | 95 | 21 | DB | 7A | CD | 02 | AA | 21 | 01 | 00 | 22 | B5 |
| 7A | 2A | B5 | 7A | 29 | 29 | 11 | 1F | 77 | 19 | 22 | B9 | 7A | 21 | EB | 81 |
| CD | 11 | AA | 2A | B9 | 7A | CD | 02 | AA | 2A | B5 | 7A | 23 | 3E | 06 | 95 |
| 3E | 00 | 9C | F2 | 8E | 7D | 21 | 01 | 00 | 22 | B5 | 7A | 21 | 01 | 00 | 22 |
| B7 | 7A | 2A | B5 | 7A | 29 | 29 | 22 | B9 | 7A | 11 | 1F | 77 | 19 | 22 | BB |
| 7A | 2A | B7 | 7A | EB | 21 | 18 | 00 | CD | E9 | 9B | EB | 2A | B9 | 7A | 19 |
| 11 | A7 | 6D | 19 | CD | 11 | AA | 2A | BB | 7A | CD | 01 | 99 | 2A | B3 | 7A |
| CD | 02 | AA | 2A | B7 | 7A | 23 | EB | 2A | 35 | 6C | 7E | 23 | 66 | 6F | EB |

| 52 | | | | | | | | | | | |
|---|---|---|---|---|---|---|---|---|---|---|---|
| 7B | 95 | 7A | 9C | F2 | 3F | 7D | 2A | B5 | 7A | 23 | EB | 2A | B3 | 7A | EB |
| 7B | 95 | 7A | 9C | F2 | 39 | 7D | 21 | 01 | 00 | 22 | B5 | 7A | 2A | B5 | 7A |
| 29 | 29 | 11 | 1F | 77 | 19 | 22 | B9 | 7A | CD | 11 | AA | 21 | AF | 7A | CD |
| 76 | 99 | 2A | B9 | 7A | CD | 02 | AA | 2A | B5 | 7A | 23 | EB | 2A | B3 | 7A |
| EB | 7B | 95 | 7A | 9C | F2 | 1A | 7E | 21 | C0 | 00 | CD | 4E | 9B | 21 | E3 |
| 7A | CD | 02 | AA | 21 | 02 | 00 | 22 | B5 | 7A | 2A | B5 | 7A | 29 | 29 | 22 |
| B9 | 7A | 11 | A7 | 6D | 19 | 22 | BB | 7A | 2A | B9 | 7A | 11 | 1F | 77 | 19 |
| CD | 11 | AA | 2A | B3 | 7A | CD | 01 | 99 | 21 | E3 | 7A | CD | 01 | 99 | 21 |
| E3 | 7A | CD | 02 | AA | 2A | B5 | 7A | 23 | EB | 2A | B3 | 7A | EB | 7B | 95 |
| 7A | 9C | F2 | 57 | 7E | 21 | 23 | 77 | CD | 11 | AA | 21 | E3 | 7A | CD | 63 |
| 99 | 21 | AB | 6D | CD | 02 | AA | 2A | 35 | 6C | 7E | 23 | 66 | 6F | EB | 2A |
| B3 | 7A | 7B | 95 | 6F | 7A | 9C | 67 | 22 | E7 | 7A | CD | 4E | 95 | 21 | E9 |
| 7A | CD | 02 | AA | 11 | E7 | 7A | 21 | F3 | 81 | CD | 7F | 63 | 21 | 83 | 77 |
| CD | 02 | AA | 11 | E7 | 7A | 21 | F7 | 81 | CD | 7F | 63 | 21 | 87 | 77 | CD |
| 02 | AA | 11 | E7 | 7A | 21 | FB | 81 | CD | 7F | 6B | 21 | 83 | 77 | CD | 02 |
| AA | 21 | EB | 81 | CD | 11 | AA | 21 | ED | 7A | CD | 02 | AA | 21 | 01 | 00 |
| 22 | B5 | 7A | 2A | B5 | 7A | EB | 21 | 18 | 00 | CD | E9 | 9B | 11 | A3 | 6D |
| 19 | CD | 11 | AA | 21 | AB | 6D | CD | 63 | 99 | 21 | E3 | 7A | CD | 02 | AA |
| 21 | 02 | 00 | 22 | B7 | 7A | 2A | B7 | 7A | 29 | 29 | 22 | B9 | 7A | 2A | B5 |
| 7A | EB | 21 | 18 | 00 | CD | E9 | 9B | EB | 2A | B9 | 7A | 19 | 11 | A7 | 6D |
| 19 | 22 | BB | 7A | 2A | B9 | 7A | 11 | A7 | 6D | 19 | CD | 11 | AA | 2A | BB |
| 7A | CD | 6F | 9A | 21 | E3 | 7A | CD | 63 | 99 | CD | FC | 97 | 21 | E3 | 7A |
| CD | 02 | AA | 2A | B7 | 7A | 23 | EB | 2A | B3 | 7A | EB | 7B | 95 | 7A | 9C |
| F2 | 23 | 7F | 2A | B5 | 7A | 29 | 29 | 22 | B9 | 7A | 11 | 83 | 77 | 19 | 22 |
| BB | 7A | 21 | E3 | 7A | CD | 11 | AA | 2A | B3 | 7A | CD | 02 | AA | 2A | B9 |

```
7A 11 1B 79   19 22 BD 7A   2A B9 7A 11   BF 6D 19 CD
11 AA 21 E3   7A CD 63 99   2A BD 7A CD   02 AA 21 E3
7A CD 11 AA   21 E3 7A CD   6F 9A 21 ED   7A CD 01 99
21 ED 7A CD   02 AA 2A B5   7A 23 EB 2A   35 6C 7E 23
66 6F EB 7B   95 7A 9C F2   00 7F 21 E7   7A CD 2D 96
21 DF 7A CD   02 AA 21 ED   7A CD 11 AA   21 DF 7A CD
76 99 21 F3   7A CD 02 AA   21 F3 7A CD   AE 95 21 ED

7A CD 02 AA   2A 35 6C 7E   23 66 6F 23   22 F1 7A 21
01 00 22 B5   7A 21 01 00   22 F7 7A 21   E3 31 CD 11
AA 21 E3 7A   CD 02 AA 21   01 00 22 B7   7A 2A B7 7A
EB 2A 35 7A   7B 95 6F 7A   9C 67 22 B9   7A 7D 07 35
E6 7F 34 2F   3C FA 63 80   21 E7 31 CD   11 AA 21 F9
7A CD 02 AA   21 E7 81 CD   11 AA 21 FD   7A CD 02 AA
C3 A7 80 2A   B5 7A 29 29   22 B9 7A 2A   B7 7A E9 21
18 00 CD E9   9B 22 B3 7A   EB 2A 39 7A   19 11 8F 6D
19 CD 11 AA   21 F9 7A CD   02 AA 2A F7   7A 29 29 22
BD 7A 2A BB   7A EB 2A BD   7A 19 11 8F   6D 19 CD 11
AA 21 FD 7A   CD 02 AA 21   FD 7A CD 11   AA 21 F9 7A
CD 6F 9A 21   E3 7A CD 01   99 21 E3 7A   CD 02 AA 2A
B7 7A 23 EB   2A F1 7A EB   7B 95 7A 9C   F2 2A 80 2A
B5 7A 29 29   22 B9 7A 2A   B7 7A EB 21   13 00 CD E9
9B EB 2A B9   7A 19 11 27   6C 19 22 BB   7A 21 E3 7A
CD 11 AA 2A   B3 7A CD 02   AA 2A F7 7A   23 EB 2A B3
7A EB 7B 95   7A 9C F2 18   80 2A 35 7A   23 EB 2A B3
7A EB 7B 95   7A 9C F2 12   30 01 1B 6D   11 43 6C 21
B3 7A CD 4C   85 21 01 00   22 B5 7A 21   01 00 22 B7
7A 2A B5 7A   29 29 22 B9   7A 2A B7 7A   E3 21 0C 00
CD E9 9B EB   2A B9 7A 19   11 29 77 19   22 BB 7A 2A
B9 7A 11 7F   77 19 22 BD   7A 2A B7 7A   29 29 22 BF
7A 2A B7

```
83 CD 11 AA    21 2C 82 CD    02 AA C3 D2    83 21 04 00
22 30 82 C3    52 83 21 12    82 CD 11 AA    21 0E 82 CD
6F 9A 21 F9    83 CD 76 99    21 22 82 CD    02 AA 21 0E
32 CD A5 96    21 F9 83 CD    76 99 21 F5    83 CD 01 99
21 26 82 CD    02 AA 2A 06    82 7E 23 66    6F 2B 2B 2B
22 2A 82 7D    07 B5 E6 7F    B4 CA EE 82    21 05 00 22
30 82 21 EB    83 CD 11 AA    21 32 82 CD    02 AA 21 EB
83 CD 11 AA    21 2C 82 CD    02 AA 2A 30    82 22 36 82
2A 36 82 2B    2B 2B 22 2A    82 2A 36 82    2B 2B 22 38
82 21 38 82    CD 2D 96 21    16 82 CD 02    AA 21 2A 82
CD 2D 96 21    32 82 CD 6F    9A 21 32 82    CD 6F 9A 21
16 82 CD 76    99 21 32 82    CD 02 AA 21    32 82 CD 11
AA 21 2C 82    CD 01 99 21    2C 82 CD 02    AA 2A 36 82
23 23 EB 2A    06 32 7E 23    66 6F EB 7B    95 7A 9C F2
6D 83 21 2C    82 CD 11 AA    21 22 32 CD    6F 9A 21 26
32 CD 01 99    21 00 82 CD    02 AA C9 00    00 00 81 02
00 00 00 00    82 00 00 00    30 D7 0F 49    82 AA AA AA

AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    AA AA AA AA
AA AA AA AA    AA AA AA AA    AA AA AA AA    22 FE 83 EB
22 00 34 60    69 22 02 84    2A FE 83 7E    23 66 6F 22
24 85 21 C1    00 22 26 85    21 01 00 22    2B 85 2A 26
85 29 29 22    2C 85 2A 28    85 E3 21 13    00 CD E9 9B
EB 2A 2C 85    19 22 2E 85    11 E3 33 19    22 30 85 2A
2E 85 11 E4    FF 19 EB 2A    00 84 19 CD    11 AA 2A 30
85 CD 02 AA    2A 28 85 EB    2A FE 33 7E    23 66 6F 19
22 2A 85 2A    26 85 29 29    22 2C 85 2A    2A 85 E3 21
18 00 CD E9    9B EB 2A 2C    85 19 11 E3    83 19 22 2E
85 21 43 89    CD 11 AA 2A    2E 85 CD 02    AA 2A 28 85
23 EB 2A FE    83 7E 23 66    6F EB 7B 95    7A 9C F2 6B
85 2A 26 85    EB 2A FE 83    7E 23 66 6F    19 22 32 85

2A 26 85 29    29 22 2C 85    2A 32 85 E3    21 18 00 CD
E9 9B EB 2A    2C 85 19 11    E8 83 19 22    2E 85 21 3F
89 CD 11 AA    2A 2E 85 CD    02 AA 2A 26    85 23 EB 2A
FE 83 7E 23    66 6F EB 7B    95 7A 9C F2    65 85 2A FE
83 7E 23 66    6F 22 34 85    EB 2A 24 85    19 22 36 85
2A 34 85 23    22 38 85 2A    34 85 2B 22    3A 85 21 01
```

```
00 22 26 85    2A 26 85 29    29 22 2C 85    2A 26 85 EB
21 13 00 CD    E9 9B EB 2A    2C 85 19 11    E8 83 19 CD
11 AA 21 3C    85 CD 02 AA    2A 26 85 22    23 85 2A 26
85 29 29 22    2C 85 2A 28    85 EB 21 13    00 CD E9 9B
EB 2A 2C 85    19 11 E8 83    19 22 2E 85    CD 11 AA 21
3C 85 CD 76    99 2A 2E 85    CD 02 AA 2A    28 35 23 EB
2A 36 85 EB    7B 95 7A 9C    F2 83 86 2A    26 35 23 22
40 85 22 42    85 2A 42 85    29 29 22 2C    85 2A 26 85
EB 21 18 00    CD E9 9B EB    2A 2C 85 19    11 E8 83 19
CD 11 AA 21    44 85 CD 02    AA 21 01 00    22 28 85 2A
42 85 29 29    22 2C 85 2A    28 85 EB 21    13 00 CD E9
9B 22 2E 85    EB 2A 2C 85    19 11 E8 83    19 22 30 85
2A 26 85 29    29 22 48 85    2A 2E 85 EB    2A 48 85 19
11 E8 83 19    CD 11 AA 21    44 85 CD 6F    9A 2A 30 85
CD 63 99 CD    FC 97 2A 30    85 CD 02 AA    2A 28 85 23
EB 2A 36 85    EB 7B 95 7A    9C F2 FC 86    2A 42 85 23
EB 2A 34 85    EB 7B 95 7A    9C F2 D2 86    2A 26 85 23
EB 2A 3A 85    EB 7B 95 7A    9C F2 61 86    2A 38 85 22
28 85 2A 34    85 29 29 22    2C 85 2A 28    85 EB 21 18
00 CD E9 9B    EB 2A 2C 85    19 11 E8 83    19 22 2E 85
2A 34 85 EB    21 18 00 CD    E9 9B EB 2A    2C 85 19 11
E8 83 19 22    30 85 2A 2E    85 CD 11 AA    2A 30 85 CD
76 99 2A 2E    85 CD 02 AA    2A 28 35 23    EB 2A 36 85
EB 7B 95 7A    9C F2 7F 87    2A 34 85 29    29 22 2C 85
2A 34 85 EB    21 18 00 CD    E9 9B EB 2A    2C 85 19 11
E8 83 19 22    2E 85 21 3F    89 CD 11 AA    2A 2E 85 CD

02 AA 21 C2    C

| | | | | | | | | | | | | | | |
|---|---|---|---|---|---|---|---|---|---|---|---|---|---|---|
| CD | FF | FF | 2A | A8 | 5B | 23 | EB | 2A | 7C | 5B | EB | 73 | 95 | 7A | 9C |
| F2 | FF | FF | 2A | D2 | 57 | 44 | 4D | 2A | D6 | 57 | EB | 21 | 48 | 53 | CD |

| | | | | | | | | | | | |
|---|---|---|---|---|---|---|---|---|---|---|---|
| 00 | 00 | 2A | 7E | 5B | 23 | 22 | D6 | 39 | EB | 22 | D8 | 89 | 3E | 06 | 21 |
| DA | 89 | CD | D2 | AA | 2A | D6 | 89 | CD | 11 | AA | 2A | D8 | 89 | CD | 63 |
| 99 | 21 | E6 | 89 | CD | 02 | AA | F2 | 39 | 8A | 2A | D8 | 89 | CD | 11 | AA |
| 21 | EA | 89 | CD | 02 | AA | C3 | 69 | 8A | 2A | D6 | 89 | CD | 11 | AA | 2A |
| DA | 89 | CD | 63 | 99 | 21 | E6 | 89 | CD | 02 | AA | F2 | 5D | 8A | 2A | D6 |
| 89 | CD | 11 | AA | 21 | EA | 89 | CD | 02 | AA | C3 | 69 | 8A | 2A | DA | 89 |
| CD | 11 | AA | 21 | EA | 89 | CD | 02 | AA | 2A | DC | 89 | CD | 11 | AA | 2A |
| DE | 89 | CD | 63 | 99 | 21 | E6 | 89 | CD | 02 | AA | F2 | 8D | 8A | 2A | DE |
| 89 | CD | 11 | AA | 21 | EE | 89 | CD | 02 | AA | C3 | BD | 8A | 2A | DC | 89 |
| CD | 11 | AA | 2A | E0 | 89 | CD | 63 | 99 | 21 | E6 | 89 | CD | 02 | AA | F2 |
| 81 | 8A | 2A | DC | 89 | CD | 11 | AA | 21 | EE | 89 | CD | 02 | AA | C3 | BD |
| 8A | 2A | E0 | 89 | CD | 11 | AA | 21 | EE | 89 | CD | 02 | AA | 2A | E2 | 89 |
| 7E | 23 | 66 | 6F | CD | 6E | 93 | 11 | EA | 8A | 1D | 8B | CE | 8B | 34 | 8C |
| A6 | 8C | 39 | 8D | C6 | 8D | 10 | 8F | 3D | 8F | 58 | 8F | 03 | 90 | B7 | 90 |
| 77 | 91 | D1 | 91 | 2B | 92 | C1 | 92 | 00 | 93 | 21 | 32 | 94 | CD | 11 | AA |
| 21 | EE | 89 | CD | 6F | 9A | 21 | E6 | 89 | CD | 02 | AA | 21 | 2E | 94 | CD |
| 11 | AA | 21 | EA | 89 | CD | 6F | 9A | 21 | E6 | 89 | CD | 63 | 99 | 21 | 2A |
| 94 | CD | 01 | 99 | 21 | D2 | 89 | CD | 02 | AA | C3 | 07 | 94 | 21 | EE | 39 |
| CD | 11 | AA | 21 | C3 | 00 | CD | 66 | 97 | 21 | 4E | 94 | CD | 6F | 9A | 21 |
| EA | 89 | CD | 6F | 9A | 21 | E6 | 89 | CD | 02 | AA | 21 | 4A | 94 | CD | 11 |
| AA | 21 | EE | 89 | CD | 6F | 9A | 21 | EA | 89 | CD | 6F | 9A | 21 | F2 | 89 |
| CD | 02 | AA | 21 | 46 | 94 | CD | 11 | AA | 21 | EE | 89 | CD | 6F | 9A | 21 |
| F6 | 89 | CD | 02 | AA | 21 | EE | 39 | CD | 11 | AA | 21 | 02 | 00 | CD | 66 |
| 97 | 21 | 42 | 94 | CD | 6F | 9A | 21 | FA | 89 | CD | 02 | AA | 21 | 3E | 94 |
| CD | 11 | AA | 21 | EA | 39 | CD | 6F | 9A | 21 | FE | 39 | CD | 02 | AA | 21 |
| EA | 89 | CD | 11 | AA | 21 | 02 | 00 | CD | 66 | 97 | 21 | 3A | 94 | CD | 6F |
| 9A | 21 | FE | 89 | CD | 63 | 99 | 21 | FA | 89 | CD | 01 | 99 | 21 | F6 | 39 |
| CD | 01 | 99 | 21 | F2 | 39 | CD | 63 | 99 | 21 | E6 | 89 | CD | 01 | 99 | 21 |
| 36 | 94 | CD | 01 | 99 | 21 | D2 | 39 | CD | 02 | AA | C3 | 07 | 94 | 21 | 62 |
| 94 | CD | 11 | AA | 21 | EE | 89 | CD | 6F | 9A | 21 | E6 | 89 | CD | 02 | AA |
| 21 | 5E | 94 | CD | 11 | AA | 21 | EA | 89 | CD | 6F | 9A | 21 | F2 | 89 | CD |
| 02 | AA | 21 | EE | 89 | CD | AE | 95 | 21 | 5A | 94 | CD | 6F | 9A | 21 | F6 |

| | | | | | | | | | | | |
|---|---|---|---|---|---|---|---|---|---|---|---|
| 89 | CD | 02 | AA | 21 | EA | 89 | CD | AE | 95 | 21 | 56 | 94 | CD | 6F | 9A |
| 21 | F6 | 89 | CD | 63 | 99 | 21 | F2 | 39 | CD | 63 | 99 | 21 | E6 | 89 | CD |
| 63 | 99 | 21 | 52 | 94 | CD | 63 | 99 | CD | FC | 97 | 21 | D2 | 39 | CD | 02 |
| AA | C3 | 07 | 94 | 21 | EE | 89 | CD | 11 | AA | 21 | 02 | 00 | CD | 66 | 97 |
| 21 | 76 | 94 | CD | 6F | 9A | 21 | E6 | 89 | CD | 02 | AA | 21 | 72 | 94 | CD |
| 11 | AA | 21 | EE | 89 | CD | 6F | 9A | 21 | F2 | 39 | CD | C2 | AA | 21 | EA |
| 39 | CD | 11 | AA | 21 | 02 | 00 | CD | 66 | 97 | 21 | 6E | 94 | CD | 6F | 9A |
| 21 | F6 | 89 | CD | 02 | AA | 21 | 6A | 94 | CD | 11 | AA | 21 | EA | 89 | CD |
| 6F | 9A | 21 | F6 | 89 | CD | 63 | 99 | 21 | F2 | 39 | CD | 63 | 99 | 21 | E6 |
| 89 | CD | 63 | 99 | 21 | 66 | 94 | CD | 01 | 99 | CD | FC | 97 | 21 | D2 | 39 |
| CD | 02 | AA | C3 | C7 | 94 | 21 | EE | 89 | CD | 11 | AA | 21 | 02 | 00 | CD |
| 66 | 97 | 21 | 8E | 94 | CD | 6F | 9A | 21 | E6 | 89 | CD | 02 | AA | 21 | 3A |
| 94 | CD | 11 | AA | 21 | EA | 89 | CD | 6F | 9A | 21 | F2 | 89 | CD | C2 | AA |
| 21 | EA | 89 | CD | 11 | AA | 21 | 03 | 00 | CD | 66 | 97 | 21 | 86 | 94 | CD |
| 6F | 9A | 21 | F6 | 89 | CD | 02 | AA | 21 | EA | 39 | CD | 11 | AA | 21 | 02 |
| 00 | CD | 66 | 97 | 21 | 7E | 94 | CD | 6F | 9A | 21 | EE | 89 | CD | 6F | 9A |
| 21 | FA | 89 | CD | C2 | AA | 21 | 7A | 94 | CD | 11 | AA | 21 | EE | 89 | CD |
| 6F | 9A | 21 | FA | 89 | CD | 01 | 99 | 21 | F6 | 39 | CD | 01 | 99 | 21 | F2 |
| 89 | CD | 63 | 99 | 21 | E6 | 89 | CD | 01 | 99 | 21 | 82 | 94 | CD | 01 | 99 |
| 21 | D2 | 39 | CD | 02 | AA | C3 | 07 | 94 | 21 | EE | 39 | CD | 11 | AA | 21 |
| 03 | 00 | CD | 66 | 97 | 21 | A6 | 94 | CD | 6F | 9A | 21 | E6 | 39 | CD | 02 |

```
AA 21 EE 89   CD 11 AA 21   02 00 CD 66   97 21 A2 94
CD 6F 9A 21   F2 89 CD 02   AA 21 9E 94   CD 11 AA 21
EE 89 CD 6F   9A 21 F6 89   CD 02 AA 21   EA 89 CD 11
AA 21 02 00   CD 66 97 21   9A 94 CD 6F   9A 21 FA 89
CD 02 AA 21   96 94 CD 11   AA 21 EA 89   CD 6F 9A 21
FA 89 CD 01   99 21 F6 89   CD 01 99 21   F2 89 CD 63
99 21 E6 89   CD 01 99 21   92 94 CD 63   99 21 D2 89
CD 02 AA C3   07 94 2A E4   89 7E 23 66   6F CD 6E 9B
02 D5 8D 5F   8E 21 C2 94   CD 11 AA 21   EE 89 CD 6F
9A 21 EA 89   CD 6F 9A 21   C6 94 CD 63   99 21 EE 89
CD 6F 9A 21   EA 89 CD 6F   9A 21 E6 89   CD 02 AA 21

BA 94 CD 11   AA 21 EE 89   CD 6F 9A 21   BE 94 CD 63
99 21 EE 89   CD 6F 9A 21   F2 89 CD 02   AA 21 AE 94
CD 11 AA 21   EA 89 CD 6F   9A 21 B2 94   CD 63 99 21
EA 89 CD 6F   9A 21 B6 94   CD 01 99 21   EA 89 CD 6F
9A 21 F2 89   CD 63 99 21   E6 89 CD 01   99 21 AA 94
CD 63 99 CD   FC 97 21 D2   89 CD 02 AA   C3 07 94 21
EE 89 CD 11   AA 21 02 00   CD 66 97 21   E6 89 CD 02
AA 21 EA 89   CD 11 AA 21   02 00 CD 66   97 21 F2 89
CD 02 AA 21   E6 89 CD 6F   9A 21 DE 94   CD 6F 9A 21
F6 89 CD 02   AA 21 EA 89   CD 11 AA 21   03 00 CD 66
97 21 DA 94   CD 6F 9A 21   EE 89 CD 6F   9A 21 FA 89
CD 02 AA 21   EE 89 CD 11   AA 21 04 00   CD 66 97 21
D6 94 CD 6F   9A 21 FE 89   CD 02 AA 21   D2 94 CD 11
AA 21 EA 89   CD 6F 9A 21   02 8A CD 02   AA 21 F2 89
CD 11 AA 21   CE 94 CD 6F   9A 21 02 8A   CD 63 99 21
FE 89 CD 01   99 21 FA 89   CD 63 99 21   F6 89 CD 63
99 21 CA 94   CD 01 99 21   D2 89 CD 02   AA C3 07 94
2A E4 89 CD   2D 96 21 E2   94 CD 6F 9A   21 E6 89 CD
02 AA 21 EA   89 CD 11 AA   21 E6 89 CD   76 99 21 26
94 CD 01 99   21 D2 89 CD   02 AA C3 07   94 21 EA 89
CD 11 AA 21   EA 94 CD 38   97 21 E6 94   CD 6F 9A 21
D2 89 CD 02   AA C3 07 94   21 EE 89 CD   11 AA 21 02
00 CD 66 97   21 06 95 CD   6F 9A 21 E6   89 CD 02 AA
21 02 95 CD   11 AA 21 EE   89 CD 6F 9A   21 EA 89 CD
6F 9A 21 F2   89 CD 02 AA   21 FE 94 CD   11 AA 21 EE
89 CD 6F 9A   21 F6 89 CD   02 AA 21 EE   89 CD 11 AA
21 04 00 CD   66 97 21 FA   94 CD 6F 9A   21 FA 89 CD
02 AA 21 F6   94 CD 11 AA   21 EA 89 CD   6F 9A 21 FE
89 CD 02 AA   21 EA 89 CD   11 AA 21 02   00 CD 66 97
21 F2 94 CD   6F 9A 21 FE   89 CD 01 99   21 FA 89 CD
63 99 21 F6   89 CD 01 99   21 F2 89 CD   01 99 21 E6
89 CD 63 99   21 EE 94 CD   01 99 21 D2   89 CD 02 AA

C3 07 94 2A   E4 89 7E 23   66 6F CD 6E   93 11 30 90
4B 90 4B 90   43 90 43 90   66 90 9C 90   66 90 66 90
66 90 9C 90   9C 90 9C 90   9C 90 31 90   9C 90 9C 90
21 0A 95 CD   11 AA 21 EA   89 CD 6F 9A   21 0E 95 CD
63 99 21 D2   89 CD 02 AA   C3 07 94 21   12 95 CD 11
AA 21 EA 89   CD 6F 9A 21   16 95 CD 63   99 21 D2 89
CD 02 AA C3   07 94 21 1A   95 CD 11 AA   21 EA 89 CD
6F 9A 21 1E   95 CD 63 99   21 D2 89 CD   02 AA C3 BE
93 21 22 95   CD 11 AA 21   EA 89 CD 6F   9A 21 26 95
CD 63 99 21   D2 89 CD 02   AA C3 BE 93   21 2A 95 CD
11 AA 21 EA   89 CD 6F 9A   21 26 94 CD   63 99 21 D2
89 CD 02 AA   C3 BE 93 2A   E4 89 7E 23   66 6F CD 6E
```

```
9B 11 62 91    62 91 38 91    E4 90 F9 90    23 91 4D 91
E4 90 4D 91    0E 91 0E 91    E4 90 E4 90    0E 91 62 91
0E 91 4D 91    21 2E 95 CD    11 AA 21 EA    89 CD 6F 9A
21 D2 89 CD    C2 AA C3 E4    93 21 32 95    CD 11 AA 21
EA 89 CD 6F    9A 21 D2 89    CD 02 AA C3    E4 93 21 36
95 CD 11 AA    21 EA 89 CD    6F 9A 21 D2    89 CD 02 AA
C3 E4 93 21    3A 95 CD 11    AA 21 EA 89    CD 6F 9A 21
D2 89 CD 02    AA C3 E4 93    21 3E 95 CD    11 AA 21 EA
89 CD 6F 9A    21 D2 89 CD    02 AA C3 E4    93 21 42 95
CD 11 AA 21    EA 89 CD 6F    9A 21 D2 89    CD 02 AA C3
E4 93 21 46    95 CD 11 AA    21 EA 89 CD    6F 9A 21 D2
89 CD 02 AA    C3 E4 93 21    EE 89 CD 11    AA 21 02 00
CD 66 97 21    E6 89 CD 02    AA 21 EA 89    CD 11 AA 21
02 00 CD 66    97 21 E6 89    CD 6F 9A 21    52 95 CD 6F
9A 21 F2 89    CD 02 AA 21    4E 95 CD 11    AA 21 EE 89
CD 6F 9A 21    EA 89 CD 6F    9A 21 F2 89    CD 63 99 21
4A 95 CD 63    99 CD FC 97    21 D2 89 CD    02 AA C3 07
94 21 EE 89    CD 11 AA 21    04 00 CD 66    97 21 62 95
CD 6F 9A 21    E6 89 CD 02    AA 21 5E 95    CD 11 AA 21
EA 89 CD 6F    9A 21 F2 89    CD 02 AA 21    EA 89 CD 11

AA 21 02 00    CD 66 97 21    5A 95 CD 6F    9A 21 F2 89
CD 63 99 21    E6 89 CD 63    99 21 56 95    CD 63 99 CD
FC 97 21 D2    89 CD 02 AA    C3 07 94 21    EE 89 CD 11
AA 21 04 00    CD 66 97 21    72 95 CD 6F    9A 21 E6 89
CD 02 AA 21    6E 95 CD 11    AA 21 EA 89    CD 6F 9A 21
F2 89 CD 02    AA 21 EA 89    CD 11 AA 21    02 00 CD 66
97 21 6A 95    CD 6F 9A 21    F2 89 CD 63    99 21 E6 89
CD 63 99 21    66 95 CD 01    99 CD FC 97    21 D2 89 CD
02 AA 21 EE    89 CD 11 AA    21 C2 00 CD    66 97 21 7A
95 CD 6F 9A    21 EA 89 CD    6F 9A 21 F6    89 CD 02 AA
21 76 95 CD    11 AA 21 EE    89 CD 6F 9A    21 F6 89 CD
01 99 21 D2    89 CD 01 99    21 D2 89 CD    02 AA C3 23
94 21 EE 89    CD 11 AA 21    86 95 CD B3    97 21 82 95
CD 6F 9A 21    EA 89 CD 6F    9A 21 E6 89    CD 02 AA 21
EE 89 CD AE    95 21 7E 95    CD 6F 9A 21    EA 89 CD 6F
9A 21 E6 89    CD 01 99 21    D2 89 CD 02    AA C3 07 94
21 EA 89 CD    11 AA 21 8A    95 CD 63 99    21 E6 89 CD
02 AA 2F 3C    F2 37 93 21    EE 89 CD 11    AA 21 8E 95
CD 63 99 21    EA 89 CD 01    99 21 E6 89    CD 02 AA 2F
3C FA 8B 93    C3 58 93 21    EE 89 CD 11    AA 21 EA 89
CD 01 99 21    92 95 CD 6F    9A 21 26 94    CD 63 99 21
D2 89 CD 02    AA C3 07 94    21 9A 95 CD    11 AA 21 EE
89 CD 6F 9A    21 E6 89 CD    02 AA 21 96    95 CD 11 AA
21 EA 89 CD    6F 9A 21 E6    89 CD 01 99    21 9E 95 CD
63 99 21 D2    89 CD 02 AA    C3 07 94 21    92 95 CD 11
AA 21 EE 89    CD 6F 9A 21    E6 89 CD 02    AA 21 A2 95
CD 11 AA 21    EA 89 CD 6F    9A 21 E6 89    CD 01 99 21
26 95 CD 63    99 21 D2 89    CD C2 AA C3    07 94 21 D2
89 CD 11 AA    21 A6 95 CD    63 99 21 E6    89 CD 02 AA
2F 3C F2 C7    94 21 A6 95    CD 11 AA 21    D2 89 CD 02
AA C3 07 94    21 D2 89 CD    11 AA 21 AA    95 CD 63 99
21 E6 89 CD    C2 AA 2F 3C    F2 C7 94 21    AA 95 CD 11

AA 21 D2 89    CD 02 AA 21    D2 89 CD 11    AA F2 1C 94
21 00 00 CD    4E 9B 21 D2    39 CD 02 AA    21 D2 89 CD
11 AA C9 C3    C7 94 00 00    00 81 33 59    55 31 00 C1
```

| | | | | | | | | | | | |
|---|---|---|---|---|---|---|---|---|---|---|---|
| 3C | 7E | 3E | E3 | 12 | 7F | 36 | AB | 0E | 80 | 0F | E8 | 71 | 74 | 99 | 01 |
| 0F | 7A | 22 | 91 | 2E | 73 | 89 | EC | 03 | 79 | 86 | 6D | 2C | 72 | 3E | 86 |
| 42 | 66 | CA | 8C | 71 | 73 | 28 | 7E | 6C | 7E | 61 | C3 | 13 | 81 | 73 | 82 |
| 32 | 6E | B0 | E3 | 3F | 73 | 82 | C5 | 21 | 7D | 5C | 6D | 45 | 7E | 95 | EC |
| 58 | 78 | 77 | 67 | 2D | 7E | 92 | 74 | 4D | 73 | 4F | 8F | 6D | 7B | F5 | 24 |
| 13 | 6F | 99 | 19 | 37 | 87 | 14 | 00 | 08 | 73 | 91 | 5C | 46 | 81 | D1 | F3 |
| 33 | 6F | B3 | 59 | 75 | 7F | 75 | FD | 02 | 7B | 20 | C8 | 40 | 73 | 99 | D4 |
| 40 | 7E | C0 | E2 | 15 | 7A | 60 | 76 | 4A | 73 | 4D | 62 | 2E | 84 | 52 | 27 |
| 20 | 7C | 71 | 1B | 1D | 80 | 2D | B2 | 7D | 82 | 6C | E7 | 73 | 7D | C2 | F5 |
| 10 | 82 | 8D | D0 | 4F | 79 | 06 | F0 | 56 | 7F | 52 | 10 | 12 | 84 | 49 | 29 |
| 68 | 73 | 0C | 02 | 5B | 80 | F5 | 49 | 6E | 7B | D5 | CE | 03 | 78 | 90 | 02 |
| 2F | 79 | 99 | 99 | 19 | 83 | 45 | 45 | 34 | 7F | FB | 54 | 15 | 8C | 71 | 72 |
| 3F | 73 | D5 | E5 | 14 | 72 | 0A | F4 | 09 | 79 | D0 | 16 | 43 | 5F | 83 | 0C |
| 2B | 7A | 7C | BB | 21 | 6E | 15 | 68 | 50 | 70 | 7B | 83 | 2F | 7D | 2E | 6E |
| 5B | 81 | CB | 7F | 03 | 7E | AC | AA | 2A | 82 | 56 | 7D | 2E | 7E | 81 | 95 |
| 23 | 82 | CC | CC | 4C | 7F | 00 | 00 | 00 | 82 | CC | CC | 4C | 7E | 26 | 31 |
| 08 | 7E | E9 | 0A | 36 | 7B | 6E | 12 | 03 | 7C | 5F | 03 | 36 | 7D | 58 | 39 |
| 34 | 7C | B5 | 88 | 08 | 7D | 6E | 12 | 03 | 7B | BE | 30 | 64 | 84 | 5E | 29 |
| 4B | 79 | 9B | 0F | 44 | 69 | F5 | 48 | 12 | 8A | 6C | 78 | 1A | 7F | D9 | CE |
| 0E | 84 | 49 | CB | 21 | 64 | 8C | 67 | 50 | 7C | 57 | 8D | 63 | 70 | 32 | 3B |
| 0B | 7A | 11 | 63 | 36 | 5E | 96 | 67 | 10 | 7A | 27 | 91 | 02 | 68 | 56 | 0A |
| 01 | 7B | C2 | D7 | 57 | 79 | 70 | 3D | 0A | 7F | 00 | 00 | 43 | 36 | 00 | 00 |
| 48 | 87 | 0A | D7 | 23 | 7A | CC | CC | 4C | 7B | 0A | D7 | 23 | 79 | 00 | 00 |
| 40 | 81 | 8F | C2 | 75 | 7B | 00 | 00 | 40 | 83 | 00 | 00 | 00 | 83 | CD | 11 |
| AA | C8 | FA | E7 | 95 | 78 | 1F | F5 | 3E | 40 | 17 | 47 | 32 | C3 | B3 | 3E |
| 04 | F5 | CD | 19 | 9C | D5 | C5 | 78 | 37 | CD | 79 | 99 | C1 | D1 | CD | 04 |
| 99 | 21 | 88 | 96 | CD | 6F | 9A | CD | 23 | 9C | F1 | 3D | C2 | C1 | 95 | F1 |
| C6 | C0 | 30 | 47 | C3 | 1A | AA | CD | 66 | 85 | 8B | 21 | C0 | B8 | CD | 11 |
| AA | 3E | 90 | B8 | CA | 22 | 96 | D2 | 00 | 96 | CD | 66 | 85 | 14 | 06 | 3F |

| | | | | | | | | | | | |
|---|---|---|---|---|---|---|---|---|---|---|---|
| CD | 3A | AA | CD | 30 | 97 | CD | 28 | AA | EB | C8 | EB | 21 | C4 | B3 | 36 |
| 80 | CD | 11 | 9C | 67 | 3E | 98 | 90 | CD | AE | AA | 7C | 17 | D4 | D2 | 9B |
| EB | C9 | 3E | 80 | A9 | B2 | B3 | C2 | FA | 95 | 61 | 6B | C9 | 7E | 23 | 66 |
| 6F | C3 | 4E | 9B | CD | 11 | AA | 21 | 21 | 97 | CD | 01 | 99 | C3 | 43 | 96 |
| CD | 11 | AA | C8 | 78 | FE | 99 | DA | 4E | 96 | CD | 66 | B5 | 17 | 01 | 22 |
| 7E | 11 | 83 | F9 | CD | 79 | 9A | CD | 19 | 9C | CD | E7 | 9A | CD | 23 | 9C |
| 78 | B1 | CD | 66 | 99 | 21 | 8C | 96 | CD | 63 | 99 | F5 | FA | 78 | 96 | 21 |
| 88 | 96 | CD | 63 | 99 | F4 | FC | 97 | 21 | 8C | 96 | CD | 01 | 99 | F1 | F4 |
| FC | 97 | 21 | 90 | 96 | C3 | C2 | 98 | 00 | C0 | 00 | 80 | 00 | 00 | 00 | 7F |
| 05 | FB | D7 | 1E | 86 | 64 | 26 | 99 | 87 | 53 | 34 | 23 | 87 | E1 | 5D | A5 |
| B6 | DB | 0F | 49 | 83 | CD | 11 | AA | F2 | B2 | 96 | CD | FC | 97 | 21 | FC |
| 97 | E5 | 01 | 00 | 81 | 51 | 59 | CD | 21 | 93 | DA | C7 | 96 | 21 | F8 | 96 |
| E5 | CD | E0 | 9B | CD | 7C | 99 | 01 | 09 | 7F | 11 | A3 | 33 | CD | 21 | 9B |
| DA | F2 | 96 | 21 | C1 | 97 | E5 | CD | 19 | 9C | 21 | 03 | 97 | CD | C1 | 99 |
| C1 | D1 | CD | E0 | 9B | D5 | C5 | 21 | 07 | 97 | CD | D6 | 93 | C1 | D1 | CD |
| 7C | 99 | 21 | 10 | 97 | C3 | C2 | 98 | 21 | 21 | 97 | CD | 63 | 99 | C3 | FC |
| 97 | 21 | 25 | 97 | C3 | 01 | 99 | 02 | D7 | 83 | 5D | 81 | 00 | 00 | 80 | 81 |
| 04 | 62 | 35 | 83 | 7E | 50 | 24 | 4C | 7E | 79 | A9 | AA | 7F | 00 | 00 | 00 |
| 81 | D3 | 0F | 49 | 81 | 92 | CA | 06 | 80 | C0 | 00 | 00 | 81 | CD | 11 | AA |
| C8 | F5 | FC | FC | 97 | CD | E7 | 9A | F1 | FA | FC | 97 | C3 | 41 | AA | CD |
| 11 | AA | CD | 79 | 98 | 01 | 31 | 80 | 11 | 1B | 72 | C3 | 73 | 9A | CD | F7 |
| A9 | 7A | B3 | C8 | 7C | B5 | C8 | 7C | AA | F5 | D5 | E3 | CD | 91 | 93 | E1 |
| F1 | FC | C4 | 9B | EB | C9 | 7C | B5 | CA | 0A | 98 | 7C | B7 | F2 | 79 | 97 |
| 11 | A3 | 97 | D5 | EB | CD | C4 | 9B | EB | 3E | 11 | 29 | 3D | D2 | 73 | 97 |
| E5 | 32 | 3F | B8 | 2A | C0 | B3 | 22 | A9 | B3 | 2A | C2 | B3 | 22 | A3 | 38 |
| 21 | BF | B8 | 35 | CA | A9 | 97 | CD | 28 | AA | CD | 75 | 9A | E1 | 29 | E5 |
| 21 | A9 | B8 | DC | 6F | 9A | C3 | 90 | 97 | E1 | C9 | 01 | 00 | 31 | 51 | 59 |

| | | | | | | | | | | | |
|---|---|---|---|---|---|---|---|---|---|---|---|
| CD | E0 | 9B | 78 | B1 | C3 | 79 | 99 | CD | 32 | AA | CA | 0A | 98 | F5 | CD |
| 41 | AA | CA | 12 | 93 | E1 | CD | 19 | 9C | F2 | DA | 97 | C5 | D5 | CD | EA |
| 9A | D1 | C1 | F5 | CD | 21 | 9B | E1 | 7C | 1F | CD | 1D | AA | C1 | D1 | D2 |
| E6 | 97 | 21 | FC | 97 | E5 | CC | F7 | 97 | CD | 19 | 9C | CD | 76 | 98 | C1 |
| D1 | CD | 75 | 9A | C3 | 19 | 9B | 3E | 7F | A1 | 4F | C9 | 21 | C3 | B8 | 7E |

| | | | | | | | | | | | |
|---|---|---|---|---|---|---|---|---|---|---|---|
| B7 | C3 | 2B | 3E | 80 | AE | 77 | C3 | 41 | AA | 01 | 00 | 81 | 51 | 59 | C3 |
| 1A | AA | F1 | FA | B4 | 9B | C3 | 41 | AA | 3A | C3 | B8 | FE | 88 | D2 | 50 |
| 98 | FE | 68 | DA | 48 | 98 | CD | 19 | 9C | CD | E7 | 9A | C5 | 81 | C1 | D1 |
| CA | 50 | 98 | F5 | CD | E0 | 9B | CD | 69 | 99 | 21 | 59 | 93 | CD | D6 | 98 |
| C1 | 11 | 00 | 00 | 4A | C3 | 79 | 9A | 01 | C0 | 81 | 51 | 59 | C3 | 1A | AA |
| CD | 41 | AA | FA | A1 | A9 | C3 | 70 | A9 | 07 | 7C | 83 | 59 | 74 | E0 | 97 |
| 26 | 77 | C4 | 1D | 1E | 7A | 5E | 50 | 63 | 7C | 1A | FE | 75 | 7E | 13 | 72 |
| 31 | 80 | 00 | 00 | C0 | 81 | CD | 1A | AA | E2 | 80 | 93 | CD | 66 | B5 | 3A |
| 3E | 80 | 32 | C3 | B8 | A8 | F5 | 21 | 9D | 93 | CD | D6 | 93 | F1 | CD | 19 |
| 9C | 6F | 17 | 9F | 67 | CD | 4E | 9B | C1 | D1 | C3 | 07 | 99 | 09 | D8 | EE |
| 94 | 82 | A9 | AA | 7D | 84 | 7D | 99 | BF | 86 | 7B | E5 | 23 | 87 | 8A | 71 |
| C0 | 87 | 6E | 95 | 14 | 37 | B2 | 1E | A0 | 86 | AD | 7A | 02 | 35 | C9 | 9D |
| 8D | 83 | EB | CD | 19 | 9C | D5 | CD | 28 | AA | CD | 75 | 9A | E1 | CD | D6 |
| 98 | C1 | D1 | C3 | 75 | 9A | EB | CD | 19 | 9C | E8 | 7E | F5 | 23 | CD | 11 |
| AA | F1 | C1 | D1 | 3D | C8 | D5 | C5 | F5 | E5 | 78 | B1 | CD | 72 | 9A | E1 |
| CD | 32 | AA | E5 | CD | 07 | 99 | E1 | C3 | E1 | 98 | CD | 60 | 9B | C3 | 04 |
| 99 | CD | 32 | AA | CA | 41 | AA | 3A | C3 | B3 | B7 | CA | 1A | AA | 90 | D2 |
| 17 | 99 | 2F | 3C | CD | E0 | 9B | FE | 19 | D2 | 41 | AA | F5 | CD | 04 | 9C |
| 67 | F1 | E5 | CD | AE | AA | F1 | B7 | 21 | C0 | 88 | F2 | 49 | 99 | 7E | 33 |
| 5F | 23 | 7E | 8A | 57 | 23 | 7E | 89 | 4F | D2 | 31 | A9 | 23 | 34 | CA | 70 |
| A9 | 2E | 01 | CD | C4 | AA | C3 | 81 | A9 | AF | 90 | 47 | 7E | 9B | 5F | 23 |
| 7E | 9A | 57 | 23 | 7E | 99 | 4F | DC | CC | 93 | C3 | C3 | A3 | CD | 60 | 9B |
| C3 | 66 | 99 | CD | 32 | AA | CA | 41 | AA | 3E | 80 | A9 | 4F | C3 | 07 | 99 |
| CD | 60 | 9B | C3 | 79 | 99 | CD | 32 | AA | CA | 34 | 9B | CD | 41 | AA | C8 |
| AF | 90 | 47 | CD | C7 | 9A | E3 | 22 | A9 | B3 | EB | 79 | 32 | AB | B3 | 46 |
| AF | 6F | CD | D7 | 9B | CD | E0 | 9B | 21 | C0 | 00 | 44 | E5 | 2A | C0 | B8 |
| 3A | C2 | B8 | 19 | 89 | 4F | D2 | 86 | 99 | 11 | C3 | B3 | E3 | 34 | EB | D1 |
| CA | 70 | A9 | C3 | CE | 99 | D1 | CD | DE | 99 | 67 | 2E | 00 | E5 | 2A | A9 |
| B8 | 3A | AB | B8 | 19 | 39 | 4F | D1 | 7A | 83 | D1 | D2 | B7 | 99 | CD | DE |
| 99 | 67 | 2E | FF | E5 | 2A | C0 | B8 | 3A | C2 | B8 | C3 | C4 | 99 | 73 | 3C |
| 3D | FA | F5 | 99 | 7B | 17 | 5F | 7A | 17 | 57 | 78 | 17 | 47 | 29 | 79 | 17 |
| 4F | 9F | EB | E3 | E9 | 1F | 48 | 47 | E1 | C3 | 81 | A9 | CD | 27 | 9A | 3E |

| | | | | | | | | | | | |
|---|---|---|---|---|---|---|---|---|---|---|---|
| 20 | 32 | F4 | B7 | 21 | 5C | 41 | 22 | F5 | B7 | 21 | 55 | 53 | 22 | F7 | 37 |
| 21 | 45 | 20 | 22 | F9 | B7 | CD | 38 | 9A | 2A | 11 | B7 | 36 | 0D | CD | 65 |
| 37 | FE | 54 | CA | 88 | 36 | C9 | E1 | E3 | C6 | 06 | 11 | F8 | 37 | 7E | 12 |
| 23 | 13 | 05 | C2 | 2E | 9A | E3 | E9 | 21 | F4 | B7 | 06 | 0D | C5 | 7E | CD |
| 3D | B7 | C1 | 05 | 23 | C2 | 3D | 9A | C9 | CD | 27 | 9A | 3E | 20 | 32 | F4 |
| B7 | 21 | 53 | 54 | 22 | F5 | B7 | 21 | 4F | 50 | 22 | F7 | B7 | 21 | 20 | 20 |
| 22 | F9 | B7 | CD | 38 | 9A | C3 | 88 | 36 | CD | 60 | 9B | C3 | 72 | 9A | CD |
| 32 | AA | CA | 1D | AA | CD | 41 | AA | C8 | CD | C7 | 9A | 79 | 0E | 00 | C5 |
| 0E | 03 | 2B | 46 | C5 | 2B | 46 | C5 | 2B | 46 | C5 | 77 | 01 | 00 | 00 | 60 |
| 68 | E3 | 7C | B7 | CA | 3F | 9A | 1F | 67 | 79 | E3 | D2 | A3 | 9A | 19 | 3A |
| C0 | B8 | 39 | 1F | 4F | 7C | 1F | 67 | 7D | 1F | 6F | 78 | 1F | 47 | E3 | 20 |
| 7C | C2 | 97 | 9A | E1 | E3 | 7D | B7 | C2 | 92 | 9A | D1 | C3 | C3 | A3 | E1 |
| 45 | 6C | 61 | 4F | C3 | 91 | 9A | 21 | C3 | B3 | 7E | 80 | 47 | 1F | A3 | 78 |
| F2 | DF | 9A | C6 | 80 | CA | A0 | A9 | 77 | CD | 04 | 9C | 77 | 2B | C9 | 37 |
| E1 | FA | 70 | A9 | C3 | A1 | A9 | CD | 28 | AA | 78 | FE | 98 | 7B | D2 | 1D |
| AA | 21 | C4 | B8 | 36 | 80 | CD | 11 | 9C | 77 | 67 | FA | 05 | 9B | 7A | 33 |
| C2 | 04 | 9B | 0D | 13 | 3E | 98 | 90 | CD | AE | AA | 7C | 17 | 04 | 93 | A9 |

```
06 00 7B F5   3E 98 32 C3   B8 CD C3 A8   F1 D8 2F 3C
C9 78 B1 CA   41 AA 21 49   AA E5 CD 41   AA 79 2F C8
21 C2 B8 AE   7E F0 CD 3C   9B 1F A9 C9   23 7E B3 C0
2B 7E 39 C0   2B 7E 3A C0   2B 93 C0 E1   E1 C9 4C 55
06 00 58 29   21 90 80 22   C3 B3 DC CC   93 C3 C3 A8
EB CD 19 9C   EB CD 4E 9B   C1 D1 CD E0   93 C9 7C B7
C2 8C 9B B5   CA 3C 9B D1   1A BD DA 85   93 29 19 2B
7E 23 66 6F   E9 6F 26 00   29 23 19 E9   D1 1A C3 B5
9B E3 7A B3   CA B4 9B 7A   B7 42 FC C4   93 7C A3 47
7C B5 C8 7C   B7 EB FC C4   9B C5 CD 7A   AA F1 B7 FC
C4 9B EB C9   CD 66 B5 B9   7E 23 66 6F   7C B7 EB FC
C4 9B EB C9   AF 4F 93 5F   79 9A 57 C9   21 C4 B3 7E
2F 77 AF 6F   90 47 7D 9B   5F 7D 9A 57   7D 99 4F C9
CD 19 9C CD   1D AA C1 D1   C9 7C B5 C8   EB 7C B5 C8
44 4D 21 00   C0 3E 10 29   EB 29 EB D2   FF 9B C9 3D

C2 F7 9B C9   21 C2 B8 7E   07 37 1F 77   3F 1F 23 23
77 79 07 37   1F 4F 1F AE   C9 2A C0 B8   E3 E5 2A C2
B8 E3 E9 E1   E3 22 C2 B8   E1 E3 22 C0   B3 C9 C0 00
F5 3E 02 C3   45 9C F5 3E   04 C3 45 9C   F5 3E 01 C3
45 9C F5 3E   08 32 93 B8   F1 CD E4 AA   CD F8 AA 7E
23 66 6F 22   85 B8 CD F8   AA D3 22 CA   B7 2A 85 B8
22 CE B7 3A   B9 B8 B7 CA   70 9C CD EE   9D C3 56 9C
CD 90 A5 C3   56 9C CD 66   B5 19 AF C9   3E 01 FE AF
32 A4 B8 AF   32 A5 B8 3C   32 89 B8 C3   B7 9C 3E 01
32 A4 B8 C3   A6 9C AF 32   A4 B8 3C C3   A6 9C 3E 01
FE AF 32 A4   B8 AF 32 A5   B8 AF 32 89   B3 7E 23 66
6F 22 BA B8   21 F4 B7 22   D1 B7 E6 7E   23 B6 23 C2
C5 9C 21 C0   C0 22 89 B8   21 00 00 39   23 23 22 2E
9C 3A A5 B8   B7 C2 E6 9C   67 6F 22 8D   B8 22 8F B8
22 91 B8 C3   14 9D 21 8D   98 3E 03 CD   D2 AA 2A 3D
B8 7E 23 B6   C2 FC 9C 67   6F 22 8D B8   2A 8F B8 7E
23 B6 C2 0A   9D 67 6F 22   8F B3 2A 91   B3 7E 23 66
6F 22 91 B8   AF 32 A6 98   32 B7 B8 32   B9 B8 32 33
B8 32 96 B8   32 EC B7 67   6F 22 93 B8   22 CE B7 CD
AB A9 2A 83   B8 7C B5 CA   4C 9D CD 02   A6 2A 93 B8
22 A7 B8 FE   28 CA 5E A5   CD 66 B5 B3   32 D5 B7 32
D3 B7 3C 32   B9 B8 3A A4   B8 B7 C8 3E   04 C3 65 A3
CD 9A A8 CD   A8 A0 FA 77   9D FE 0D C2   70 9D 3E 20
CD 9B A6 77   C3 63 9D 3A   EE B7 2F 3C   FA 39 9D CA
39 9D CD 9B   A6 3D C2 82   9D 32 EE B7   3A 9B B8 FE
04 CA 9B A7   2F C6 09 CA   9B A7 CD 99   A6 3D C3 97
9D CD 9A A8   3A EE B7 B7   FA BC 9D CA   BC 9D 06 20
F5 CD 50 A4   F1 3D C2 B0   9D 32 EE B7   F5 3A 9B B8
FE 04 C2 CE   9D 3E 04 CD   9B A6 3D C2   C7 9D 3A 9C
B8 47 CD 50   A4 CD 9B A6   C3 CE 9D 21   9C B8 11 C6
B8 0E 08 B7   1A 8E 77 13   23 0D C2 E4   90 C9 3A A4
9B B7 CA 14   9E 3A D5 B7   4F 3A D3 B7   32 3F B8 06
00 2A D1 B7   C9 EB 2A CA   B7 CD 32 9E   79 32 D5 B7
22 CA B7 C9   3A D3 B7 4F   06 00 3E 80   32 3F B8 2A
CA B7 EB 2A   D1 B7 09 CD   32 9E 79 32   D3 B7 EB C3
10 9E 3A 9B   B3 47 3A 3F   B8 3D 91 D2   72 9E E5 D5
3A A4 B8 B7   C2 5C 9E 3A   BF B3 32 D3   B7 3E 06 CD
65 A3 D1 E1   0E 00 2A D1   B7 C3 32 9E   3E 04 CD 65
A3 3A D3 B7   32 3F B8 2A   D1 B7 EB E1   E1 0E 00 C3
32 9E 1A 77   13 23 0C 05   C2 36 9E E5   2A CE B7 2B
```

```
22 CE 87 7C   B5 E1 C2 32   9E C9 3C FE   13 DA 92 9E
3E 12 47 21   D7 37 36 30   23 E5 C5 CD   A3 A8 C1 21
EE B7 34 E1   3A A3 B3 1F   1F 1F 1F E6   0F C6 30 77
CD 66 A9 C5   C2 98 9E 22   99 B3 06 05   7E 3C FE 3A
DA CC 9E D6   CA 77 06 01   2B C3 3C 9E   77 EB 21 D7
B7 7C 3A C2   E1 9E 7D BB   C2 E1 9E 21   EE 37 34 EB
FE 23 22 F1   B7 7C 2F 57   7D 2F 5F 13   2A 99 B3 19
22 99 38 C9   3E 01 FE AF   32 EC 37 3A   93 38 FE 04
DA C5 A1 CD   C3 A7 3A ED   B7 47 3A B3   B3 37 FA 13
9F 80 FE 78   32 EB B7 CD   8A 9E 3A B3   B3 B7 F2 22
9F AF 32 F0   B7 06 05 CD   02 A4 3A B3   B3 B7 F2 43
9F F5 06 30   CD 50 A4 21   EB B7 35 CA   54 9F F1 3C
C2 31 9F F5   3A EB B7 37   FA 54 9F CA   54 9F CD DD
A3 C3 44 9F   C6 45 3A EC   B7 B7 CA 5F   9F 06 44 CD
50 A4 3A EE   B7 21 B3 38   96 32 EE B7   FA 74 9F 06
2B C3 7B 9F   C6 2D 2F 3C   32 EE 37 CD   50 A4 3A EE
B7 5F 16 C0   21 0A 00 CD   7A AA F1 E5   73 C6 30 47
CD 50 A4 E3   7D C6 30 47   CD 50 A4 F1   C9 3A 93 B8
FE 04 DA C5   A1 CD C3 A7   3A ED 37 47   21 EE B7 3A
B3 B3 36 77   80 37 FA 3C   9F CD 3A 9E   AF 32 F0 37
3A ED 37 32   EB 37 3A EE   37 B7 FA D5   9F 32 F0 37
21 EB 37 86   77 06 01 CD   02 A4 F5 3A   EE 37 2F 37
FA FF 9F 2A   99 38 22 97   38 21 FF FF   22 99 B3 CD
DD A3 21 EE   B7 34 C2 EF   9F 2A 97 B8   22 99 B3 CD

DD A3 C3 FF   9F 3A 93 38   FE 04 DA C5   A1 CD C3 A7
3A EE 37 B7   FA 06 9F 21   ED B7 2F 3C   86 FA C6 9F
46 C5 77 21   87 B8 7E F5   D6 04 77 32   95 38 21 B3
38 7E F5 AF   77 3C 32 96   38 CD A8 9F   F1 32 B3 38
F1 32 87 B8   F1 32 ED B7   AF 32 96 88   3E 04 32 95
B8 F5 06 20   CD 50 A4 C3   52 A0 2A 93   B3 EB 2A 83
38 19 44 4D   2A B1 B8 E5   D5 C5 CD D8   A0 C1 D1 E1
02 13 03 2B   7C 35 C2 67   A0 22 31 B3   E3 22 93 38
C3 B0 A6 2A   93 38 EB 2A   B8 B3 19 46   E5 CD 50 A4
2A 93 38 23   22 93 B3 2A   31 B8 2B 22   B1 98 7C 35
E1 23 C2 8B   A0 C3 B0 A6   21 95 38 3A   D5 B7 4F 35
CA CE A0 3A   D3 37 89 CA   D3 A0 DA D3   A0 2A D1 B7
06 00 09 7E   CC 32 B8 B8   B7 21 D5 B7   71 C9 3E FF
C3 C5 A0 3E   20 C3 C5 A0   CD A8 A0 CA   E4 A0 FE 0A
C0 C3 D8 A0   21 95 B8 34   C3 D3 A0 3A   8A 98 FE 49
C2 23 A1 3A   ED 37 B7 CA   FE A0 CD 66   B5 9A 21 9E
B8 06 06 AF   B6 CA 0F A1   CD 66 B5 10   C3 14 A1 23
05 C2 04 A1   3A B4 B8 B7   CA 9B A7 2A   9C 38 7C 2F
67 7D 2F 6F   23 22 9C B8   C3 9B A7 3E   C0 32 D0 B7
21 ED 37 3A   EF 97 B7 C2   45 A1 3A 88   B3 B7 C2 45
A1 3A F3 B7   77 7E 2F 3C   47 3A 88 B3   B7 78 C2 55
A1 21 B3 B8   96 32 EE 37   CD E0 A8 3A   A3 38 B7 CA
9B A7 21 D0   B7 7E 90 77   3A EE 37 B7   C2 B0 A1 21
9C B8 06 07   3A 9B B8 FE   04 C2 81 A1   21 A0 B8 06
03 7E 17 23   7E CE 00 2B   77 23 05 C2   83 A1 D2 95
A1 21 D0 B7   34 3A A2 B8   E6 7F 6F 3A   B4 98 B7 CA
A6 A1 7D F6   80 6F 3A D0   B7 67 22 A2   B3 C3 9B A7
21 53 A1 E5   F2 A8 A8 C3   51 AA 3A 9B   B8 3D CA C9
A1 3D CA D4   A1 CD 66 B5   9A 3A 9C B8   6F 17 9F 67
22 9C 38 AF   67 6F 22 9E   38 22 A0 B8   32 A2 B8 3E
B8 32 A3 B8   CD C3 A7 3A   EE B7 CD 8A   9E 3A EE B7
32 EB 37 32   F0 B7 06 00   CD 02 A4 CD   0B A3 C3 0B
```

| | | | | | | | | | | | |
|---|---|---|---|---|---|---|---|---|---|---|---|
| A2 | CD | D8 | A0 | FE | 20 | C2 | 0B | A2 | 3E | 30 | FE | 30 | DA | 1C | A2 |
| FE | 3A | D2 | 1C | A2 | D6 | 30 | 32 | 38 | B3 | 37 | C9 | 3E | FF | B7 | C9 |
| AF | 32 | ED | B7 | 32 | EF | B7 | CD | 0B | A3 | FE | 2D | C2 | 37 | A2 | 3E |
| 01 | 32 | B4 | B8 | C3 | 3C | A2 | FE | 2B | C2 | 3F | A2 | CD | 0B | A3 | 37 |
| FA | 9B | A7 | 21 | D5 | B7 | 35 | 21 | 95 | B8 | 34 | CD | D2 | A2 | 3A | B8 |
| 38 | FE | 2E | C2 | 64 | A2 | 3E | 01 | 32 | EF | 37 | 32 | EE | B7 | CD | D2 |
| A2 | 3A | B8 | B8 | B7 | FA | EB | A0 | FE | 45 | 0E | 00 | CA | 74 | A2 | FE |
| 44 | C2 | 79 | A2 | CD | 0B | A3 | 0E | 01 | FE | 2B | CA | 83 | A2 | FE | 2D |
| C2 | 8D | A2 | 3E | 01 | 32 | D0 | B7 | CD | 03 | A3 | 0E | 01 | 79 | 32 | 38 |
| B8 | 21 | D5 | B7 | 35 | 21 | 95 | B8 | 34 | 06 | 00 | C5 | CD | FB | A1 | C1 |
| FA | B3 | A2 | 4F | 78 | FE | 0A | DA | 80 | A2 | CD | 66 | E5 | 0F | 3E | 09 |
| B7 | 17 | B7 | 17 | 80 | 17 | 81 | 47 | C3 | 93 | A2 | 3A | D0 | B7 | B7 | 78 |
| CA | C5 | A2 | 2F | 3C | 32 | EE | B7 | 47 | 21 | ED | B7 | 7E | 90 | 77 | C3 |
| EB | A0 | CD | 01 | A2 | F8 | 3A | A3 | B8 | E6 | F0 | C2 | D2 | A2 | CD | AE |
| A3 | CD | 55 | A9 | CD | 55 | A9 | CD | DB | 9D | CD | 55 | A9 | 3A | B8 | B8 |
| 21 | C6 | B8 | 77 | AF | 06 | 07 | 23 | 77 | C5 | C2 | F7 | A2 | CD | DB | 9D |
| 21 | ED | 37 | 3A | EE | B7 | 86 | 77 | C3 | D2 | A2 | CD | D3 | A0 | FE | 20 |
| CA | 0B | A3 | C9 | 3A | 37 | B8 | 32 | 95 | B8 | CD | 03 | A3 | FA | C5 | A1 |
| FE | 46 | CA | 2D | A3 | FE | 54 | C2 | C5 | A1 | 3E | FF | FE | AF | 32 | 9C |
| B8 | CD | D8 | A0 | F2 | 31 | A3 | C3 | 9B | A7 | 21 | 9C | B3 | 7E | B7 | CA |
| 45 | A3 | 3E | 54 | 01 | 3E | 46 | 77 | 3E | 20 | 23 | 77 | 23 | 77 | 23 | 77 |
| C3 | A1 | 9D | 3E | 0A | C3 | 5F | A3 | 3E | 0C | C3 | 5F | A3 | 3E | 08 | 4F |
| 7D | 32 | 3A | B8 | FE | 4F | 21 | E2 | A9 | 3A | BA | B3 | BE | D2 | 76 | 9C |
| 37 | CA | 76 | 9C | 3D | 07 | 5F | 16 | 00 | 13 | 19 | 5E | 23 | 56 | EB | 06 |
| 00 | 09 | 5E | 23 | 56 | EB | 11 | 3B | A3 | D5 | E9 | DA | 93 | A3 | CB | 2A |
| 8F | B3 | 7C | B5 | C2 | A7 | A3 | CD | 66 | B5 | 9D | 2A | 8D | B8 | 7C | 35 |
| C2 | A7 | A3 | CD | 66 | B5 | 85 | EB | 2A | 2E | 9C | F9 | EB | E9 | 21 | C6 |
| 38 | 11 | 9C | B8 | 06 | 08 | 1A | 77 | 23 | 13 | 05 | C2 | B6 | A3 | C9 | 21 |
| 9C | B8 | 11 | C6 | B8 | C3 | B4 | A3 | 3A | 69 | B8 | 21 | D0 | B7 | 77 | 37 |
| CA | 35 | A5 | 3A | A4 | B8 | B7 | C0 | 3E | C6 | C3 | 65 | A3 | 21 | EB | 37 |
| 35 | F8 | C2 | EE | A3 | 3A | 97 | B8 | 37 | C6 | 2A | FA | 50 | A4 | 21 | 99 |
| B8 | 35 | 06 | 30 | FA | 50 | A4 | 2A | F1 | B7 | 46 | 23 | 22 | F1 | B7 | C3 |
| | | | | | | | | | | | | | | | |
| 50 | A4 | 21 | 87 | B8 | 7E | 90 | 21 | B4 | B8 | 96 | 21 | EB | B7 | 96 | 32 |
| 97 | B3 | CA | 20 | A4 | F2 | 41 | A4 | B6 | 32 | EB | B7 | 2F | F2 | 3C | A4 |
| 3A | B4 | 38 | B7 | C6 | 2D | C4 | 50 | A4 | 21 | F0 | B7 | 35 | F2 | 36 | A4 |
| 06 | 2E | CD | 50 | A4 | C9 | CD | DD | A3 | C3 | 29 | A4 | CD | 66 | B5 | 04 |
| C9 | 06 | 20 | CD | 50 | A4 | 21 | 97 | B8 | 35 | C2 | 41 | A4 | C3 | 20 | A4 |
| 3A | D3 | B7 | 21 | D5 | B7 | BE | DA | 6B | A4 | 5E | 34 | 16 | 00 | 2A | D1 |
| B7 | 19 | 70 | 21 | 95 | B8 | 35 | C0 | C3 | 6F | A4 | CD | 66 | B5 | 0E | E1 |
| E1 | 3A | 96 | B8 | B7 | C0 | 3A | 31 | B8 | B7 | CA | B0 | A6 | C3 | 74 | A5 |
| 21 | A6 | B8 | 7E | 34 | 37 | CA | 8D | A4 | CD | 66 | B5 | 0D | 2A | 99 | B8 |
| 22 | A7 | B8 | 2A | B1 | B8 | 22 | AD | 38 | C3 | 30 | A6 | 21 | FF | 00 | 22 |
| 95 | B8 | 2A | 93 | B8 | EB | 2A | 3B | B8 | 19 | 3A | A4 | B3 | 37 | CA | D3 |
| A4 | 7E | FE | 27 | CA | C4 | A4 | E5 | D5 | CD | D8 | A0 | D1 | E1 | 77 | 23 |
| 13 | C3 | 31 | A4 | 13 | 23 | 7E | FE | 27 | CA | B7 | A4 | EB | 22 | 93 | B8 |
| C3 | B0 | A6 | 7E | FE | 27 | CA | EA | A4 | 47 | E5 | CD | 50 | A4 | 2A | 93 |
| B8 | 23 | 22 | 93 | B8 | E1 | 23 | C3 | D3 | A4 | EB | 2A | 93 | B8 | 23 | 22 |
| 93 | B8 | EB | 23 | 7E | FE | 27 | CA | D9 | A4 | C3 | B0 | A6 | 3A | A6 | B8 |
| 3D | F2 | 11 | A5 | 21 | 37 | B3 | 34 | 21 | C1 | 00 | 22 | 93 | 38 | C3 | 81 |
| A5 | 32 | A6 | B8 | C2 | B0 | A6 | 2A | AD | 88 | 2B | 22 | AD | B8 | 7C | B5 |
| CA | B0 | A6 | 2A | A7 | B8 | 22 | 93 | B8 | 21 | A6 | B3 | 34 | C3 | B0 | A6 |
| 21 | D0 | B7 | 36 | 01 | 3A | A4 | B8 | B7 | C2 | 56 | A5 | 3A | B9 | B8 | B7 |
| C2 | 56 | A5 | 3A | D5 | B7 | B7 | C2 | 50 | A5 | 3C | 2A | D1 | B7 | 36 | 20 |
| 32 | D3 | B7 | CD | 60 | A8 | 3A | D0 | B7 | 32 | D5 | B7 | B7 | C8 | 3A | A4 |
| B8 | B7 | C2 | 6A | A5 | 3E | 84 | 32 | D3 | B7 | C4 | F4 | A5 | AF | 32 | D5 |

```
B7 C3 B0 A6    21 37 B8 7E    B7 CA 31 A5    AF 77 C3 90
A5 2A CE B7    2B 22 CE B7    7C B7 F8 B5    C8 C3 90 A5
3A B7 38 B7    C2 30 A5 2A    31 B3 7C B5    CA B0 A6 2B
22 B1 B8 3A    F3 37 32 ED    B7 AF 32 B4    B8 32 EE B7
32 D0 B7 67    6F 22 9C B8    22 9E B8 22    A0 B8 22 A2
B8 3A 87 B8    21 95 B8 77    3A A4 B8 B7    CA D4 A5 34
2A AF B8 E9    3A 9B B3 47    2A CA B7 11    9C B8 FE 04
C2 E6 A5 11    A0 B8 7E 12    23 13 05 C2    E6 A5 22 CA
B7 C3 D0 A5    3A 89 B8 B7    CA 65 A3 21    FF 00 22 D3

B7 C9 AF 32    D0 B7 67 6F    22 9C B8 2A    93 B8 EB 2A
B8 B8 19 7E    23 13 FE 20    CA 13 A6 FE    2D C2 2A A6
01 D0 B7 CA    EE 01 02 C3    13 A6 EB 22    93 B8 32 B8
38 47 D6 30    FA 4C A6 FE    0A D2 4C A6    2A 9C B8 54
5D 29 29 19    29 5F 16 00    19 C3 08 A6    2A 9C B8 7C
35 C2 57 A6    23 78 C9 3A    D0 B7 37 CA    63 A6 AF 95
6F 3E 00 9C    67 22 9C B8    7C B5 78 C9    0E 08 B7 21
A3 B3 7E 1F    77 2B 0D C2    72 A6 05 C2    6C A6 C9 21
A3 B8 1E 08    B7 7E 1F 77    28 1D C2 85    A6 C9 16 04
21 CD B8 CD    82 A6 15 C2    90 A6 C9 F5    11 9D B8 21
9C B3 06 07    1A 77 23 13    05 C2 A4 A6    36 20 F1 C9
CD 02 A6 22    B1 B8 C2 CD    A6 FE 2C CA    B0 A6 FE 2F
CA 30 A5 FE    29 CA FD A4    FE 27 CA 9C    A4 FE 50 C2
DB A6 3A 9C    B8 32 B3 B8    C3 B0 A6 F5    7C B7 F2 EB
A6 CD 66 B5    1C 21 01 00    22 B1 B8 F1    32 8A B8 01
00 00 21 69    A7 3E CA 04    A7 23 0C FE    0A C2 F5 A6
CD 66 B5 B0    79 17 4F 21    B7 A7 3A A4    B3 B7 CA 14
A7 21 73 A7    09 5E 23 56    EB 22 AF B8    79 FE 05 D2
31 A7 EB 2A    93 B8 22 99    B8 21 FF 00    22 95 B8 EB
E9 CD 02 A6    C2 3B A7 CD    66 B5 B1 7D    32 87 B8 AF
32 F3 37 79    FE 0C DA 5B    A7 3A B8 B8    FE 2E C2 65
A7 CD 02 A6    2A 9C B8 7D    32 F3 37 2A    93 B8 2B 22
93 B8 C3 74    A5 CD 66 B5    32 58 48 23    41 49 4C 45
46 47 44 65    A8 5A A0 80    A4 60 9D 20    A2 14 A3 20
A2 20 A2 20    A2 20 A2 84    A8 83 A0 80    A4 A1 9D BA
A1 3A A3 F7    9E 9D 9F 05    A0 F4 9E 3A    93 B8 47 2A
CA B7 11 9C    B3 FE 04 C2    AD A7 11 A0    B3 1A 77 23
13 05 C2 AD    A7 22 CA B7    2A B1 B8 7C    B5 CA B0 A6
C3 74 A5 21    A3 B8 7E 37    CA 4D A8 D6    73 32 D0 B7
AF 77 3A 93    B8 3D CA EC    A7 3D CA EC    A7 2B 3E B0
A6 07 32 B4    B8 3E 80 B6    77 C3 03 A8    21 9D B8 7E
B7 F2 48 A8    2F 57 23 7E    2F 5F 13 73    23 72 3E 01

32 B4 B8 37    D4 51 AA CD    E0 A3 21 D0    B7 7E 90 77
C8 F2 04 A8    C6 03 F2 1F    A8 CD A8 A8    C3 07 A8 C2
40 A8 21 BC    B8 11 9C B8    CD B4 A3 CD    A3 A8 17 D2
07 A3 21 9C    B8 11 BC B8    CD B4 A3 21    EE B7 34 AF
2F C6 04 47    CD 6C A6 C9    2B B6 C2 03    A8 32 D0 B7
21 9C B8 06    C8 77 23 05    C2 55 A8 21    EE B7 34 C9
3E 02 C3 65    A3 2A B1 B8    11 D5 B7 7C    B7 C2 79 A8
1A 85 DA 79    A3 12 C3 30    A6 CD 66 B5    0C 3A D3 37
12 C3 B0 A6    E5 06 20 CD    50 A4 2A B1    B3 2B 22 B1
B8 7C 35 C2    85 A8 E1 C3    30 A6 3A 9B    B3 E6 0F 47
3A B7 B8 90    32 EE B7 C9    21 D0 B7 3E    04 86 77 21
EE B7 35 06    C1 CD 6C A6    CD AE A3 06    02 CD 6C A6
C3 DB 9D 61    6A 53 58 CD    0A A9 14 15    CA A1 A9 4A
```

| | | | | | | | |
|---|---|---|---|---|---|---|---|
| 53 5C 45 21 | C3 B8 96 D2 | A1 A9 2F 3C | 77 C3 81 A9 |
| 06 00 21 A3 | B8 7E B7 C2 | FD A8 78 D6 | 38 C2 F2 A8 |
| 47 C9 C6 40 | 47 16 08 CD | 68 A9 C3 E2 | A3 FA 08 A9 |
| CD 55 A9 C4 | B7 F2 FD A8 | 78 C9 06 00 | 7C B7 C2 37 |
| A9 B5 C2 1E | A9 32 C2 27 | A9 83 C2 30 | A9 C9 65 6A |
| 53 58 06 08 | C3 37 A9 EB | 11 00 00 06 | 10 C3 37 A9 |
| 63 68 11 00 | 00 06 13 7C | B7 FA 4C A9 | 78 17 5F 7A |
| 17 57 7D 17 | 6F 7C 17 67 | 04 C3 38 A9 | 22 9E B8 EB |
| 22 9C 38 78 | C9 E5 21 9C | 38 1E 08 B7 | 7E 17 77 23 |
| 1D C2 5C A9 | E1 C9 16 04 | CD 55 A9 15 | C2 68 A9 C9 |
| 11 89 A9 D5 | CD 66 B5 13 | 11 FF FF 4A | 21 C3 B8 71 |
| C9 73 21 C3 | B8 B7 FC 93 | A9 46 23 7E | E6 80 A9 4F |
| C3 1A AA 1C | C0 14 C0 0C | C0 0E 80 34 | C0 C3 74 A9 |
| E1 AF 67 6F | 22 C0 B8 22 | C2 B3 C9 3A | F5 B5 B7 C0 |
| 3C 32 F5 B5 | 21 BF B6 36 | 0D 22 11 B7 | 3E 01 32 13 |
| B7 3C 32 20 | B7 3E 0C 32 | 14 B7 3E 10 | 32 21 B7 3A |
| E2 A9 3D 47 | 21 5A A3 AF | 77 23 05 C2 | D3 A9 32 7C |
| AB C9 0B BB | B4 BB B4 C9 | 34 B3 B4 B3 | B4 8D AB BD |
| AB 8D AB 8D | A3 BD A9 7E. | 23 66 6F EB | 7E 23 66 6F |

| | | | | | | | |
|---|---|---|---|---|---|---|---|
| EB C9 E5 CD | 28 AA E1 73 | 23 72 23 71 | 23 70 C3 3A |
| AA CD 32 AA | E5 CD 1D AA | E1 C9 CD 3A | AA EB 22 C0 |
| 38 EB 60 69 | 22 C2 B3 C9 | 2A C0 38 EB | 2A C2 B3 44 |
| 4D C9 5E 23 | 56 23 4E 23 | 46 23 78 B7 | C3 79 C3 49 |
| AA 3A C3 B8 | B7 C8 3A C2 | 38 17 9F B7 | 37 C0 C6 01 |
| C9 CD 7F A6 | CD AE A3 CD | 7F A6 CD DB | 9D CD AE A3 |
| 06 0F CD 8E | A6 CD D3 9D | 05 C2 62 AA | CD 7F A6 CD |
| EE B7 34 C9 | 7C 2F 47 7D | 2F 4F | *......!..4.ö/Gü/O* |
| 03 21 00 00 | 3E 11 F5 37 | C3 95 AA F5 | E5 09 D2 94 |
| AA F1 37 3E | E1 78 17 5F | 7A 17 57 7D | 17 6F 7C 17 |
| 67 F1 3D C2 | 8B AA 7C 37 | 1F 67 7D 1F | 6F C9 06 00 |
| D6 08 DA 8D | AA 43 5A 51 | 0E C0 C3 80 | AA C6 09 6F |
| AF 2D C8 79 | 1F 4F 7A 1F | 57 7B 1F 5F | 7B 1F 47 C3 |
| C0 AA EB 60 | 69 4E 23 46 | 23 EB 71 23 | 70 23 EB 3D |
| C2 D5 AA C9 | 32 C6 B7 22 | A9 B8 EB 22 | A3 38 60 69 |
| 22 C7 B7 AF | 32 C9 B7 C9 | E5 D5 3A C9 | B7 FE 02 D2 |
| 0D AB 21 A9 | B8 B7 5F 16 | 00 19 C3 21 | A3 F5 3A C6 |
| 37 FE 04 2A | C7 37 DA 26 | AB F1 D6 02 | 87 5F 16 00 |
| 19 7E 23 66 | 6F F5 F1 3A | C9 B7 3C 32 | C9 B7 57 3A |
| C6 B7 BA 01 | D2 39 AB E1 | C9 E3 E1 C9 | 00 00 00 00 |
| 00 00 00 C0 | C0 00 00 00 | 00 C0 00 00 | 03 00 00 00 |
| 00 00 00 00 | C0 0C 00 00 | 00 00 00 00 | 00 00 00 0C |
| 00 00 00 00 | C0 00 00 00 | 00 C0 00 00 | 00 00 C0 0C |
| 00 00 00 C0 | C0 00 00 00 | 00 C0 0C 00 | 00 0C C0 00 |
| 46 4F 52 54 | 00 2E 44 41 | 54 C0 C3 79 | B0 BA AE 3A |
| AE FC AD A7 | AD 9D AD 79 | BC 76 AD 21 | 59 AB 3A 3A |
| 38 16 00 5F | 19 7E C9 21 | 62 A3 3A BA | B3 B7 5F 16 |
| 00 19 5E 23 | 56 C9 F5 3E | 00 D2 3D AB | 3C 32 79 AB |
| CD 9B AB B7 | F4 07 AD E6 | 40 7E C2 5C | AC 3A BA B8 |
| 5F 16 00 21 | 4F AB 19 36 | FF 2A 31 B6 | 11 02 B0 7C |
| 92 C2 E9 AB | 7D 93 CA EC | AB 22 7E AB | EB 22 81 36 |
| 2A 91 B8 7C | B5 06 04 C2 | 03 AC F1 06 | 01 D2 04 AC |

| | | | | | | | |
|---|---|---|---|---|---|---|---|
| 06 00 FE F1 | CD A7 A3 EB | E5 E5 3A BA | B3 C6 03 77 |
| 23 36 04 23 | 11 2E 00 E5 | 19 36 10 EB | E1 73 23 72 |
| 23 36 01 23 | AF 77 23 77 | 23 77 23 77 | 23 77 23 23 |

| | | | | | | | | | | | |
|---|---|---|---|---|---|---|---|---|---|---|---|
| 5D | 54 | 13 | 13 | 73 | 23 | 72 | 23 | 7o | FD | E1 | CD | 1C | 81 | E1 | 01 |
| 0A | 00 | 09 | 7E | E6 | 40 | C2 | 8A | AB | 2A | 91 | 88 | 7D | 34 | F5 | CD |
| 9B | AB | F1 | CA | 53 | AC | F6 | 08 | F6 | C0 | 77 | FE | F1 | AF | 32 | 78 |
| AB | E5 | 2A | 91 | B8 | 7D | B4 | CA | 04 | AD | 32 | 78 | A3 | E5 | CD | A5 |
| AE | CD | A7 | AB | EB | E5 | E5 | 23 | 36 | C8 | FD | E1 | E1 | D1 | D5 | E5 |
| E5 | 23 | 36 | 24 | 23 | 23 | 23 | 73 | 23 | 72 | FD | E1 | CD | 1C | 81 | E1 |
| D1 | E5 | 01 | CA | 00 | 09 | 7E | E1 | FE | C9 | CA | B5 | AC | E6 | 40 | C2 |
| FD | AC | 21 | 4F | A3 | 3A | BA | 38 | 5F | 16 | 00 | 19 | 72 | 62 | 6A | 22 |
| 91 | B8 | E1 | 7E | C9 | 3A | 79 | AB | B7 | C2 | 01 | AD | E5 | 01 | 04 | 00 |
| 09 | 7E | 23 | 66 | 6F | 7B | 95 | 4F | 7A | 9C | 47 | CD | 6A | 80 | E1 | E5 |
| E5 | 23 | 36 | 0E | 23 | 73 | 23 | 72 | 23 | 36 | 80 | 23 | 36 | 00 | FD | E1 |
| C5 | CD | 1C | 81 | C1 | E1 | E5 | 11 | 0A | C0 | 19 | 7E | E6 | 40 | C2 | 76 |
| 9C | E1 | 0B | 78 | 81 | CA | A2 | AC | E5 | E5 | C3 | DE | AC | E1 | E1 | 37 |
| C9 | E1 | E1 | C9 | E1 | 7E | C9 | E5 | AF | 32 | 78 | A3 | 2A | F6 | B5 | EB |
| 21 | 3A | AB | 3A | BA | 38 | 87 | 06 | 00 | 4F | 09 | 73 | 23 | 72 | 21 | 00 |
| 02 | 19 | E5 | CD | A7 | AB | D1 | 72 | 2B | 73 | 21 | 0E | 00 | 19 | 36 | 2A |
| 23 | 36 | 0A | 23 | 11 | 80 | AB | 1A | 77 | 23 | 13 | 1A | B7 | C2 | 38 | AD |
| 3A | BA | 38 | 47 | D6 | 0A | 9F | C6 | 31 | 77 | 78 | FE | 0A | DA | 51 | AD |
| AF | C6 | 30 | 23 | 77 | 23 | 11 | 85 | AB | 1A | 77 | 23 | 13 | B7 | C2 | 59 |
| AD | 11 | 17 | 00 | 19 | 22 | F6 | 85 | E1 | 3E | 80 | 77 | 54 | 5D | 01 | F6 |
| FF | 09 | 36 | 00 | EB | C9 | CD | 9B | AB | 87 | F2 | 8A | A3 | 36 | 80 | 87 |
| F2 | 87 | AD | 87 | FC | 90 | AF | CD | A7 | AB | EB | E5 | 23 | 36 | 06 | 23 |
| 23 | 23 | AF | 77 | 23 | 77 | FD | E1 | CD | 1C | 81 | AF | C9 | CD | 9B | AB |
| E6 | 40 | C4 | 76 | AD | AF | C9 | AF | 32 | 78 | AB | CD | B6 | AB | E6 | CF |
| F6 | 28 | 77 | 2A | D1 | 37 | E5 | EB | 2A | D3 | 87 | 26 | 00 | EB | 19 | AF |
| 1D | 1C | FA | CA | AD | 77 | 23 | C3 | C1 | AD | CD | A7 | A3 | EB | D1 | E5 |
| E5 | E5 | D5 | CD | 6A | 80 | E1 | D5 | 01 | 80 | 00 | ED | 80 | D1 | E1 | 23 |
| 36 | 0E | 23 | 73 | 23 | 72 | 23 | 36 | 80 | 23 | 36 | 00 | FD | E1 | CD | 1C |
| 81 | E1 | 11 | 0A | 00 | 19 | 7E | E6 | 40 | C3 | 37 | C9 | AF | 32 | 78 | AB |
| | | | | | | | | | | | | | | | |
| 37 | CD | 36 | A3 | E6 | CF | F6 | 38 | 77 | CD | A7 | AB | D5 | CD | 6A | 30 |
| E1 | E5 | E5 | 23 | 36 | 0A | 23 | 73 | 23 | 72 | 23 | 36 | 00 | 23 | 36 | 02 |
| FD | E1 | CD | 1C | 81 | CD | 6A | 80 | 2A | D1 | 87 | 01 | 80 | 00 | EB | ED |
| 80 | E1 | 11 | 0A | 00 | 19 | 7E | C3 | FF | AE | AF | 32 | 78 | AB | CD | 36 |
| AB | AF | 32 | 7C | A3 | 3A | D3 | 37 | B7 | C3 | E5 | 2A | D1 | B7 | E3 | 7E |
| E6 | 10 | F5 | 7E | E6 | CF | F6 | 34 | 77 | F1 | 3A | D3 | 37 | E1 | F5 | 7E |
| FE | 2B | CA | 8A | AE | FE | 31 | C2 | 72 | AE | 3E | 0C | CD | 67 | AF | C3 |
| 8A | AE | FE | 30 | 3E | 0A | CC | 67 | AF | F1 | F5 | 3E | 0A | C2 | 87 | AE |
| F1 | 3C | F5 | 23 | C3 | 3A | AE | CD | 67 | AF | F1 | 23 | 3D | CA | 9B | AE |
| F5 | 7E | CD | 67 | AF | C3 | 8A | AE | 3E | 0D | CD | 67 | AF | 3A | 7C | AB |
| E6 | 40 | C8 | 37 | C9 | F5 | E5 | D5 | CD | 9B | AB | E6 | 04 | C4 | 99 | AF |
| CD | 9B | AB | 32 | 7A | AB | D1 | E1 | F1 | C9 | AF | 32 | 73 | AB | 37 | CD |
| 36 | A3 | E6 | CF | F6 | 20 | 77 | AF | 32 | D3 | 87 | 32 | 7C | AB | CD | 0A |
| AF | DA | FC | AE | FE | FF | CA | 08 | AF | F5 | 2A | D3 | B7 | 26 | 00 | EB |
| 2A | D1 | 37 | 19 | F1 | 77 | 13 | EB | 22 | D3 | 37 | FE | 0D | CA | FC | AE |
| 7D | FE | 80 | DA | CE | AE | CD | 66 | B5 | 12 | AF | C9 | 3A | 7C | A3 | FE |
| C9 | CA | 08 | AF | E6 | 40 | 37 | C0 | B7 | C9 | 21 | 4F | A3 | 3A | BA | 38 |
| 16 | 00 | 5F | 19 | 7E | B7 | FC | 2A | AF | D8 | 34 | 21 | 3A | AB | 19 | 19 |
| 36 | 5F | 23 | 3E | 00 | 8E | 57 | 1A | 37 | C9 | E5 | D5 | CD | A7 | AB | EB |
| E5 | E5 | 23 | 3A | 78 | AB | B7 | 3E | 0A | CA | 3E | AF | 3E | 1E | 77 | E5 |
| CD | 6A | 80 | E1 | 23 | 73 | 23 | 72 | 23 | 36 | 80 | 23 | 36 | 00 | FD | E1 |
| CD | 1C | 81 | E1 | 11 | 0A | 00 | 19 | 7E | 32 | 7C | AB | D1 | E1 | FE | C9 |
| 37 | 3E | 00 | 77 | C8 | 37 | C9 | E5 | F5 | 21 | 4F | A3 | 3A | 3A | B8 | 16 |
| 00 | 5F | 19 | 7E | FE | FF | C2 | 7B | AF | AF | 77 | B7 | FC | C5 | AF | 34 |
| 21 | 3A | AB | 19 | 19 | 86 | 5F | 23 | 3E | 00 | 8E | 57 | F1 | 12 | E1 | C9 |
| 87 | FA | 99 | AF | 3E | FF | CD | 67 | AF | 21 | 4F | AB | 3A | BA | B3 | 16 |

| | | | | | | | | | | | |
|---|---|---|---|---|---|---|---|---|---|---|---|
| 00 | 5F | 19 | 7E | FE | FF | C2 | AA | AF | AF | B7 | 36 | 00 | C8 | F5 | CD |
| 6A | 80 | F1 | 6F | 26 | 00 | 19 | B7 | FA | C2 | AF | 36 | 00 | 23 | 3C | C3 |
| B7 | AF | 21 | 7B | AB | E5 | D5 | CD | A7 | AB | EB | E5 | E5 | 23 | 3A | 78 |
| AB | B7 | 3E | CE | CA | D9 | AF | 3E | 12 | 77 | E5 | CD | 6A | 80 | E1 | 23 |
| 73 | 23 | 72 | 23 | 36 | 80 | 23 | 36 | 00 | FD | E1 | CD | 1C | 31 | E1 | 11 |
| 0A | 00 | 19 | 7E | 32 | 7C | AB | CD | 9B | AB | E6 | FB | 77 | D1 | E1 | AF |

| | | | | | | | | | | | |
|---|---|---|---|---|---|---|---|---|---|---|---|
| 77 | C9 | 11 | 01 | 00 | 21 | 59 | AB | 19 | 7E | 87 | D5 | 73 | 32 | BA | B8 |
| FC | 76 | AD | D1 | 13 | 7B | FE | 0B | C2 | C5 | 80 | C9 | 7E | FE | 0B | D2 |
| 8A | AB | 32 | 8A | B8 | C5 | D5 | CD | AB | A9 | CD | 9B | AB | B7 | F4 | 07 |
| AD | CD | A7 | AB | EB | D1 | 01 | 10 | 00 | C9 | E5 | 06 | 20 | 0E | 00 | 1A |
| B7 | CA | 51 | 80 | FE | 20 | CA | 51 | B0 | 77 | 13 | 23 | 0C | 05 | C2 | 3F |
| B0 | E1 | 2B | 71 | 23 | D1 | 1A | 77 | 3A | BA | B8 | 87 | 16 | 00 | 5F | 21 |
| E2 | A9 | 19 | 01 | 8D | AB | 70 | 2B | 71 | C9 | 3A | BA | B3 | 87 | 5F | 16 |
| 00 | 21 | 3A | AB | 19 | 5E | 23 | 56 | C9 | CD | 9B | AB | E6 | 08 | C2 | 9D |
| B0 | CD | B1 | B0 | B7 | CC | A1 | B0 | D8 | 19 | 3D | 77 | 1A | FE | 0A | C2 |
| 94 | B0 | AF | C9 | 7E | B7 | CC | A1 | B0 | D8 | C3 | 89 | B0 | CD | 4B | B1 |
| C9 | CD | 4B | B1 | D3 | CD | B1 | B0 | 3E | 7F | 77 | CD | B1 | B0 | 3C | 13 |
| C9 | 3A | 3A | B8 | 5F | 16 | 00 | 21 | 4F | AB | 19 | 7E | E5 | 21 | 3A | AB |
| 19 | 19 | 86 | 5F | 23 | 3E | 00 | 8E | 57 | E1 | 7E | C9 | 9C | AF | 32 | 89 |
| 9C | 7E | 23 | 66 | 6F | 22 | 00 | 00 | 21 | 4F | 9A | 22 | 00 | 00 | EB | 7E |
| 23 | B6 | 2B | C2 | C5 | 9C | 21 | 00 | 00 | 22 | 00 | 00 | 21 | 00 | 00 | 39 |
| 23 | 23 | 22 | 2E | 9C | 3A | A7 | 9C | 87 | C2 | E6 | 9C | 67 | 6F | 22 | 00 |
| 00 | 22 | 00 | 00 | 22 | 00 | 00 | C3 | 14 | 9D | 21 | DB | 9C | 3E | 03 | CD |
| 13 | 8A | 2A | E7 | 9C | 7E | 23 | 36 | C2 | FC | ?C | 67 | CD | FF | B3 | FE |
| 04 | CA | 9B | B1 | FE | 0A | CA | 2E | B2 | FE | 0E | CA | 53 | B2 | FE | 12 |
| CA | D9 | B3 | FE | 1E | CA | 9F | B3 | FE | 24 | CA | 8D | B2 | FE | 03 | CA |
| DE | B3 | FE | 06 | CA | B1 | B1 | CD | 03 | 14 | C9 | CD | A7 | AB | D5 | FD |
| E1 | CD | FF | B3 | C5 | D5 | E5 | 78 | FE | 0A | C2 | 69 | B1 | 0D | 35 | EB |
| 5E | 23 | 56 | 1B | 72 | 2B | 73 | 1B | EB | 1A | 6F | 13 | 1A | 67 | 13 | 2B |
| FD | 75 | 04 | FD | 74 | 05 | FD | 36 | 01 | 24 | E1 | E5 | CD | BD | B2 | E1 |
| D1 | C1 | 78 | FE | 0A | C2 | 92 | 81 | 0C | 34 | EB | 5E | 23 | 56 | 13 | 72 |
| 2B | 73 | FD | 7E | 0A | FE | 80 | 37 | C0 | AF | C9 | AF | 77 | 12 | 13 | 12 |
| CD | 03 | 14 | CD | 6A | 80 | EB | FD | 75 | 02 | FD | 74 | 03 | CD | AF | 34 |
| C9 | 78 | FE | 0E | CA | E3 | B1 | FE | 12 | CA | E3 | B1 | CD | 6A | 80 | E5 |
| EB | 11 | 80 | FF | 7B | FE | 0A | C2 | CB | B1 | 0D | 0D | FA | D3 | B1 | 19 |
| C3 | CB | 31 | EB | E1 | 72 | 23 | 73 | FD | 36 | 04 | 00 | FD | 36 | 05 | 00 |
| C3 | 47 | B1 | 21 | C7 | 31 | 16 | 00 | FD | 5E | 00 | 19 | 7E | B7 | FD | 36 |
| 01 | 12 | DA | F9 | 81 | FD | 36 | 01 | 0E | FD | 36 | 04 | 00 | FD | 36 | 05 |

| | | | | | | | | | | | |
|---|---|---|---|---|---|---|---|---|---|---|---|
| 02 | CD | 6A | 80 | E5 | EB | 11 | 30 | FF | CD | FA | 11 | B2 | 19 | C3 | 09 |
| 32 | FD | 75 | 02 | FD | 74 | 03 | EB | E1 | 72 | 2B | 73 | CD | 03 | 14 | FD |
| 36 | 01 | 06 | FD | 36 | 04 | 00 | FD | 36 | 05 | 00 | C3 | 47 | 81 | 0C | 71 |
| EB | 4E | 23 | 46 | 03 | 70 | 23 | 71 | 1A | FE | 01 | CA | 47 | B1 | D6 | 05 |
| C2 | E1 | B3 | 3C | 12 | CD | 6A | B0 | 01 | 47 | B1 | C5 | E5 | 21 | 80 | FE |
| C3 | F2 | 33 | E5 | D5 | 21 | 07 | 31 | 16 | 00 | FD | 5E | 00 | 19 | 7E | D1 |
| E1 | E6 | 80 | C0 | 0C | 71 | EB | 4E | 23 | 46 | 03 | 70 | 23 | 71 | 1A | D6 |
| 04 | C2 | E1 | B3 | 12 | CD | 6A | B0 | 01 | 83 | B2 | C5 | E5 | 21 | 80 | FE |
| C3 | F2 | B3 | FD | 36 | 01 | 0E | CD | 03 | 14 | C3 | A9 | B4 | 05 | D9 | E1 |
| 4E | 23 | 46 | C5 | EB | FD | 6E | 04 | FD | 66 | 05 | E5 | B7 | ED | 42 | FA |
| F7 | B2 | C2 | BD | B2 | D1 | E1 | D5 | D9 | D1 | D5 | 21 | 07 | B1 | 16 | 00 |
| FD | 5E | 00 | 19 | 7E | E6 | 80 | B0 | 77 | D1 | C3 | 73 | B3 | D1 | C1 | E5 |
| D5 | CD | 45 | B4 | D9 | D1 | E1 | CA | AA | B2 | D5 | D9 | C5 | D9 | CD | 51 |
| B4 | E1 | D1 | E5 | D5 | CB | 3C | CB | 1D | C3 | 3C | CB | 1D | EB | C3 | 3C |
| CB | 1D | CB | 3C | CB | 1D | B7 | ED | 52 | D1 | E3 | 7C | B5 | E1 | 3E | 24 |
| C2 | 26 | B3 | 23 | C3 | 26 | B3 | D1 | C1 | E5 | D5 | CD | 45 | B4 | D9 | D1 |

```
E1 CA AA 82    D5 D9 C5 D9    CD 51 B4 E1    D1 D5 CB 3C
CB 1D CB 3C    CB 1D EB CB    3C C3 1D CB    3C CB 1D 37
EB ED 52 D1    3E 26 FD 75    04 FD 74 05    FD 77 01 D5
CD 03 14 FD    36 04 00 FD    36 05 02 FE    C9 C2 4D 33
FD 36 01 0E    CD 03 14 D1    F5 D5 C3 6A    B3 D1 F5 D5
11 00 00 CD    73 B3 FD 36    01 1E CD 03    14 FE D5 FD
36 01 0A FD    36 05 02 CA    5A B3 D1 CD    73 B3 F1 FD
77 0A C9 D5    16 00 FD 5E    00 CD 36 B4    C1 EB 71 23
70 1A 47 79    E6 03 12 90    4F FA 94 B3    0D F8 CD E1
B3 C3 8C B3    ED 44 4F 0D    F8 CD EB B3    C3 97 B3 78
FE 1E C8 FD    6E 02 FD 66    03 11 80 FF    0D FA B4 B3
19 C3 AC B3    FD 75 02 FD    74 03 FD 36    04 00 FD 36
05 02 FE 12    C2 CD B3 FD    77 01 C3 47    B1 FE 04 C2
47 B1 FD 36    01 0A C3 47    B1 FD 36 0A    80 C9 C3 47
B1 CD 6A B0    E5 21 80 00    C3 F2 B3 CD    6A B0 E5 21
80 FF 19 EB    E1 72 2B 73    FD 73 02 FD    72 03 C9 21

07 B1 16 00    FD 5E 00 19    FD 7E 01 FE    0A C2 1A B4
7E E6 B0 CA    1A B4 FD 36    01 1E FE 04    C2 21 B4 36
00 7E E6 80    4F 7E E6 7F    47 FD 7E 01    B1 77 FE 24
C2 36 B4 F6    80 77 E6 7F    21 DE B0 19    19 E5 21 CB
B0 19 4E D1    C9 79 E6 FC    6F 60 78 E6    FC 5F ED 52
C9 78 FE 12    CA 5A B4 FE    0E C0 FD 36    01 12 C5 D9
CD 6A B0 C1    EB 11 80 FF    0D FA 70 B4    19 C3 63 B4
FD 75 02 FD    74 03 FD 36    04 C0 FD 36    05 02 CD 03
14 FE D5 C2    A9 B4 FD 36    01 24 FD 36    04 01 CD 03
14 FD 36 01    12 FD 36 04    00 FE C9 C2    A2 B4 FD 36
01 0E FD 36    05 02 CD 03    14 FD 66 03    FD 6E 02 01
FF 01 36 C0    E5 D1 13 ED    B0 C9 00 DC    B4 0E B5 D9
34 D9 B4 D7    B4 D7 B4 D7    B4 DC B4 57    B5 D9 B4 D9
B4 D7 B4 D7    B4 D7 B4 AF    C9 C3 76 9C    AF 32 D3 87
32 BA B4 CD    65 B7 E6 7F    FE CA CA E3    B4 F5 2A D3
B7 26 00 EB    2A D1 B7 19    F1 77 13 E3    22 D3 B7 FE
0D C8 7D FE    80 0A E3 B4    CD 66 95 12    AF C9 AF 32
3A B4 3A D3    B7 B7 C8 2A    D1 B7 3D F5    3E 0D CD 3D
B7 7E FE 23    CA 49 B5 FE    31 C2 34 B5    3E 0C CD 3D
B7 C3 49 B5    3E 0A CD 3D    B7 7E FE 20    CA 49 B5 FE
30 C2 49 B5    3E 0A CD 3D    B7 F1 23 C8    F5 7E 23 CD
3D B7 F1 3D    C3 4B B5 3E    01 C3 0F B5    00 00 00 00
00 00 00 00    C0 00 E1 7E    23 E5 B7 17    F5 4F 06 00
21 83 35 09    5E 23 56 EB    22 60 B5 21    5C B5 36 0D
23 36 0A 23    36 2A 23 36    2A 23 23 23    36 2A 23 36
2A 23 36 0D    23 36 0A 21    5C B5 06 0A    C5 7E CD 3D
B7 C1 05 23    C2 9C B5 3A    F4 B5 3C 32    F4 B5 FE 14
D2 88 86 F1    D0 C3 83 36    49 44 46 30    4D 50 49 52
46 57 49 54    45 58 44 4F    4D 4C 44 5A    4C 47 53 51
49 42 54 4C    4F 42 44 45    49 53 42 45    49 4E 4F 56
43 4E 47 4C    47 53 53 4E    41 32 49 4F    44 54 42 49
52 43 45 46    C0 0C CE 38    00 C2 40 F8    B5 01 00 00

00 00 00 00    C0 00 00 00    28 43 29 20    56 49 44 45
4F 54 4F 4E    20 52 45 4C    45 41 53 45    20 44 41 54
45 3A 20 4E    4F 56 2E 20    31 36 2E 20    31 39 38 33
2E 22 06 86    AF 32 F4 B5    32 F5 B5 21    80 86 22 31
86 AF C5 2A    F6 B5 11 FF    FF 42 4B CD    09 14 AF CD
09 14 22 84    86 09 D1 F9    D5 60 69 22    86 86 3E 40
```

```
32 FA 85 FD    21 F9 85 CD    03 14 21 F3    B5 7E 32 33
36 E6 FD 77    3E 42 32 FA    85 FD 21 F9    B5 C3 03 14
C9 BE 36 00    C0 00 00 00    21 90 36 E5    2A 81 B6 E9
3E 0D CD 3D    87 3E 0A CD    3D 87 FD 21    81 36 CD 03
14 2A 86 B6    44 4D 2A 34    B6 3E 01 CD    C9 14 C3 00
14 02 42 83    B6 01 00 00    00 C0 00 00    00 00 C9 0D
CD F3 A1 C1    FA 38 A2 4F    78 FE 0A DA    60 A2 CD C6
A1 0F 3E 09    87 17 87 17    30 17 81 47    C3 9B A2 3A
86 A2 37 78    CA C5 A2 2F    3C 32 5C A2    47 21 22 A2
7E 90 77 C3    E8 A0 CD 01    A2 F3 3A E2    A1 E6 F0 C2
D2 A2 CD AE    A3 CD 00 00    CD E2 A2 CD    D3 9D CD E5
A2 3F 36 01    0C 00 00 00    00 C0 00 00    00 00 00 00
02 10 2D 87    C1 00 00 00    00 C0 01 00    00 00 03 04
3B 87 00 C0    C0 00 00 00    00 00 00 00    00 C5 D5 E5
F5 47 3A 8A    B4 3D 78 CA    91 87 32 2D    B7 21 01 00
22 24 37 21    2D B7 22 22    B7 FD 21 20    B7 CD 03 14
F1 E1 01 C1    C9 E5 2A 11    87 7E FE 0D    CC 76 87 23
7E 22 11 87    E1 C9 C5 D5    21 50 00 22    17 37 21 3F
B6 22 15 87    FD 21 13 37    CD 03 14 21    8E 36 D1 C1
C9 3A 3C 87    87 CC A9 37    78 32 38 87    21 01 00 22
32 87 FD 21    2E 87 C3 5D    37 C5 3E 04    32 2F B7 21
00 00 22 32    87 FD 21 2E    87 CD 03 14    3E 10 32 2F
37 32 3C 87    C1 C9 00 00    00 C0 00 00    00 00 00 00
00 00 00 00    C0 00 00 00    00 C0 00 00    00 00 00 00
00 00 00 00    C0 00 00 00    00 00 00 00    00 00 00 00
00 00 00 00    00 00 00 00    00 C0 00 00    00 00 00 00
```

What is claimed is:

1. Apparatus for evaluating construction of machines, particularly agricultural machines, by calculation of a set of output parameters identifying characteristics of machinery useful in judging the utility of the machinery wherein each of the output parameters is associated with a specific one of the characteristics, there being input parameters and input data which quantifies the input parameters with specific values, there being intermediary parameters for which data is not available, the input parameters and the intermediary parameters being used in the calculation of the output parameters, the apparatus comprising:

a keyboard for entry of the input data of the input parameters;

a parameter base module having a parameter memory for storage of a set of the input parameters and the intermediary parameters, and a set of the output parameters for characterization of a machine to be constructed;

a numerical board coupled to said base module and employing electric signals for displaying individual parameters of the set of input and intermediary parameters;

an analyzer module connecting with said base module for selecting specific ones of the input and the intermediary parameters to be used in producing mathematical correlations among the input and the intermediary parameters;

processing means including a microprocessor connecting with said keyboard and said base module and said analyzer module, said processing means interpolating said input data of said keyboard and calculating said intermediary parameters by the aid of predetermined patterns of such data, said processing means further including a data memory for storing information describing the predetermined patterns of data;

synthesizer means connecting with said data memory, said parameter memory, and said analyzer module for developing mathematically, by a sequence of mathematical steps, correlations among the input and the intermediary parameters selected by the analyzer module, the correlations providing values for the output parameters in the characterization of a machine to be constructed and being stored in said parameter memory; and an object module connecting with said analyzer module and being responsive to said microprocessor for displaying the numerical values of the output parameters provided by said base module for a machine to be constructed.

2. Apparatus according to claim 1 further comprising a housing and a printer, said printer connecting with said object module and providing a display on a printed sheet of the numerical values of the output parameters; said base and said analyzer and said object modules being located in said housing, and said printer being disposed in a separate casing.

3. Apparatus according to claim 2 wherein said base module includes indicators of ten elementary numbers, and signal lamps.

4. Apparatus according to claim 3 wherein said parameter memory further stores mathematical algorithms and programs for said microprocessor.

5. Apparatus according to claim 1 or claim 4 wherein said numerical board includes switching and key elements for designation of acceptance, cancellation, and correction functions of said apparatus.

6. Apparatus according to claim 1 or claim 4 wherein said processing means is provided with colored lamps indicating readiness for service and designating an operating state of said apparatus.

7. Apparatus according to claim 1 or claim 4 wherein said parameter base module includes keys for the entry of numbers and lamps for designating states of operation.

8. Apparatus according to claim 2 wherein said modules are configured to permit their connection and disconnection from said housing.

9. Apparatus according to claim 1 wherein said synthesizer means operates in accordance with a program for forming vectorial surfaces of the parameters of a machine system, the vectorial sufaces showing a variation of output parameter as a function of variations in input and intermediary parameters, this being accomplished with the aid of said microprocessor whereby a tendency curve may be calculated as a function of time, the tendency curve showing a variation in output parameter as a function of time.

10. Apparatus according to claim 9, wherein said synthesizer means includes a lamp associated with a switch for indicating a state of readiness in the operation of said synthesizer means; said apparatus further comprising keys on said housing to enter instructions in the operation of said synthesizer means, said objects module and said printer in the production of a plot of the tendency curve and in the generation of a mathematical surface by said synthesizer unit and the coupling of said curve and said surface via said object module to said printer.

11. Apparatus according to claim 10 wherein one of said modules includes a key for initiation of operation of the apparatus and a second key for terminating said operation.

12. Apparatus according to claim 11 wherein said object module includes a set of parameter displays and numerical displays corresponding to parameters supplied by said base module to said object module, the numerical display being presented in four or more digits, there being a flashing lamp to indicate a failure and a colored lamp to indicate end of operation of said processing and said synthesizer means.

* * * * *